US012789896B2

(12) United States Patent
Wires et al.

(10) Patent No.: US 12,789,896 B2
(45) Date of Patent: Nov. 10, 2026

(54) LAND VEHICLES INCORPORATING MULTI-SEGMENT CHASSIS, MULTI-SEGMENT CHASSIS, AND COMPONENTS THEREFOR

(71) Applicant: Workhorse Group Inc., Sharonville, OH (US)

(72) Inventors: Donald L. Wires, Loveland, OH (US); Max Lupfer, Sharonville, OH (US); Ryan Doll, Sharonville, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

(21) Appl. No.: 19/364,960

(22) Filed: Oct. 21, 2025

(65) Prior Publication Data

US 2026/0249913 A1 Aug. 27, 2026

Related U.S. Application Data

(63) Continuation of application No. 19/066,001, filed on Feb. 27, 2025, now Pat. No. 12,473,030.

(51) Int. Cl.

| | |
|---|---|
| ***B60K 1/04*** | (2019.01) |
| ***B60K 1/00*** | (2006.01) |
| ***B62D 21/03*** | (2006.01) |
| ***B62D 21/11*** | (2006.01) |

(52) U.S. Cl.

CPC ................ *B62D 21/11* (2013.01); *B60K 1/00* (2013.01); *B62D 21/03* (2013.01)

(58) Field of Classification Search

CPC . B60K 1/04; B60K 1/00; B62D 21/11; B62D 21/03; B60L 50/64; B60L 50/66

See application file for complete search history.

(56) References Cited

U.S. PATENT DOCUMENTS

| | | | |
|---|---|---|---|
| 1,251,749 | A | 1/1918 | Cilley |
| 1,728,889 | A | 9/1929 | Kemble |
| 2,172,831 | A | 9/1939 | Philip |
| 2,728,420 | A | 12/1955 | Wright et al. |
| 2,973,220 | A | 2/1961 | White |

(Continued)

FOREIGN PATENT DOCUMENTS

| | | | |
|---|---|---|---|
| CN | 103359174 | A | 10/2013 |
| CN | 109515094 | A | 3/2019 |

(Continued)

OTHER PUBLICATIONS

International Search Report; International Searching Authority; International Patent Application No. PCT/US2021/012327; Mar. 9, 2021; 2 pages.

(Continued)

*Primary Examiner* — Jason D Shanske
*Assistant Examiner* — James J Triggs
(74) *Attorney, Agent, or Firm* — Taft Stettinius & Hollister LLP

(57) ABSTRACT

Land vehicles are disclosed. A land vehicle includes a chassis extending in a longitudinal direction and a plurality of wheels supported by the chassis. The plurality of wheels include a pair of front wheels and a pair of rear wheels arranged rearward of the pair of front wheels in the longitudinal direction. The chassis includes multiple sections or segments that are spaced from one another in the longitudinal direction.

18 Claims, 38 Drawing Sheets

(56) References Cited

U.S. PATENT DOCUMENTS

| | | | |
|---|---|---|---|
| 3,066,621 | A | 12/1962 | Dean et al. |
| 3,696,732 | A | 10/1972 | Rodgers |
| 4,159,832 | A | 7/1979 | Inbody |
| 4,270,622 | A | 6/1981 | Travis |
| 4,676,545 | A | 6/1987 | Bonfilio et al. |
| 4,934,733 | A | 6/1990 | Smith et al. |
| 5,168,963 | A | 12/1992 | Poncini |
| 5,363,939 | A | 11/1994 | Catlin |
| 5,363,969 | A | 11/1994 | Shen |
| 5,628,438 | A | 5/1997 | Legrow |
| 5,690,378 | A | 11/1997 | Romesburg |
| 5,823,599 | A | 10/1998 | Gray |
| 5,829,542 | A | 11/1998 | Lutz |
| 6,015,198 | A | 1/2000 | Stair |
| 6,357,769 | B1 | 3/2002 | Omundson et al. |
| 6,893,046 | B2 | 5/2005 | Ledesma et al. |
| 6,926,351 | B2 | 8/2005 | Telehowski et al. |
| 6,954,152 | B1 | 10/2005 | Matthews |
| 7,441,809 | B1 | 10/2008 | Coombs et al. |
| 7,651,153 | B2 | 1/2010 | Martin et al. |
| 8,002,063 | B2 | 8/2011 | Rydberg et al. |
| 8,641,133 | B1 | 2/2014 | Scaringe et al. |
| 8,651,292 | B2 | 2/2014 | Sunderland et al. |
| 8,714,592 | B1 | 5/2014 | Thoreson et al. |
| 9,103,535 | B1 | 8/2015 | Strobel et al. |
| 9,168,818 | B2 | 10/2015 | Hirai et al. |
| 9,550,414 | B2 | 1/2017 | Kudo et al. |
| 9,636,984 | B1 * | 5/2017 | Baccouche ........... H01M 50/24 |
| 10,518,627 | B2 | 12/2019 | Nagpal et al. |
| 10,801,169 | B2 | 10/2020 | Roy et al. |
| 10,967,904 | B2 | 4/2021 | Penz et al. |
| 11,766,925 | B2 | 9/2023 | Landvik et al. |
| 11,801,741 | B2 * | 10/2023 | Zandbergen ............ B60L 50/64 |
| 12,168,489 | B2 | 12/2024 | Choi |
| 12,466,485 | B1 | 11/2025 | Wires et al. |
| 12,472,807 | B1 | 11/2025 | Wires et al. |
| 2002/0113394 | A1 | 8/2002 | Ziech et al. |
| 2004/0046381 | A1 | 3/2004 | Yoshida et al. |
| 2004/0118643 | A1 | 6/2004 | Booher |
| 2006/0158024 | A1 | 7/2006 | Wendl |
| 2006/0273571 | A1 | 12/2006 | Matsumoto et al. |
| 2007/0257570 | A1 | 11/2007 | Walter et al. |
| 2008/0003321 | A1 | 1/2008 | Kerr et al. |
| 2009/0032321 | A1 | 2/2009 | Marsh et al. |
| 2010/0025132 | A1 | 2/2010 | Hill et al. |
| 2010/0072787 | A1 | 3/2010 | Abe et al. |
| 2010/0101900 | A1 | 4/2010 | Usui |
| 2010/0108417 | A1 | 5/2010 | Gilmore |
| 2010/0263954 | A1 | 10/2010 | Constans |
| 2011/0017527 | A1 | 1/2011 | Oriel et al. |
| 2012/0103713 | A1 * | 5/2012 | Ohashi ...................... F16C 3/03 180/68.4 |
| 2013/0153343 | A1 | 6/2013 | Neudeck |
| 2013/0241237 | A1 | 9/2013 | Dziuba et al. |
| 2013/0341971 | A1 | 12/2013 | Masini et al. |
| 2014/0054916 | A1 | 2/2014 | Knudtson et al. |
| 2014/0083606 | A1 | 3/2014 | Masini et al. |
| 2014/0159468 | A1 | 6/2014 | Heinen et al. |
| 2014/0182954 | A1 | 7/2014 | Weber |
| 2014/0203624 | A1 | 7/2014 | Hilton et al. |
| 2015/0027795 | A1 | 1/2015 | Hirai et al. |
| 2015/0068832 | A1 | 3/2015 | Rumpel et al. |
| 2015/0291017 | A1 | 10/2015 | LaBiche |
| 2015/0367721 | A1 | 12/2015 | Shiraki et al. |
| 2016/0106073 | A1 | 4/2016 | Van der Linde |
| 2017/0050514 | A1 | 2/2017 | Li |
| 2017/0113716 | A1 | 4/2017 | Gong et al. |
| 2017/0225715 | A1 | 8/2017 | Kobayashi et al. |
| 2017/0305253 | A1 | 10/2017 | Perle et al. |
| 2018/0037151 | A1 | 2/2018 | Bauer et al. |
| 2018/0043895 | A1 | 2/2018 | Shami et al. |
| 2018/0108891 | A1 | 4/2018 | Fees et al. |
| 2018/0237076 | A1 | 8/2018 | Perlo et al. |
| 2018/0290627 | A1 | 10/2018 | Hariri et al. |
| 2018/0337377 | A1 | 11/2018 | Stephens et al. |
| 2018/0345777 | A1 | 12/2018 | Bimschein et al. |
| 2019/0054895 | A1 | 2/2019 | Hall et al. |
| 2019/0056005 | A1 | 2/2019 | Hall et al. |
| 2019/0168678 | A1 | 6/2019 | Magnuson et al. |
| 2019/0217764 | A1 | 7/2019 | Conny |
| 2019/0389444 | A1 | 12/2019 | Kistner et al. |
| 2020/0062183 | A1 | 2/2020 | Smith et al. |
| 2020/0369140 | A1 | 11/2020 | McCarron et al. |
| 2020/0369334 | A1 | 11/2020 | Lee |
| 2021/0101641 | A1 | 4/2021 | Kim et al. |
| 2021/0171120 | A1 | 6/2021 | Kim et al. |
| 2021/0206432 | A1 | 7/2021 | Willison |
| 2022/0041244 | A1 | 2/2022 | Upadhyay et al. |
| 2022/0123397 | A1 | 4/2022 | Weicker et al. |
| 2023/0062143 | A1 | 3/2023 | Zandbergen et al. |
| 2023/0070279 | A1 | 3/2023 | Wheeler et al. |
| 2023/0130254 | A1 | 4/2023 | Gonzalez et al. |
| 2024/0278843 | A1 | 8/2024 | Nagasawa |

FOREIGN PATENT DOCUMENTS

| | | | |
|---|---|---|---|
| CN | 110884568 | A | 3/2020 |
| DE | 19626901 | A1 | 1/1998 |
| DE | 102012101483 | A1 | 6/2013 |
| DE | 102015200737 | B4 | 6/2020 |
| DE | 102019109465 | A1 | 10/2020 |
| EP | 1538072 | A1 | 6/2005 |
| EP | 2552763 | A2 | 2/2013 |
| EP | 3174680 | A2 | 6/2017 |
| EP | 3689717 | A1 | 8/2020 |
| FR | 2698601 | A1 | 6/1994 |
| GB | 2479898 | A | 11/2011 |
| WO | 2016016662 | A2 | 2/2016 |

OTHER PUBLICATIONS

Written Opinion of the International Searching Authority; International Searching Authority; International Patent Application No. PCT/US2021/012327; Mar. 9, 2021; 8 pages.

International Search Report; International Searching Authority; International Patent Application No. PCT/US2021/012330; Mar. 9, 2021; 2 pages.

Written Opinion of the International Searching Authority; International Searching Authority; International Patent Application No. PCT/US2021/012330; Mar. 9, 2021; 9 pages.

International Search Report; International Searching Authority; International Patent Application No. PCT/US2021/012332; Mar. 24, 2021; 2 pages.

Written Opinion of the International Searching Authority; International Searching Authority; International Patent Application No. PCT/US2021/012332; Mar. 24, 2021; 7 pages.

Supplementary European Search Report; European Patent Office; European Application No. 21710384.5; Oct. 21, 2021; 12 pages.

International Search Report; International Searching Authority; International Patent Application No. PCT/US2022/014847; Mar. 8, 2022; 3 pages.

Written Opinion of the International Searching Authority; International Searching Authority; International Patent Application No. PCT/US2022/014847; Mar. 8, 2022; 6 pages.

International Search Report; International Searching Authority; International Patent Application No. PCT/US2022/014844; Mar. 16, 2022; 2 pages.

Written Opinion of the International Searching Authority; International Searching Authority; International Patent Application No. PCT/US2022/014844; Mar. 16, 2022; 7 pages.

International Search Report; International Searching Authority; International Patent Application No. PCT/US2022/014851; Apr. 25, 2022; 2 pages.

Written Opinion of the International Searching Authority; International Searching Authority; International Patent Application No. PCT/US2022/014851; Apr. 25, 2022; 7 pages.

International Search Report; International Searching Authority; International Patent Application No. PCT/US2022/014852; Apr. 18, 2022; 2 pages.

(56) References Cited

OTHER PUBLICATIONS

Written Opinion of the International Searching Authority; International Searching Authority; International Patent Application No. PCT/US2022/014852; Apr. 18, 2022; 7 pages.
Extended European Search Report; European Patent Office; European Patent Application No. 22153661.8; Jul. 6, 2022; 11 pages.
Partial European Search Report (R. 64 EPC); European Patent Office; European Patent Application No. 22153665.9; Aug. 18, 2022; 16 pages.
International Search Report; International Searching Authority; International Patent Application No. PCT/US2025/058415; Feb. 13, 2026; 3 pages.
Written Opinion of the International Searching Authority; International Searching Authority; International Patent Application No. PCT/US2025/058415; Feb. 13, 2026; 13 pages.
Invitation to Pay Additional Fees; International Searching Authority; International Patent Application No. PCT/US2025/058409; Feb. 19, 2026; 2 pages.
International Search Report; International Searching Authority; International Patent Application No. PCT/US2025/058420; Feb. 26, 2026; 2 pages.
Written Opinion of the International Searching Authority; International Searching Authority; International Patent Application No. PCT/US2025/058420; Feb. 26, 2026; 8 pages.
International Search Report; International Searching Authority; International Patent Application No. PCT/US2025/058409; Apr. 15, 2026; 4 pages.
Written Opinion of the International Searching Authority; International Searching Authority; International Patent Application No. PCT/US2025/058409; Apr. 15, 2026; 15 pages.
International Search Report; International Searching Authority; International Patent Application No. PCT/US2025/058408; Apr. 10, 2026; 3 pages.
Written Opinion of the International Searching Authority; International Searching Authority; International Patent Application No. PCT/US2025/058408; Apr. 10, 2026; 16 pages.

* cited by examiner

LAND VEHICLES INCORPORATING MULTI-SEGMENT CHASSIS, MULTI-SEGMENT CHASSIS, AND COMPONENTS THEREFOR

CROSS-REFERENCE TO RELATED APPLICATIONS

This application is a continuation of, and claims priority to, U.S. application Ser. No. 19/066,001, which was filed on Feb. 27, 2025. The contents of that application are incorporated by reference herein in their entirety.

TECHNICAL FIELD

The present disclosure generally relates to land vehicles adapted for use in delivery applications, and, more particularly, to electric delivery and utility vehicles.

BACKGROUND

Land vehicles adapted for use in delivery applications may have various shortcomings. In particular, electrically-powered delivery and utility vehicles may have certain drawbacks. For those reasons, among others, electrically-powered land vehicles suited for use in delivery applications that avoid the limitations of conventional components and/or systems remain an area of interest.

SUMMARY

The present disclosure may comprise one or more of the following features and combinations thereof.

According to one aspect of the present disclosure, a land vehicle may include a chassis and a plurality of wheels supported by the chassis. The chassis may extend in a longitudinal direction. The plurality of wheels may include a pair of front wheels and a pair of rear wheels arranged rearward of the pair of front wheels in the longitudinal direction. The chassis may include a front suspension subframe assembly, a rear suspension subframe assembly, a power source cradle assembly, and a midframe assembly. The front suspension subframe assembly may support the pair of front wheels. The rear suspension subframe assembly may support the pair of rear wheels. The power source cradle assembly may support a plurality of power sources of the vehicle and be arranged between the front suspension subframe assembly and the rear suspension subframe assembly in the longitudinal direction. The midframe assembly may be arranged at least partially between the front suspension subframe assembly and at least a portion of the power source cradle assembly in the longitudinal direction.

In some embodiments, the chassis may include an electronics cradle assembly that supports a plurality of electronic devices and is arranged rearward of the rear suspension subframe assembly in the longitudinal direction.

In some embodiments, the front suspension subframe assembly may include a base rail assembly including a pair of base rails spaced from one another in a lateral direction perpendicular to the longitudinal direction and at least one cross rail extending in the lateral direction to couple the pair of base rails to one another.

In some embodiments, the front suspension subframe assembly may include a powertrain unit cradle at least partially housing a powertrain unit of the vehicle and a base block coupled to the powertrain unit cradle and arranged rearward of the powertrain unit cradle in the longitudinal direction, and the powertrain unit cradle and the base block may be mounted to the base rail assembly.

In some embodiments, the midframe assembly may include a pair of support arm structures spaced apart from one another in the lateral direction, and the front suspension subframe assembly may be coupled to the midframe assembly such that the base block is arranged between the pair of support arm structures in the lateral direction and aligned with the pair of support arm structures in the longitudinal direction.

In some embodiments, the midframe assembly may include a pair of support arm structures spaced apart from one another in the lateral direction and a crossbeam assembly extending in the lateral direction to couple the pair of support arm structures to one another, the pair of support arm structures may be directly coupled to the front suspension subframe assembly, and the crossbeam assembly may be directly coupled to the power source cradle assembly.

In some embodiments, the crossbeam assembly may at least partially define the power source cradle assembly.

In some embodiments, the crossbeam assembly and the power source cradle assembly may cooperatively establish an enclosure in which the plurality of power sources are at least partially enclosed.

In some embodiments, the rear suspension subframe assembly may include a base plate, a first frame arch coupled to the base plate at one lateral end thereof, a second frame arch coupled to the base plate at another lateral end thereof opposite the one lateral end, and a faceplate coupled to forward ends of the first and second frame arches.

In some embodiments, the faceplate may be spaced from the base plate in the longitudinal direction.

In some embodiments, the base plate may be formed to include a central cavity in which a plurality of drive units of the vehicle is at least partially positioned.

According to another aspect of the present disclosure, a chassis may include a front suspension subframe assembly, a rear suspension subframe assembly, a power source cradle assembly, and a midframe assembly. The front suspension subframe assembly may support a pair of front wheels of the vehicle. The rear suspension subframe assembly may support a pair of rear wheels of the vehicle and be arranged rearward of the front suspension subframe assembly in a longitudinal direction. The power source cradle assembly may support a plurality of power sources of the vehicle and be arranged between the front suspension subframe assembly and the rear suspension subframe assembly in the longitudinal direction. The midframe assembly may be arranged at least partially between the front suspension subframe assembly and at least a portion of the power source cradle assembly in the longitudinal direction.

In some embodiments, the chassis may include an electronics cradle assembly to support a plurality of electronic devices that is arranged rearward of the rear suspension subframe assembly in the longitudinal direction.

In some embodiments, the midframe assembly may include a pair of support arm structures spaced apart from one another in a lateral direction perpendicular to the longitudinal direction, and the front suspension subframe assembly may be coupled to the midframe assembly such that the front suspension subframe assembly is at least partially arranged between the pair of support arm structures in the lateral direction.

In some embodiments, the midframe assembly may include a crossbeam assembly that extends in the lateral direction to couple the pair of support arm structures to one another, and the crossbeam assembly may be directly coupled to the power source cradle assembly.

In some embodiments, the crossbeam assembly may at least partially define the power source cradle assembly.

In some embodiments, the midframe assembly and the power source cradle assembly may cooperatively establish an enclosure in which the plurality of power sources are at least partially enclosed.

According to yet another aspect of the present disclosure, a land vehicle may include a chassis and a plurality of wheels supported by the chassis. The chassis may extend in a longitudinal direction. The plurality of wheels may include a pair of front wheels and a pair of rear wheels arranged rearward of the pair of front wheels in the longitudinal direction. The chassis may include a front suspension subframe assembly, a rear suspension subframe assembly, a power source cradle assembly, a midframe assembly, and an electronics cradle assembly. The front suspension subframe assembly may support the pair of front wheels. The rear suspension subframe assembly may support the pair of rear wheels. The power source cradle assembly may support a plurality of power sources of the vehicle and be arranged between the front suspension subframe assembly and the rear suspension subframe assembly in the longitudinal direction. The midframe assembly may be arranged at least partially between the front suspension subframe assembly and at least a portion of the power source cradle assembly in the longitudinal direction. The electronics cradle assembly may support a plurality of electronic devices and be arranged rearward of the rear suspension subframe assembly in the longitudinal direction. The midframe assembly and the power source cradle assembly may cooperatively establish an enclosure in which the plurality of power sources are at least partially enclosed.

In some embodiments, the rear suspension subframe assembly may include a base plate, a first frame arch coupled to the base plate at one lateral end thereof, a second frame arch coupled to the base plate at another lateral end thereof opposite the one lateral end, and a faceplate coupled to forward ends of the first and second frame arches.

In some embodiments, the base plate may be formed to include a central cavity in which at least one powertrain unit of the vehicle is at least partially positioned.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF ILLUSTRATIVE EMBODIMENTS

Figure 1:
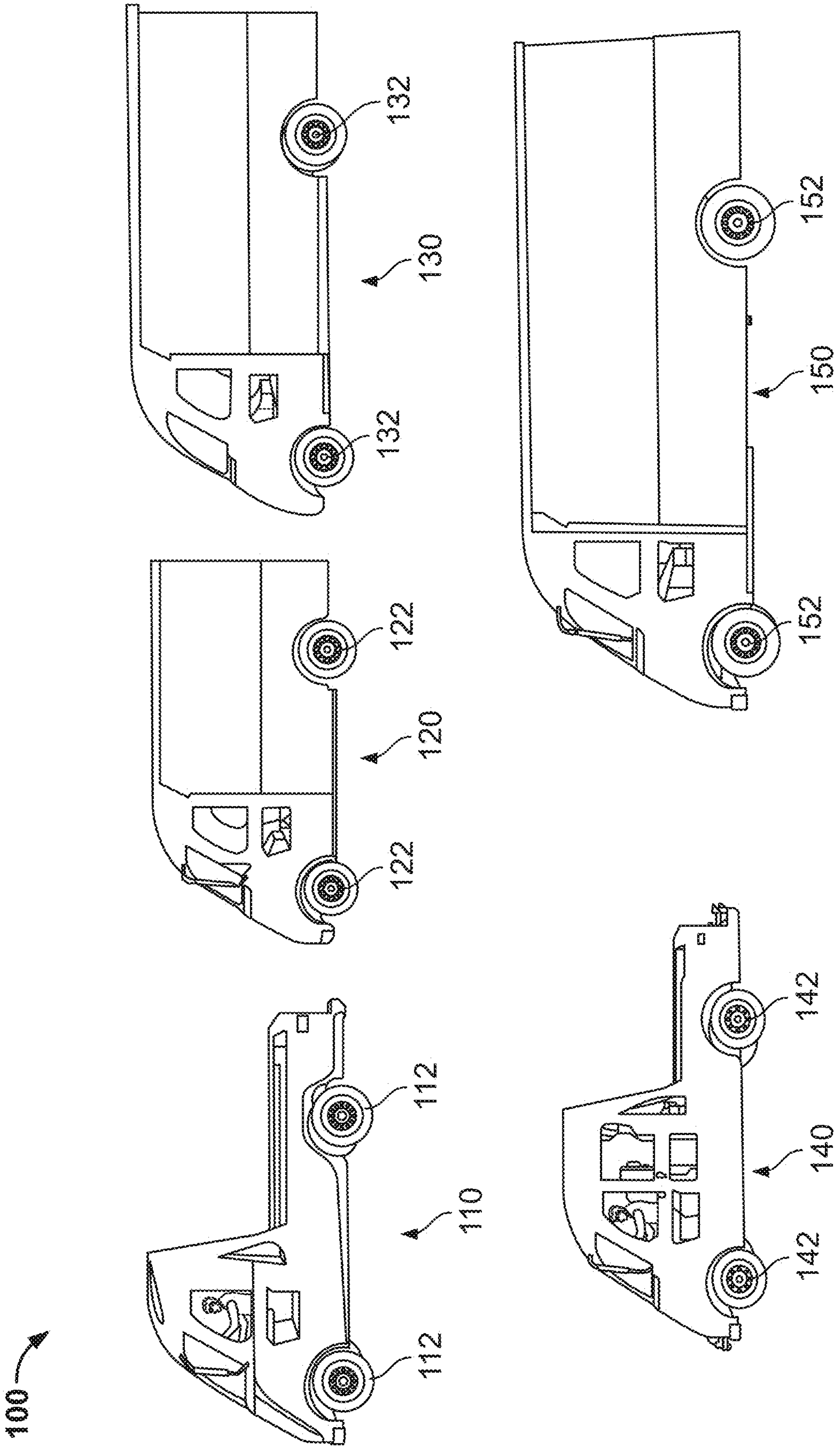
FIG. 1 depicts side elevation views of a number of electric vehicles that may incorporate powertrain assemblies according to certain embodiments of the disclosure.
Figure 2:
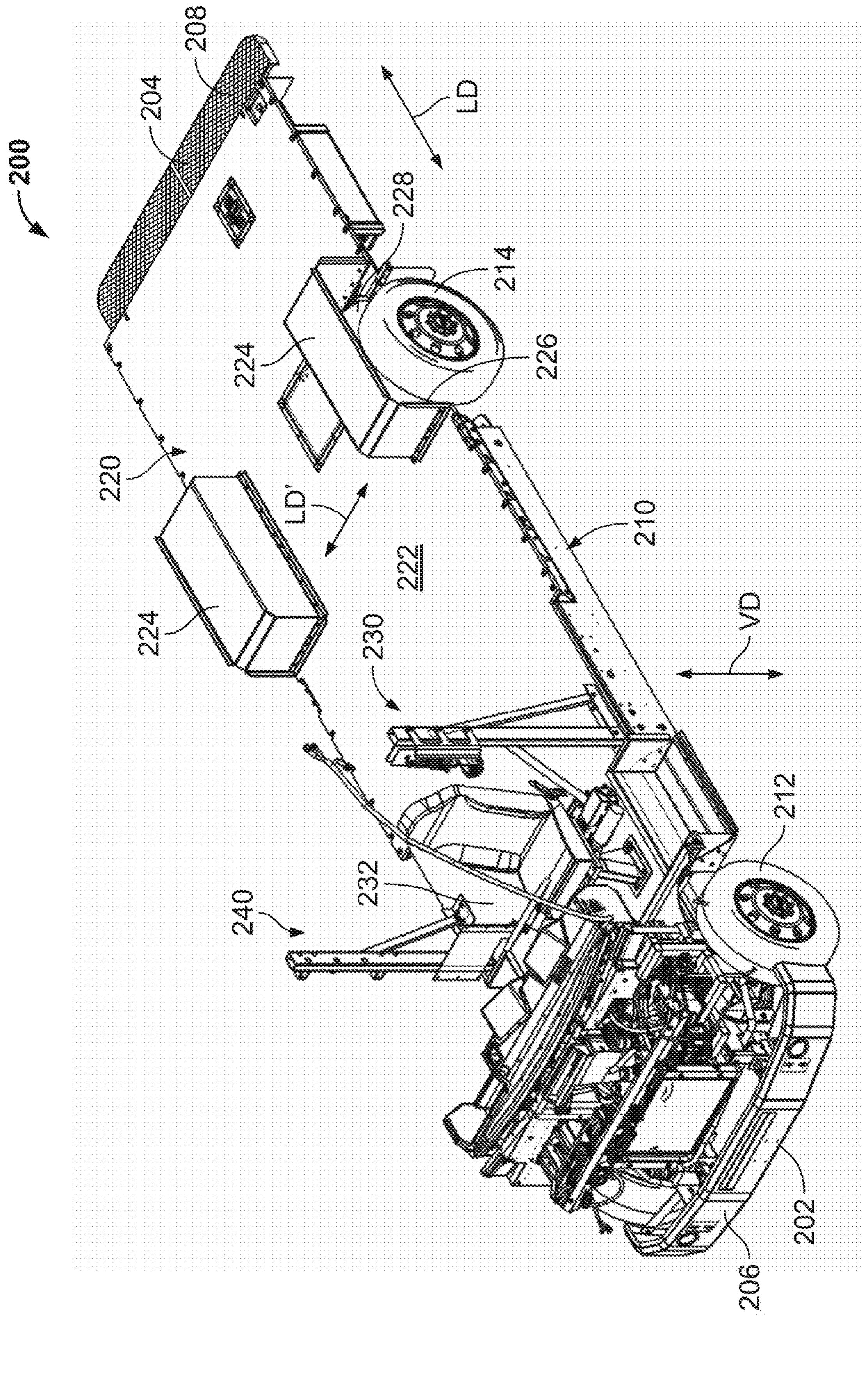
FIG. 2 is a perspective view of a vehicle chassis at least partially obscured by a vehicle floor and adapted for inclusion in one or more of the electric vehicles of FIG. 1 according to certain embodiments of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative line 100 of land vehicles includes a plurality of land vehicles. In the illustrative embodiment, the land vehicle line 100 includes, but is not limited to, a two-passenger flatbed utility vehicle 110 having wheels 112, a 650 cubic foot capacity delivery vehicle 120 having wheels 122, a 1000 cubic foot capacity delivery vehicle 130 having wheels 132, a six-passenger flatbed utility vehicle 140 having wheels 142, and a 1200 cubic foot capacity delivery vehicle 150 having wheels 152. In some embodiments, the land vehicle line 100 may be similar to the vehicle line 100 discussed in U.S. Pat. No. 11,400,982, which issued on Aug. 2, 2022, and which is incorporated by reference herein in its entirety. However, in some embodiments, the land vehicle line 100 may include any vehicle having a capacity within a particular range, such as a range of from 400 cubic feet to 1400 cubic feet, for example. Additionally, in some embodiments, the land vehicle line 100 may include a vehicle similar to the vehicle 100 discussed in U.S. Pat. No. 11,440,456, which issued on Sep. 13, 2022, and which is incorporated by reference herein in its entirety.

Referring now to FIG. 2 and FIGS. 3A-3C, an illustrative land vehicle 200 may be included in the line 100. In one example, the vehicle 200 may be similar to the delivery vehicle 150. The vehicle 200 is depicted with various external structures (e.g., a body having sidewalls, a rear compartment, a roof) omitted to better visualize a multi-segment chassis or main frame 210 thereof, among other things. In the illustrative arrangement, the chassis 210 is at least partially covered by a floor assembly 220 such that the chassis 210 and the floor assembly 220 extend in a longitudinal direction LD between a front end 202 of the vehicle 200 and a rear end 204 of the vehicle 200. The front end 202 includes a front bumper 206 and the rear end 204 includes a rear bumper 208, and each of the bumpers 206, 208 is coupled to, and supported by, the chassis 210.

The vehicle 200 illustratively includes a pair of front wheels 212 and a pair of rear wheels 214 supported by the chassis 210. The rear wheels 214 are arranged rearward of the front wheels 212 in the longitudinal direction LD. The illustrative floor assembly 220 includes a main floor body 222 and a pair of tire enclosure blocks 224 coupled to the main floor body 222 such that each of the tire enclosure blocks 224 extends above the main floor body 222 in a vertical direction VD. Each of the tire enclosure blocks 224 is sized to at least partially cover and enclose one of the rear wheels 214. In some embodiments, the floor assembly 220 does not include enclosure blocks or similar structures for the front wheels 212.

In the illustrative embodiment, the main floor body 222 is formed to include cutouts 226 extending inwardly therethrough in a lateral direction LD' perpendicular to the longitudinal direction LD. The cutouts 226 are illustratively aligned with the tire enclosure blocks 224 in the longitudinal direction LD and the lateral direction LD' such that the tire enclosure blocks 224 extend above and overhang the cutouts 226. When the rear wheels 214 are supported by the chassis 210 and the chassis 210 is covered and overlaid by the floor assembly 220, the cutouts 226 and the pair of tire enclosure blocks 224 cooperatively define wells 228 in which each one of the rear wheels 214 is disposed. Each of the wells 228 is sized to ensure spatial clearance between the tire mounted to a corresponding one of the rear wheels 214 and the corresponding enclosure block 224 covering the tire.

In the illustrative embodiment, the vehicle 200 includes a seatbelt tower assembly 230 supported by the chassis 210 and the floor assembly 220. The illustrative seatbelt tower assembly 230 is configured to secure a seatbelt (not shown) for an operator in an operator cabin 232. In some embodiments, the seatbelt tower assembly 230 may be similar to the seatbelt tower assembly 720 discussed in co-pending U.S. application Ser. No. 18/829,761, which was filed on Sep. 10, 2024, and which is incorporated by reference herein in its entirety.

In the illustrative embodiment, the vehicle 200 includes a seat frame assembly 240 supported by the chassis 210 and the floor assembly 220 that is configured to support a seat (not shown) for a passenger in the operator cabin 232. The seat frame assembly 240 is spaced from the seatbelt tower assembly 230 in the lateral direction LD' and aligned with the seatbelt tower assembly 230 in the longitudinal direction LD. In some embodiments, the seat frame assembly 240 may be similar to the seat frame assembly 730 discussed in co-pending U.S. application Ser. No. 18/829,761.

The multi-segment chassis 210 illustratively includes a front suspension subframe assembly 310 (see FIG. 3A) that supports the pair of front wheels 212, a rear suspension subframe assembly 330 that supports the pair of rear wheels 214, a power source cradle assembly 350 arranged between the front suspension subframe assembly 310 and the rear suspension subframe assembly 330 in the longitudinal direction LD, a midframe assembly 370 arranged at least partially between the front suspension subframe assembly 310 and at least a portion of the power source cradle assembly 350 in the longitudinal direction LD, and an electronics cradle assembly 390 arranged rearward of the rear suspension subframe assembly 330 in the longitudinal direction LD. As discussed below, the power source cradle assembly 350 is configured to support one or more electrical power sources 352 (e.g., battery packs) that may be used to supply power to one or more electric motors or drive units of the vehicle 200. Further, as discussed below, the electronics cradle assembly 390 is configured to support one or more electronic devices (not shown) distinct from the power sources 352. Further still, as discussed below, the power source cradle assembly 350 and the midframe assembly 370 cooperatively establish an enclosure 608 (see FIG. 6) in which the power sources 352 are at least partially enclosed in use of the vehicle 200.

In the illustrative embodiment, the vehicle 200 includes a pair of front suspension assemblies or systems 320A, 320B each coupled to one of the pair of front wheels 212 and the chassis 210 to support the pair of front wheels 212 for rotation relative to the chassis 210 in use of the vehicle 200. Additionally, the illustrative vehicle 200 includes a pair of rear suspension assemblies or systems 340A, 340B each coupled to one of the pair of rear wheels 214 and the chassis 210 to support the pair of rear wheels 214 for rotation relative to the chassis 210 in use of the vehicle 200. In some embodiments, the front suspension assemblies 320A, 320B may be identical or substantially similar to one another, and the rear suspension assemblies 340A, 340B may be identical or substantially similar to one another. Further, in some embodiments, the front suspension assemblies 320A, 320B may be different and/or structurally distinguishable from the rear suspension assemblies 340A, 340B.

Figure 5:
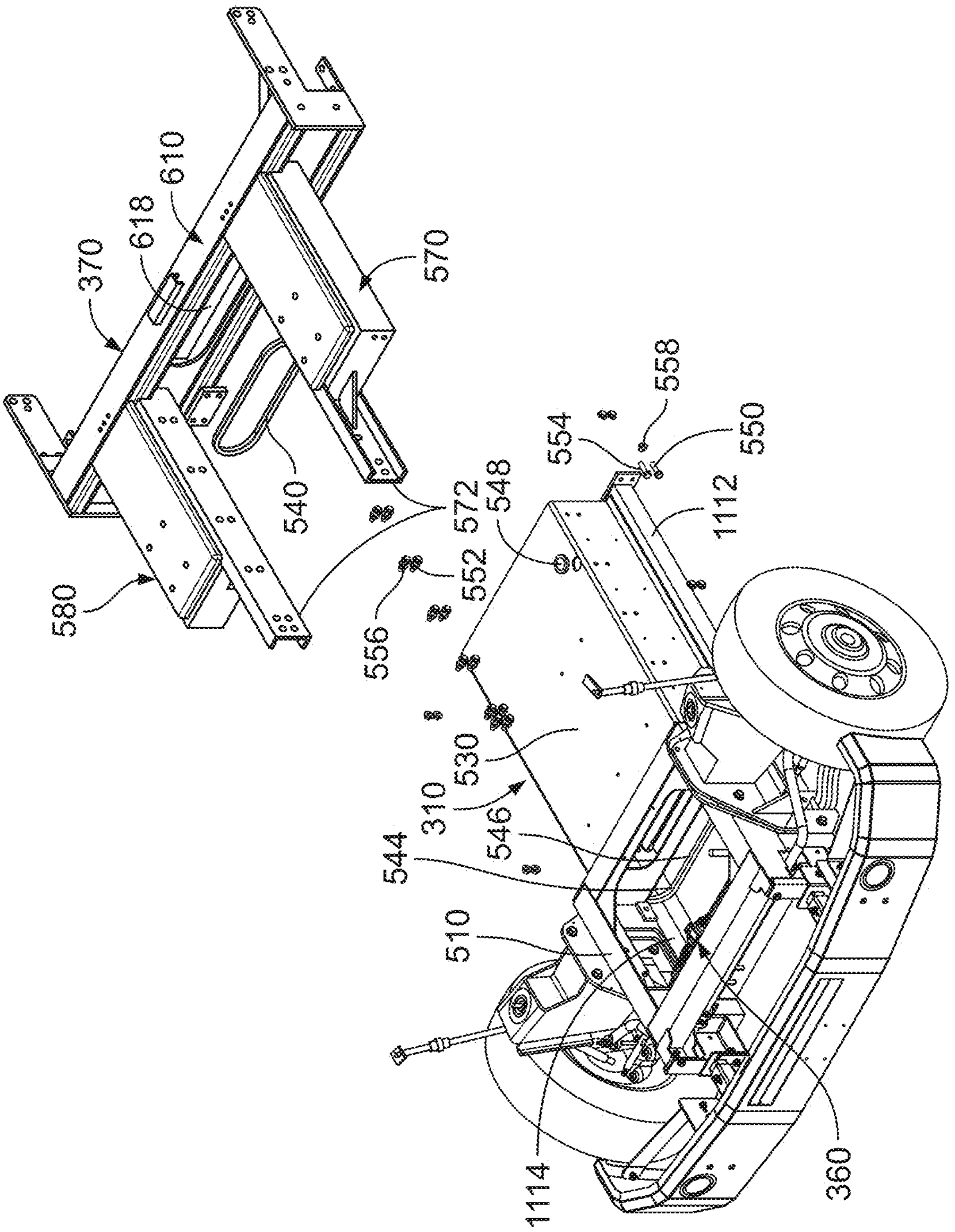
FIG. 5 is a perspective view of part of the chassis of FIG. 3A with certain features omitted for the sake of clarity that illustrates a pair of front suspension assemblies mounted to a front suspension subframe assembly of the chassis and a midframe assembly coupled to the front suspension subframe assembly.
Figure 10:
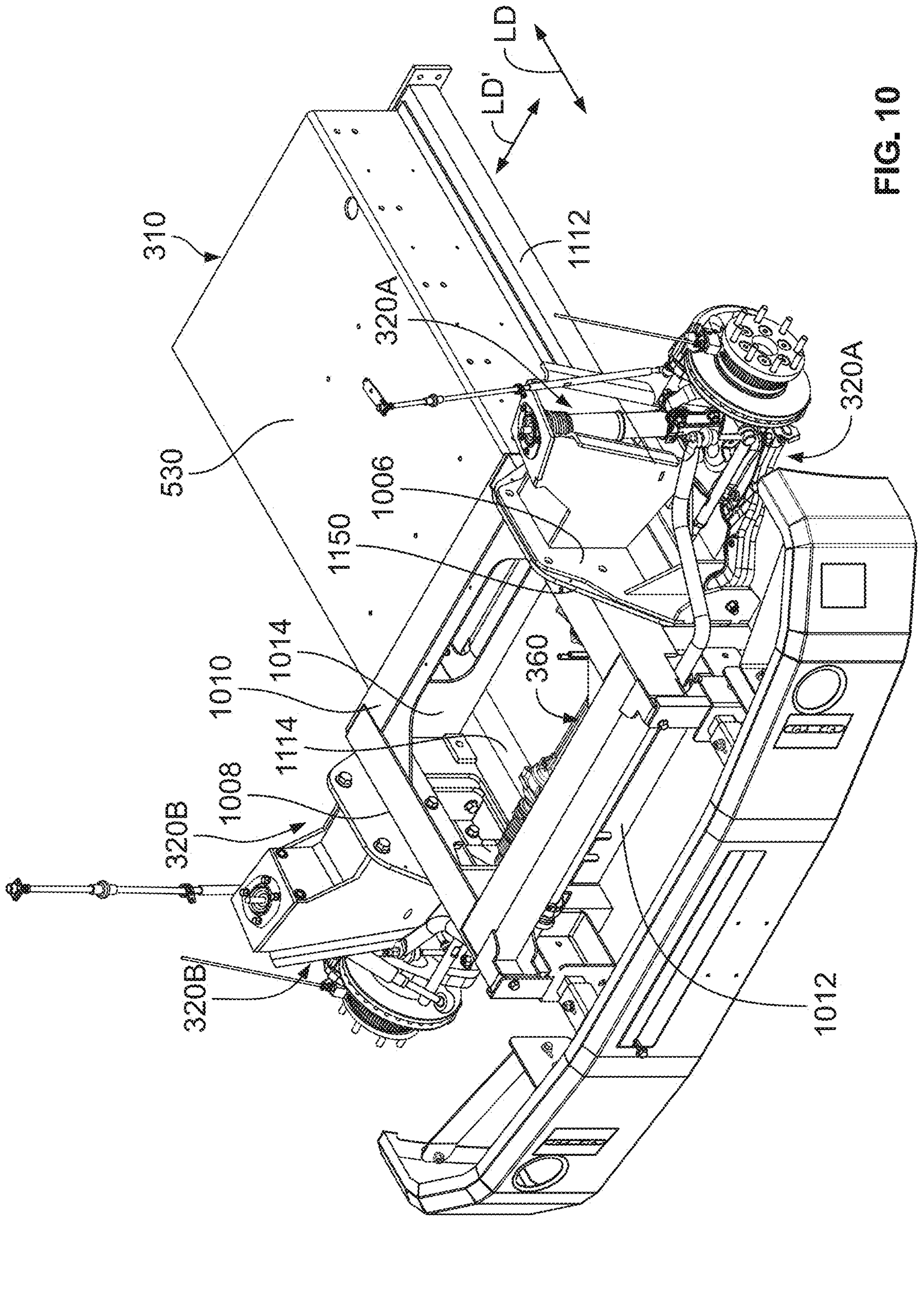
FIG. 10 is a perspective view of part of the chassis similar to FIG. 5A showing the pair of front suspension assemblies mounted to the front suspension subframe assembly with the midframe assembly omitted for the sake of clarity.
Figure 11:
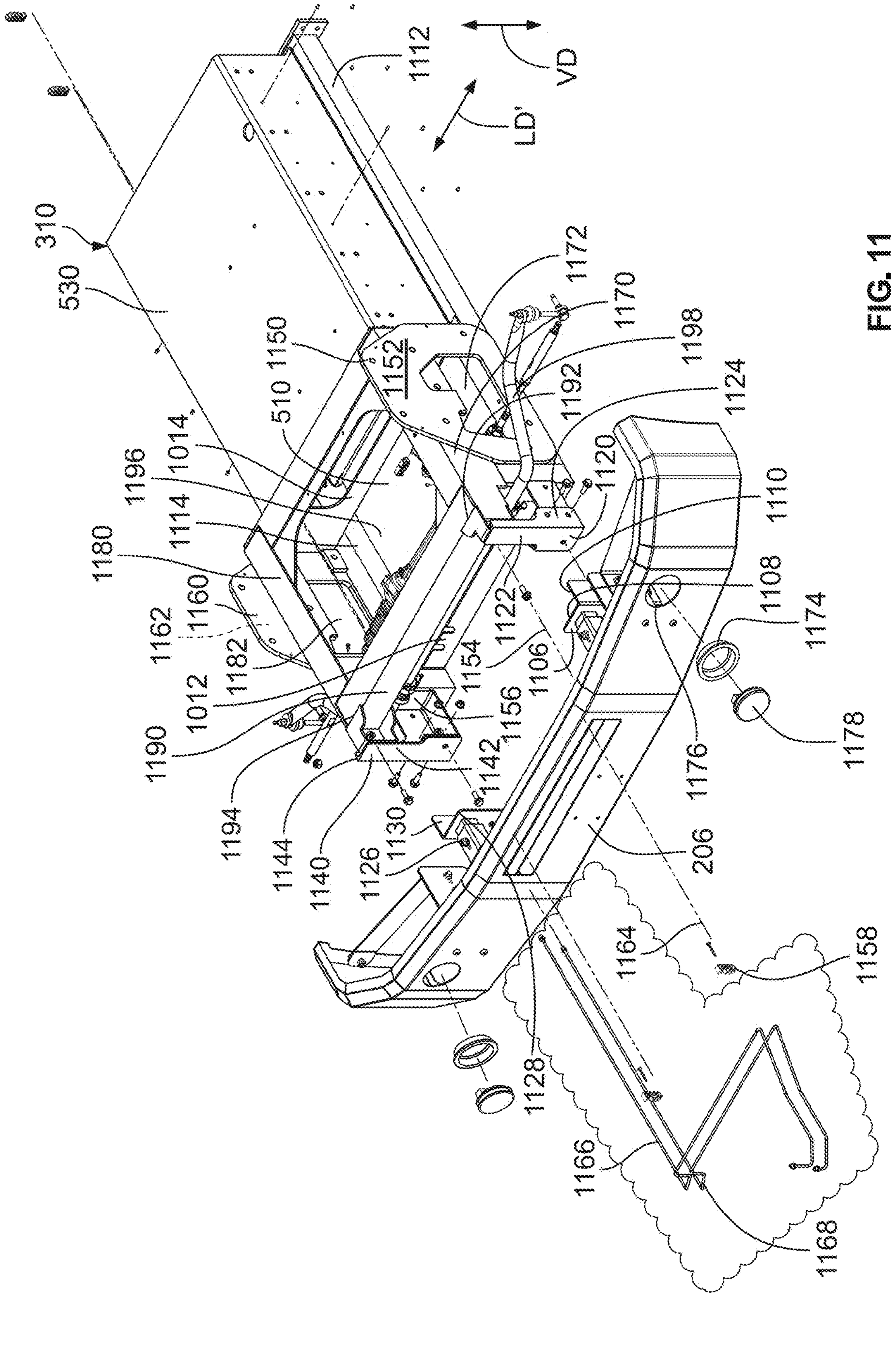
FIG. 11 is a partially exploded perspective view of the part of the chassis shown in FIG. 10 depicting the front suspension subframe assembly and a front bumper mounted thereto with the pair of front suspension assemblies omitted for the sake of clarity.
Figure 34:
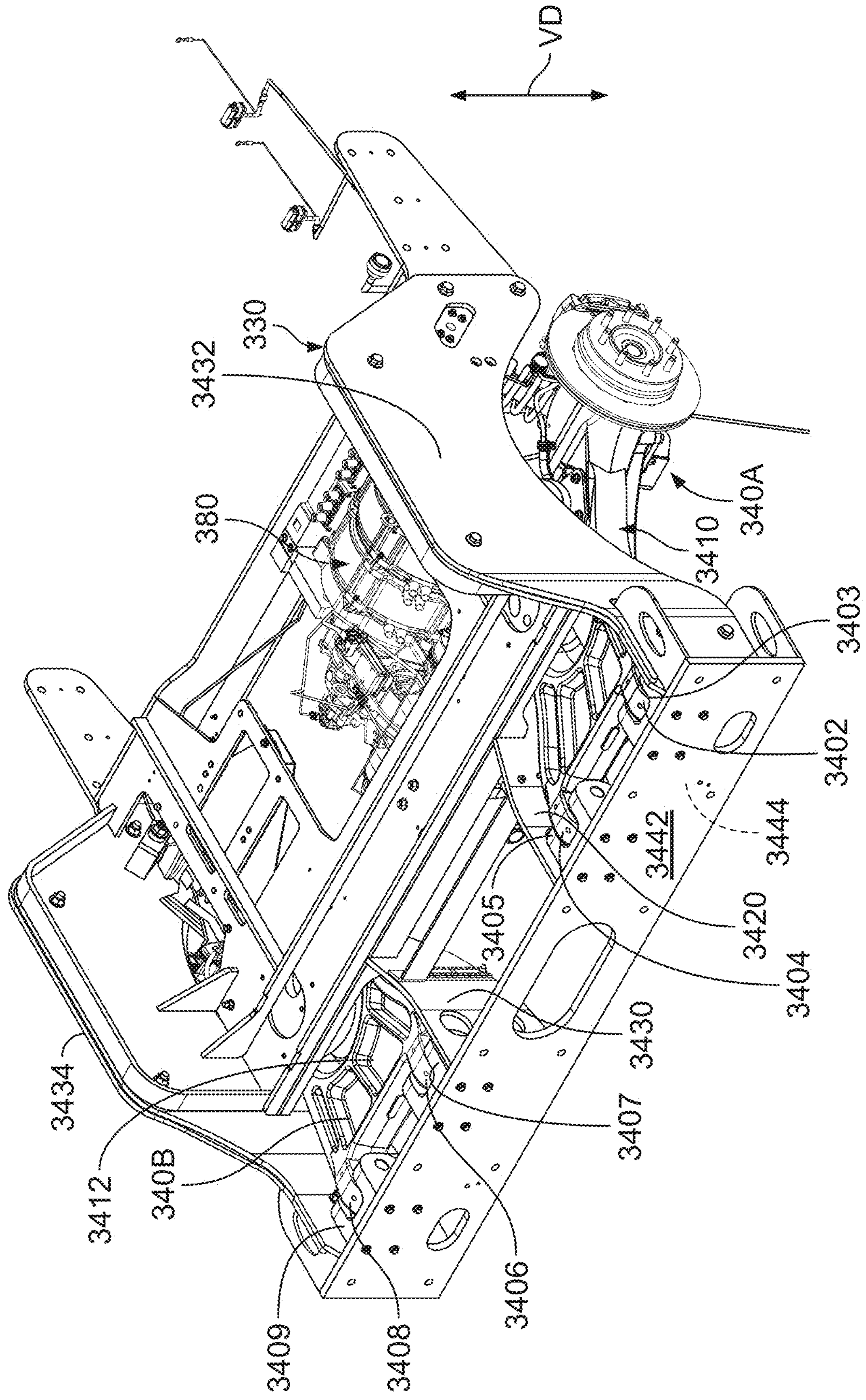
FIG. 34 is a perspective view of part of the chassis similar to FIG. 7 showing the rear suspension subframe assembly with the pair of rear suspension assemblies mounted thereto and the rear crossbeam assembly and the electronic cradle assembly omitted for the sake of clarity.
Figure 35:
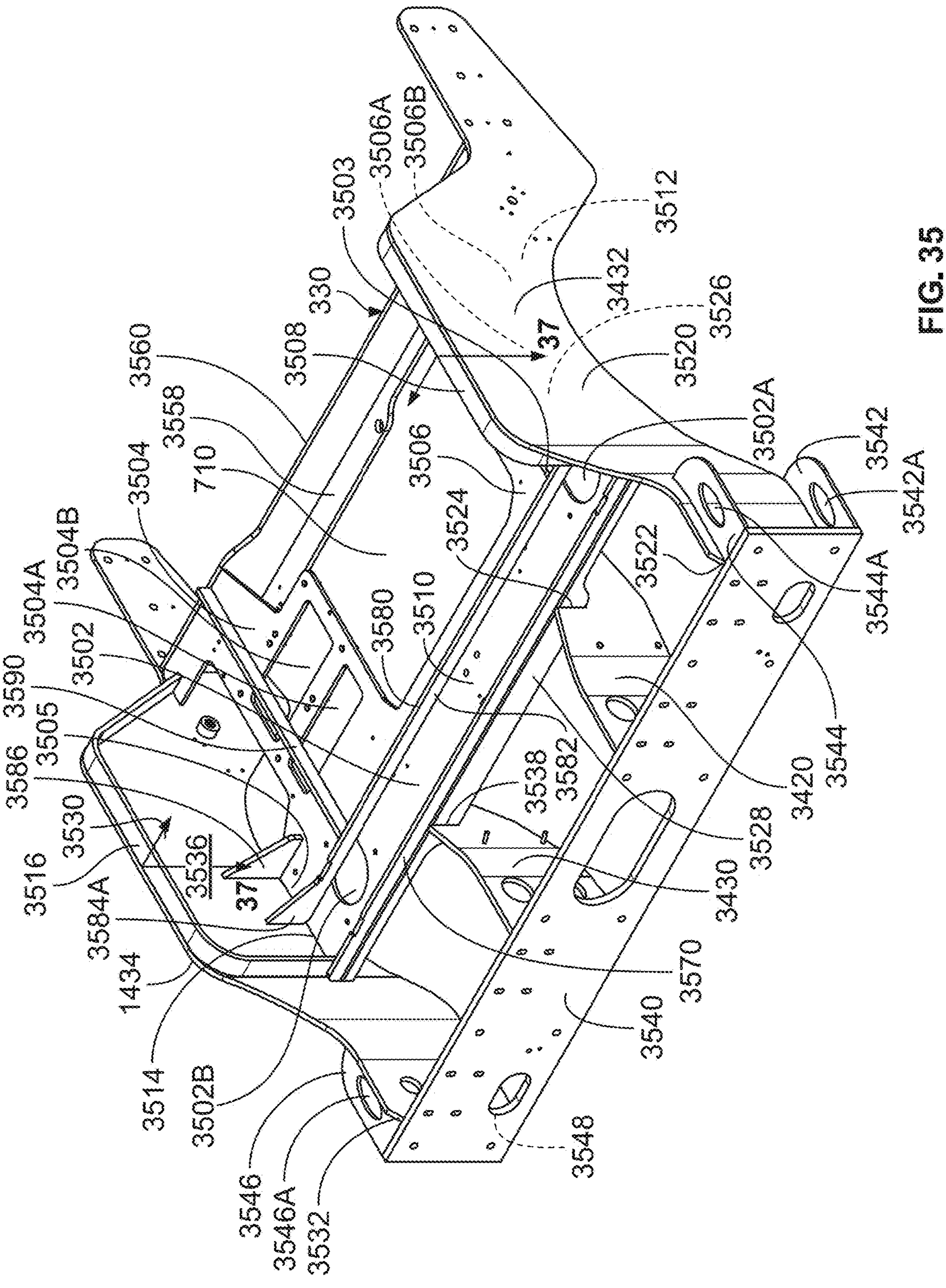
FIG. 35 is a perspective view similar to FIG. 34 of the rear suspension subframe assembly with the pair of rear suspension assemblies and a pair of rear powertrain units omitted for the sake of clarity.

In the illustrative embodiment, the vehicle 200 includes a powertrain unit 360 that is supported by the front suspension subframe assembly 310 and coupled to the front wheels 212. Additionally, the vehicle 200 includes a powertrain unit 380 that is supported by the rear suspension subframe assembly 330 and coupled to the rear wheels 214. As shown in FIGS. 5, 10, and 11, the powertrain unit 360 extends in the lateral direction LD' through opposite sides 1006, 1008 (see FIG. 10) of a cage 1010 of the front suspension subframe assembly 310 such that the powertrain unit 360 is at least partially surrounded by the front suspension subframe assembly 310 at the sides 1006, 1008 of the cage 1010. As shown in FIGS. 34 and 35, the powertrain unit 380 is arranged beneath opposite sides 3432, 3434 of the rear suspension subframe assembly 330 in the vertical direction VD without being surrounded by the opposite sides 3432, 3434.

Figure 3A:
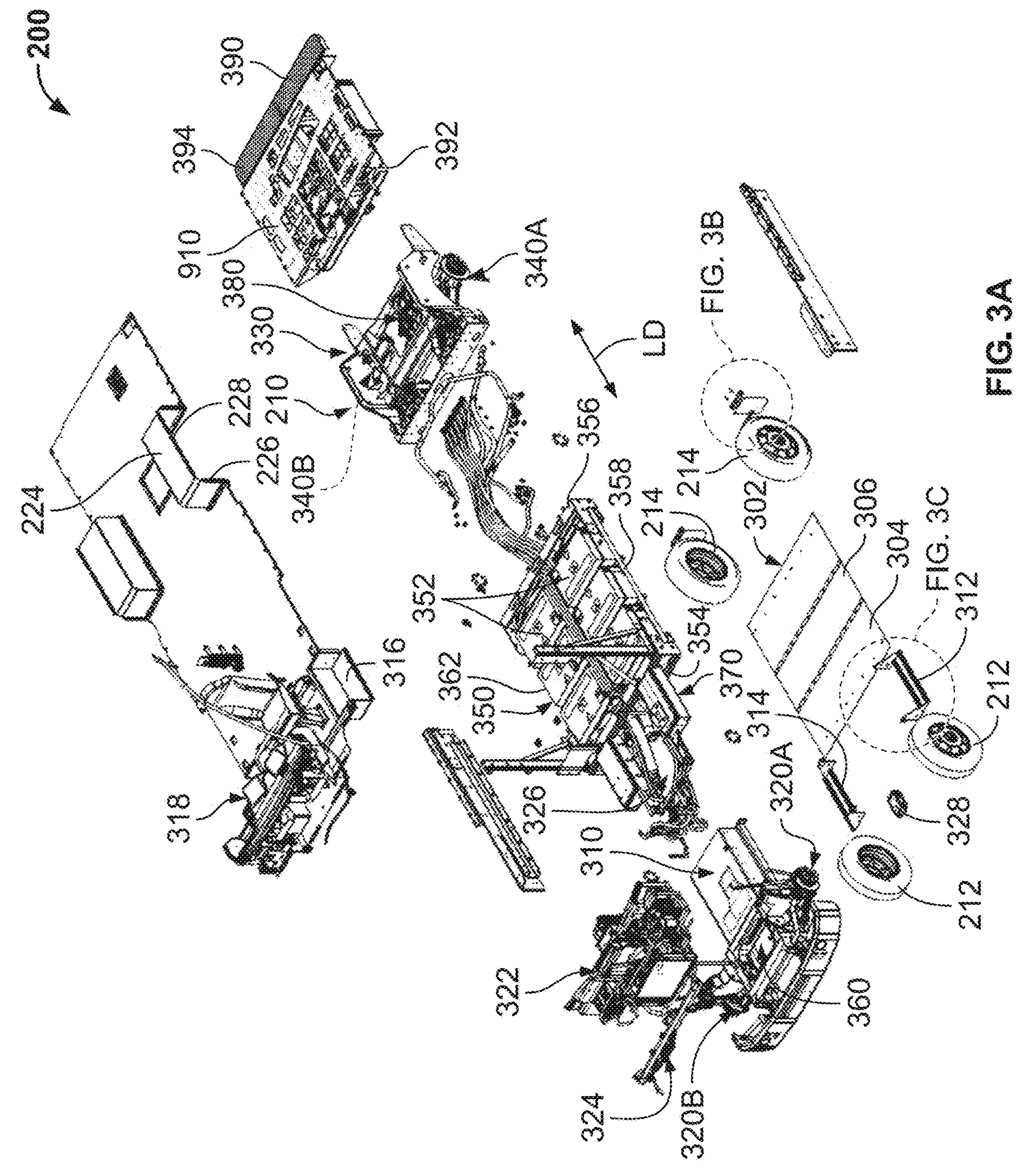
FIG. 3A is a partially exploded perspective view of the vehicle chassis of FIG. 2 depicting various sections or segments of the chassis arranged along a longitudinal axis.

The illustrative front suspension subframe assembly 310 of the chassis 210 includes base rails 1112, 1114 (see FIG. 11) that are spaced from one another in the lateral direction LD'. As shown in FIGS. 3A, 5, and 10, the front suspension assembly 320A is mounted to the base rail 1112 such that the front suspension assembly 320A is arranged outward of the base rail 1112 in the lateral direction LD'. Additionally, the front suspension assembly 320B is mounted to the base rail 1114 such that the front suspension assembly 320B is arranged outward of the base rail 1114 in the lateral direction LD'.

The illustrative rear suspension subframe assembly 330 of the chassis 210 includes a base plate 3510 (see FIG. 35), one frame arch 3520 coupled to the base plate 3510 at one lateral end 3512 thereof that defines the side 3432, and another frame arch 3530 coupled to the base plate 3510 at another lateral end 3514 thereof opposite the end 3512 that defines the side 3434. The rear suspension assembly 340A is mounted to the rear suspension subframe assembly 330 adjacent the frame arch 3520 such that the rear suspension assembly 340A is arranged at least partially inward of the frame arch 3520 in the lateral direction LD'. The rear suspension assembly 340B is mounted to the rear suspension subframe assembly 330 adjacent the frame arch 3530 such that the rear suspension assembly 340B is arranged at least partially inward of the frame arch 3530 in the lateral direction LD'.

Figure 9:
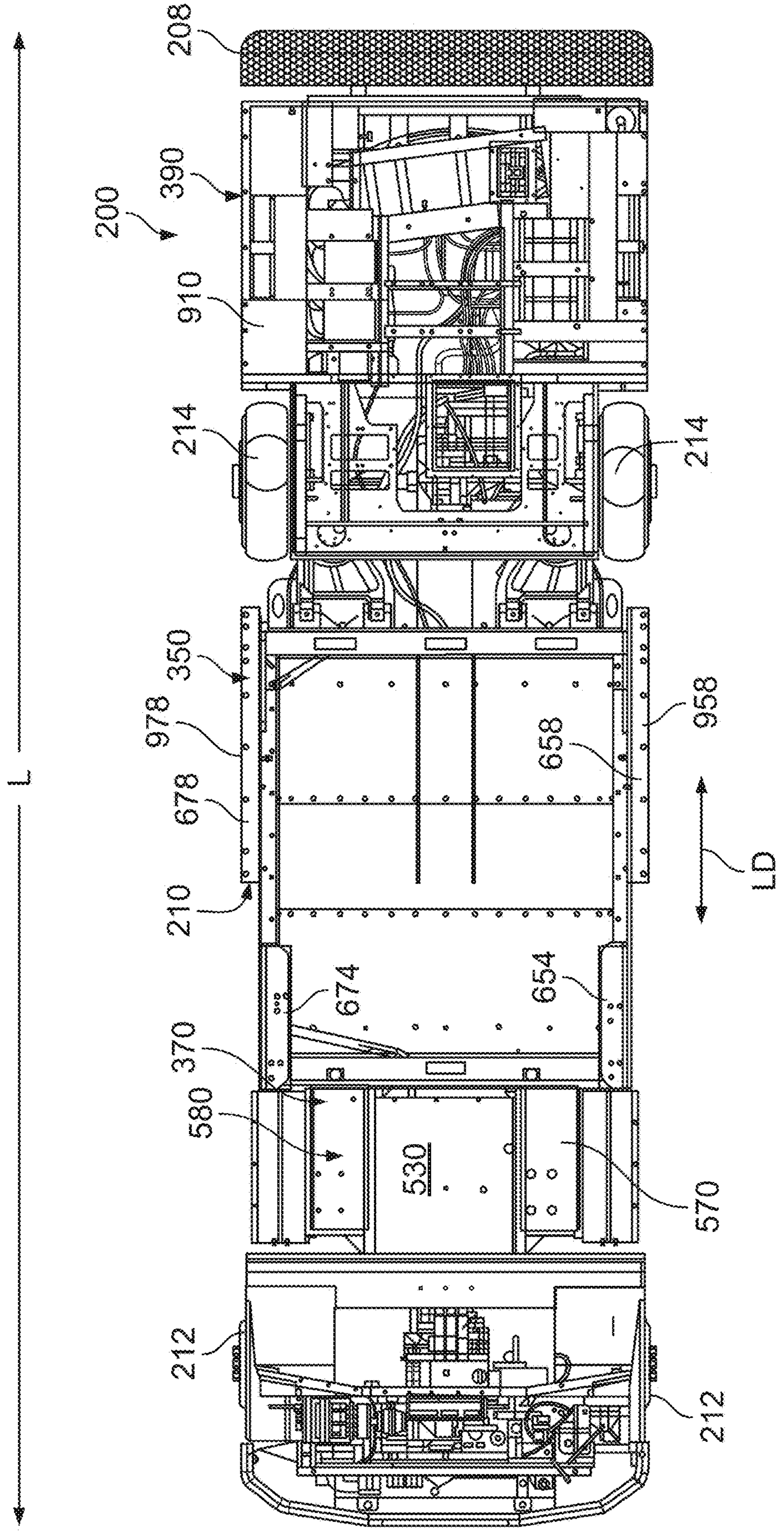
FIG. 9 is a top view of the vehicle chassis of FIG. 2 depicting various sections or segments of the assembled chassis arranged along a longitudinal axis.

The illustrative power source cradle assembly 350 of the chassis 210 is arranged between the front wheels 212 and the rear wheels 214 in the longitudinal direction LD. More specifically, as best seen in FIG. 9, the power source cradle assembly 350 is arranged midway along a length L of the vehicle 200 in the longitudinal direction LD between the front wheels 212 and the rear wheels 214. In the illustrative embodiment, the power source cradle assembly 350 is at least partially defined by, and directly coupled to, the midframe assembly 370, as discussed below.

The power source cradle assembly 350 illustratively includes a crossbeam assembly 610 (see FIG. 6), a crossbeam assembly 630, a sidewall assembly 650, and a sidewall assembly 670. The crossbeam assembly 610 is disposed at a forward end 354 of the power source cradle assembly 350 and extends in the lateral direction LD' between the sidewall assemblies 650, 670. The crossbeam assembly 630 is disposed at a rear end 356 of the power source cradle assembly 350 opposite the forward end 354 and extends in the lateral direction LD' between the sidewall assemblies 650, 670. The sidewall assembly 650 is disposed at a lateral side 358 of the power source cradle assembly 350 and extends in the longitudinal direction LD to couple the crossbeam assembly 610 and the crossbeam assembly 630. The sidewall assembly 670 is disposed at a lateral side 362 of the power source cradle assembly 350 opposite the side 358 and extends in the longitudinal direction LD to couple the crossbeam assembly 610 and the crossbeam assembly 630. In some embodiments, the crossbeam assemblies 610, 630 and the sidewall assemblies 650, 670 cooperatively establish the enclosure 608 for storing the power sources 352.

In some embodiments, the crossbeam assembly 610 may be included in, or otherwise form a portion of, the midframe assembly 370. In such embodiments, the midframe assembly 370 and the power source cradle assembly 350 may cooperatively establish the enclosure 608. Additionally, in some embodiments, the power source cradle assembly 350 at least partially houses a cooling air distribution chamber or plenum 690 (shown in phantom) in the enclosure 608. The plenum 690 may be configured to supply cooling air to the power sources 352 stored in the enclosure 608 to cool the power sources 352 in use thereof. In some embodiments, cooling air may be provided by one or more cooling air sources (e.g., one or more blowers, heat exchangers, or the like) adapted for positioning in the enclosure 608 or another suitable location.

The illustrative electronics cradle assembly 390 of the chassis 210 is arranged rearward of the rear wheels 214 in the longitudinal direction LD. More specifically, as best seen in FIG. 9, the electronics cradle assembly 390 is arranged rearward of the rear wheels 214 and forward of the rear bumper 208 in the longitudinal direction LD. In the illustrative embodiment, the electronics cradle assembly 390 includes a cover plate 910 (see FIG. 9) that extends from a forward end 392 of the electronics cradle assembly 390 to a rear end 394 of the electronics cradle assembly 390 arranged opposite the forward end 392 to at least partially cover the electronic devices supported by the cradle assembly 390 in use thereof.

As shown in FIG. 3A, the illustrative vehicle 200 includes a variety of features in addition to the aforementioned devices, assemblies, and/or systems. Those features include, but are not limited to, the following: a skid plate system 302 arranged beneath at least a portion of the front suspension subframe assembly 310 and/or the midframe assembly 370 in the vertical direction VD that includes skid plates 304 and 306; step supports 312, 314 each affixed to a step platform 316 that is located at least partially beneath the main floor body 222 in the vertical direction VD; an instrument panel assembly 318 arranged in the operator cabin 232 above the main floor body 222 in the vertical direction VD; a firewall assembly 322 arranged between the front bumper 206 and the instrument panel assembly 318 in the longitudinal direction LD; a crossbar assembly 324 coupled to the firewall assembly 322 that extends across the firewall assembly 322 in the lateral direction LD'; one or more wiring harnesses or carriers 326 for routing and/or carrying various electrical cables or wiring that may be arranged at least partially between the front suspension subframe assembly 310 and the midframe assembly 370 in the longitudinal direction LD; and a junction box 328.

Figure 3B:
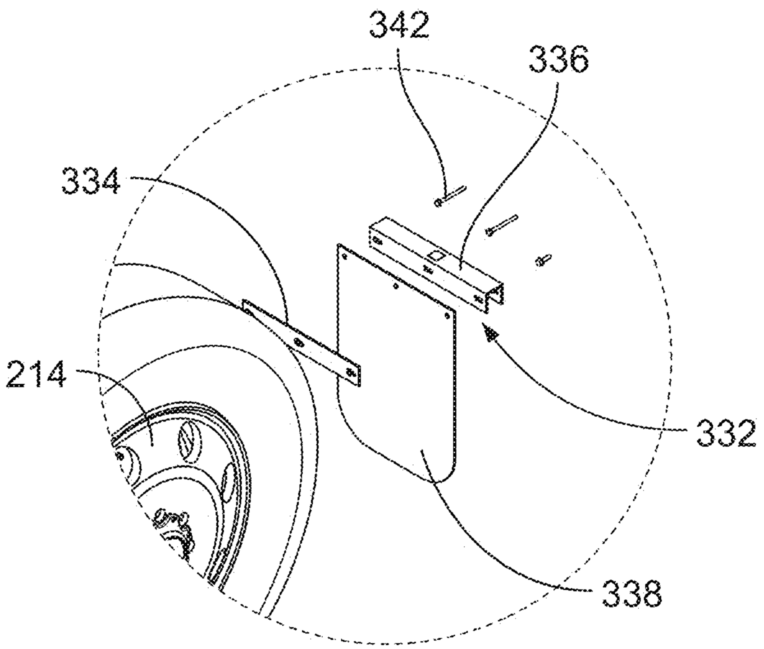
FIG. 3B is a magnified view of one portion of the vehicle chassis of FIG. 3A.

As shown in FIG. 3B, the illustrative vehicle 200 includes a mudflap assembly 332 mounted adjacent to each one of the rear wheels 214. In some embodiments, each mudflap assembly 332 is mounted adjacent to the corresponding rear wheel 214 such that each mudflap assembly 332 is arranged at least partially rearward of the corresponding rear wheel 214 in the longitudinal direction LD. Each mudflap assembly 332 includes a mudflap mount bracket 334, a mudflap support bar 336, a mudflap 338, and one or more fasteners 342. The mudflap mount bracket 334 is mounted to the chassis 210 (e.g., the rear suspension subframe assembly 330). The mudflap support bar 336 is coupled to the mudflap mount bracket 334 using the fasteners 342 when the mudflap 338 is sandwiched between the mudflap mount bracket 334 and the mudflap support bar 336.

Figure 3C:
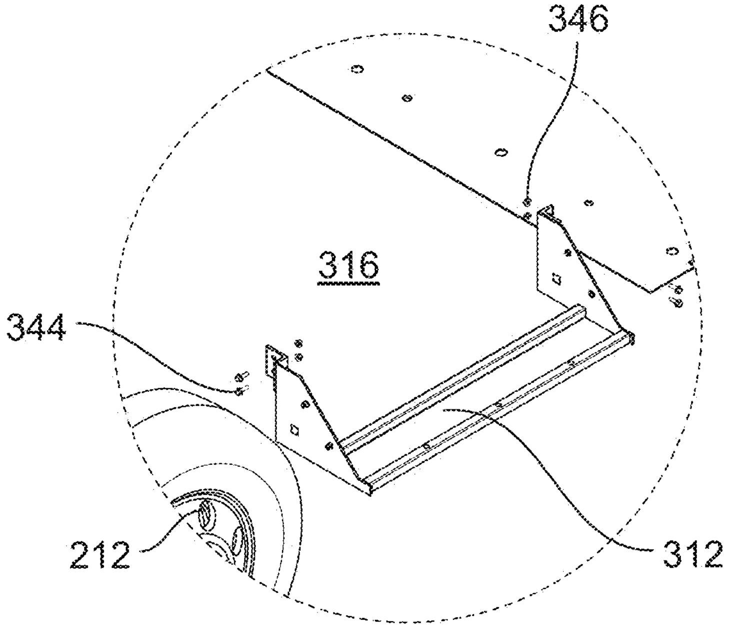
FIG. 3C is a magnified view of another portion of the vehicle chassis of FIG. 3A.

As shown in FIG. 3C, the step supports 312, 314 (note that only step support 312 is depicted) are affixed to the step platforms 316 adjacent to each one of the front wheels 212. In some embodiments, each step support 312, 314 is affixed to the corresponding step platform 316 such that each step support 312, 314 is arranged at least partially rearward of the corresponding front wheel 212 in the longitudinal direction LD. Each step support 312, 314 is affixed to the corresponding step platform 316 using one or more fasteners 344 and one or more locknuts 346.

Figure 4A:
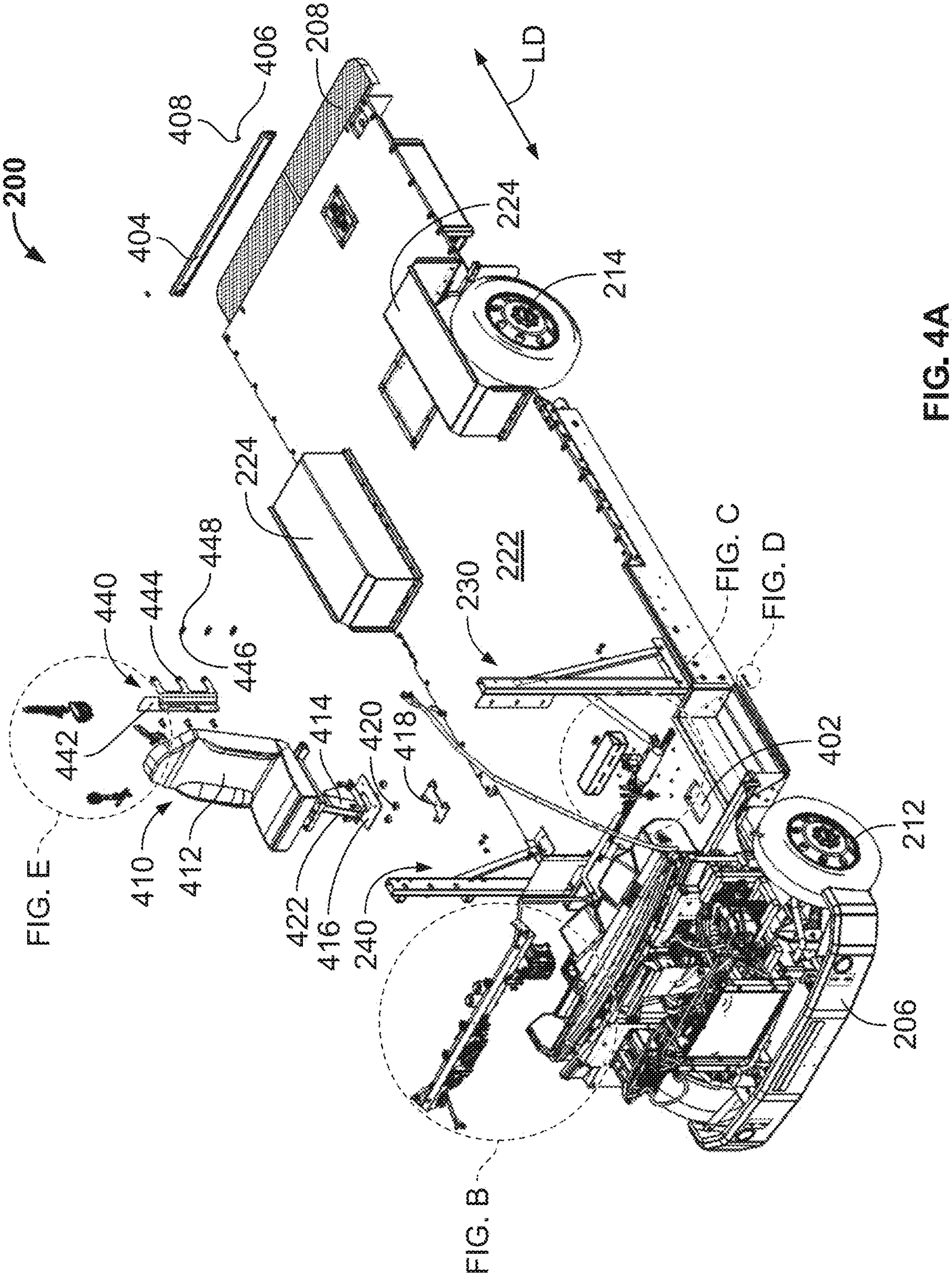
FIG. 4A is a partially exploded perspective view of the vehicle chassis of FIG. 2 showing at least one seat frame assembly de-coupled from the chassis and a pair of seatbelt tower assemblies coupled to the chassis.

Referring now to FIG. 4A, the vehicle 200 is illustrated with the chassis 210 covered by the floor assembly 220 and each of the seatbelt tower assembly 230 and the seat frame assembly 240 mounted to the floor assembly 220. A driver's seat assembly 410 and a driver's seatbelt assembly 440 are illustrated in the partially exploded view of FIG. 4 as being adapted for positioning in the operator cabin 232. The driver's seat assembly 410 includes a driver seat 412, a seat pedestal 414, a seat mount plate 416, a weldment plate 418, spacers 420, and fastener(s) 422. The driver's seatbelt assembly 440 includes a bulkhead mount 442, a seatbelt mount bracket 444, fastener(s) 446, and nut(s) 448.

In the illustrative embodiment, the floor assembly 220 (e.g., the main floor body 222) is formed to include a rectangular cavity 402 disposed in the operator cabin 232. In some embodiments, the cavity 402 may extend in the vertical direction VD through the floor assembly 220 to the chassis 210. The driver's seat 412 is coupled to and supported above the floor assembly 220 by the seat pedestal 414, and the seat pedestal 414 is mounted to the floor assembly 220 and/or the chassis 210 using the seat mount plate 416, the weldment plate 418, the spacers 420, and the fasteners 422. In the illustrative mounting arrangement, the spacers 420 are arranged between the seat mount plate 416 and the weldment plate 418 in the vertical direction VD. In some embodiments, when the seat assembly 410 is mounted in the cabin 232, one or more of the seat mount plate 416, the weldment plate 418, and the spacers 420 are at least partially positioned in the cavity 402. Additionally, in some embodiments, when the seat assembly 410 is mounted in the cabin 232, at least one component thereof (e.g., the weldment plate 418) indirectly or directly contacts the front suspension subframe assembly 310 of the chassis 210.

In the illustrative embodiment, the driver's seatbelt assembly 440 is adapted for securement to a bulkhead (not shown) at least partially positioned in the operator cabin 232. More specifically, the bulkhead mount 442 is configured for direct interaction and/or contact with the bulkhead and the seatbelt mount bracket 444 may be coupled to the bulkhead mount 442 using the fasteners 446 and the nuts 448. In some embodiments, the fasteners 446 may be identical or substantially identical to the fasteners 422. Additionally, in some embodiments, when the seatbelt assembly 440 is secured to the bulkhead, the seatbelt assembly 440 may be at least partially supported by the seatbelt tower assembly 230.

A rear bumper plate 404 is illustratively included in the rear bumper 208 as shown in FIG. 4A. The rear bumper plate 404 may be mounted to the chassis 210 (e.g., the electronics cradle assembly 390) using one or more fasteners 406 and one or more nuts 408. In the illustrative embodiment, a number of sensors configured for interaction with, and/or mounting to, the rear bumper plate 404 are omitted.

Figure 4B:
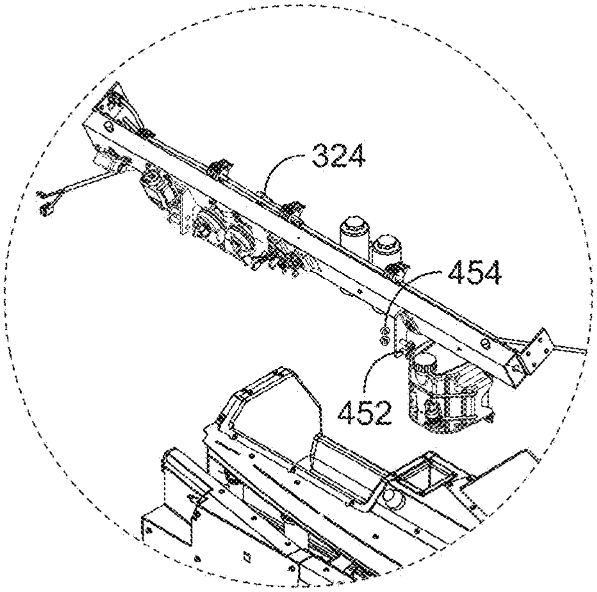
FIG. 4B is a magnified view of one portion of the vehicle chassis of FIG. 4A.

As shown in FIG. 4B, the crossbar assembly 324 is adapted to be coupled to the firewall assembly 322 using one or more fasteners 452 and one or more nuts 454. In some embodiments, when the crossbar assembly 324 is coupled to the firewall assembly 322, the assemblies 322, 324 are arranged beneath a hood (not shown) of a body of the vehicle 200. Additionally, in some embodiments, the assemblies 322, 324 may include, or otherwise provide, structural reinforcement features configured for deformation in response to impact forces applied proximate the front end 202 of the vehicle 200.

Figure 4C:
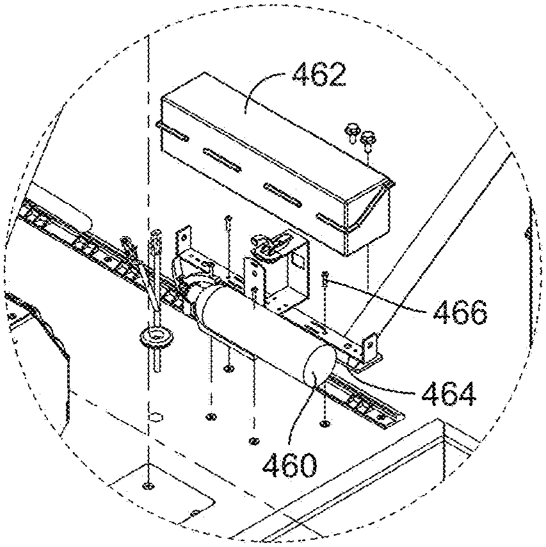
FIG. 4C is a magnified view of another portion of the vehicle chassis of FIG. 4A.

As shown in FIG. 4C, the illustrative vehicle 200 includes a fire extinguisher 460, a triangle kit 462, a mounting bracket 464, and one or more fasteners 466. In some embodiments, the fire extinguisher 460 is removably attached to the floor assembly 220 (e.g., the main floor body 222) such that the fire extinguisher 460 is arranged between the cavity 402 and the seatbelt tower assembly 230 in the longitudinal direction LD. Additionally, in some embodiments, the triangle kit 462 is removably mounted to the floor assembly 220 (e.g., the main floor body 222) using the mounting bracket 464 and the fasteners 466 such that the triangle kit 464 is arranged between the cavity 402 and the seatbelt tower assembly 230 in the longitudinal direction LD. Further, in some embodiments, when the fire extinguisher 460 and the triangle kit 462 are attached to the floor assembly 220, the fire extinguisher 460 and the triangle kit 462 are arranged in the vertical direction VD below the driver's seat assembly 410.

Figure 4D:
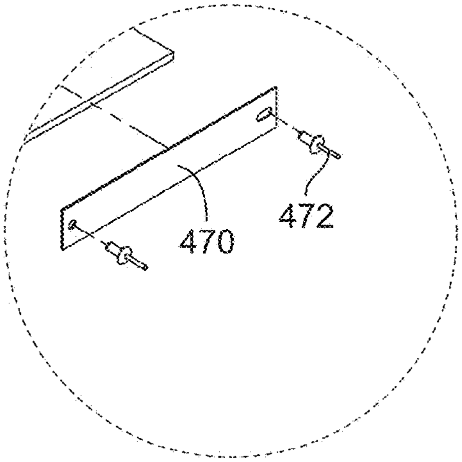
FIG. 4D is a magnified view of yet another portion of the vehicle chassis of FIG. 4A

As shown in FIG. 4D, the illustrative vehicle 200 includes a plate 470 that may be coupled to a suitable structure using one or more rivets 472. In one example, the plate 470 may be coupled to a structure (e.g., the instrument panel assembly 318) arranged in the operator cabin 232. In another example, the plate 470 may be coupled to a structure of the floor assembly 220 (e.g., one of the step platforms 316 or one of the step supports 312, 314) and arranged in close proximity to the operator cabin 232. In yet another example, the plate 470 may be coupled to a structure of the chassis 210 (e.g., the front suspension subframe assembly 310) and arranged in close proximity to the operator cabin 232. Regardless, in some embodiments, the plate 470 may include vehicle identification information (e.g., the vehicle identification number (VIN)) for the vehicle 200.

Figure 4E:
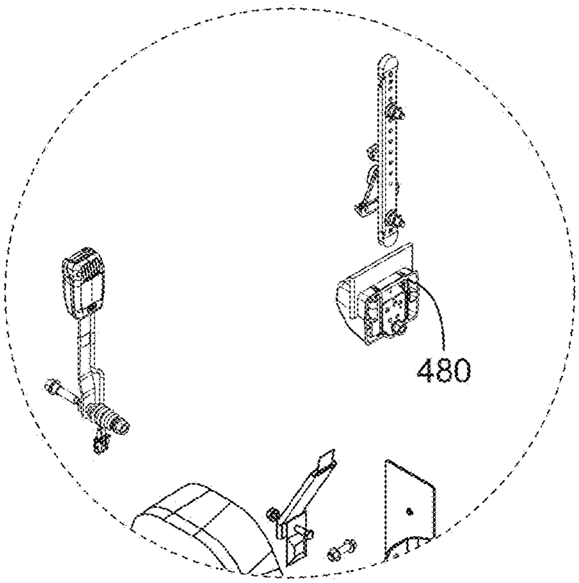
FIG. 4E is a magnified view of another portion still of the vehicle chassis of FIG. 4A.

As shown in FIG. 4E, the illustrative vehicle 200 includes a seatbelt mechanism 480 adapted for inclusion in the driver's seatbelt assembly 440. In one example, the seatbelt mechanism 480 may be directly coupled to the bulkhead mount 442 and/or the seatbelt mount bracket 444. In another example, the seatbelt mechanism 480 may be directly coupled to one or more structures included in the seatbelt tower assembly 230. In any case, in some embodiments, the seatbelt mechanism 480 includes, or is otherwise embodied as, a 3-point seat belt/lap belt mechanism.

Referring now to FIG. 5, the illustrative front suspension subframe assembly 310 includes a powertrain unit cradle 510 and a base block 530 coupled to the powertrain unit cradle 510 and arranged rearward of the powertrain unit cradle 510 in the longitudinal direction LD. The powertrain unit cradle 510 at least partially houses the powertrain unit 360 of the vehicle 200. The powertrain unit cradle 510 and the base block 530 are illustratively mounted to and supported by the base rails 1112, 1114.

The illustrative midframe assembly 370 includes support arm structures 570, 580 that are spaced apart from one another in the lateral direction LD'. As best seen in FIG. 9, when the vehicle 200 is assembled, the front suspension subframe assembly 310 is coupled to the midframe assembly 370 such that the base block 530 is arranged between the support arm structures 570, 580 in the lateral direction LD'. Additionally, when the vehicle 200 is assembled, the front suspension subframe assembly 310 is coupled to the midframe assembly 370 such that the base block 530 is aligned with the support arm structures 570, 580 in the longitudinal direction LD.

In some embodiments, when the front suspension subframe assembly 310 is coupled to the midframe assembly 370, the support arm structure 570 interfaces with, and may be directly coupled to, the base rail 1112. Additionally, in some embodiments, when the front suspension subframe assembly 310 is coupled to the midframe assembly 370, the support arm structure 580 interfaces with, and may be directly coupled to, the base rail 1114. In any case, in the illustrative embodiment, when the front suspension subframe assembly 310 is coupled to the midframe assembly 370, the base block 530 and the rails 1112, 1114 are at least partially received in a gap 572 extending in the lateral direction LD' between the support arm structures 570, 580.

As shown in FIG. 5, the illustrative vehicle 200 includes a variety of features in addition to the aforementioned devices, assemblies, and/or systems. Those features include, but are not limited to, the following: an oval trim piece 540 coupled to the crossbeam assembly 610 such that the trim piece 540 surrounds a central aperture 618 formed in the crossbeam assembly 610; a trim piece 544 at least partially disposed in the cage 1010 of the front suspension subframe assembly 310; a brake line connector 546 at least partially disposed in the cage 1010; one or more grommets 548; one or more fasteners 550; one or more fasteners 552 that may be distinguishable from the fasteners 550; one or more fasteners 554 that may be distinguishable from the fasteners 550, 552; one or more nuts 556; and one or more nuts 558 that may be distinguishable from the nuts 556.

Figure 6:
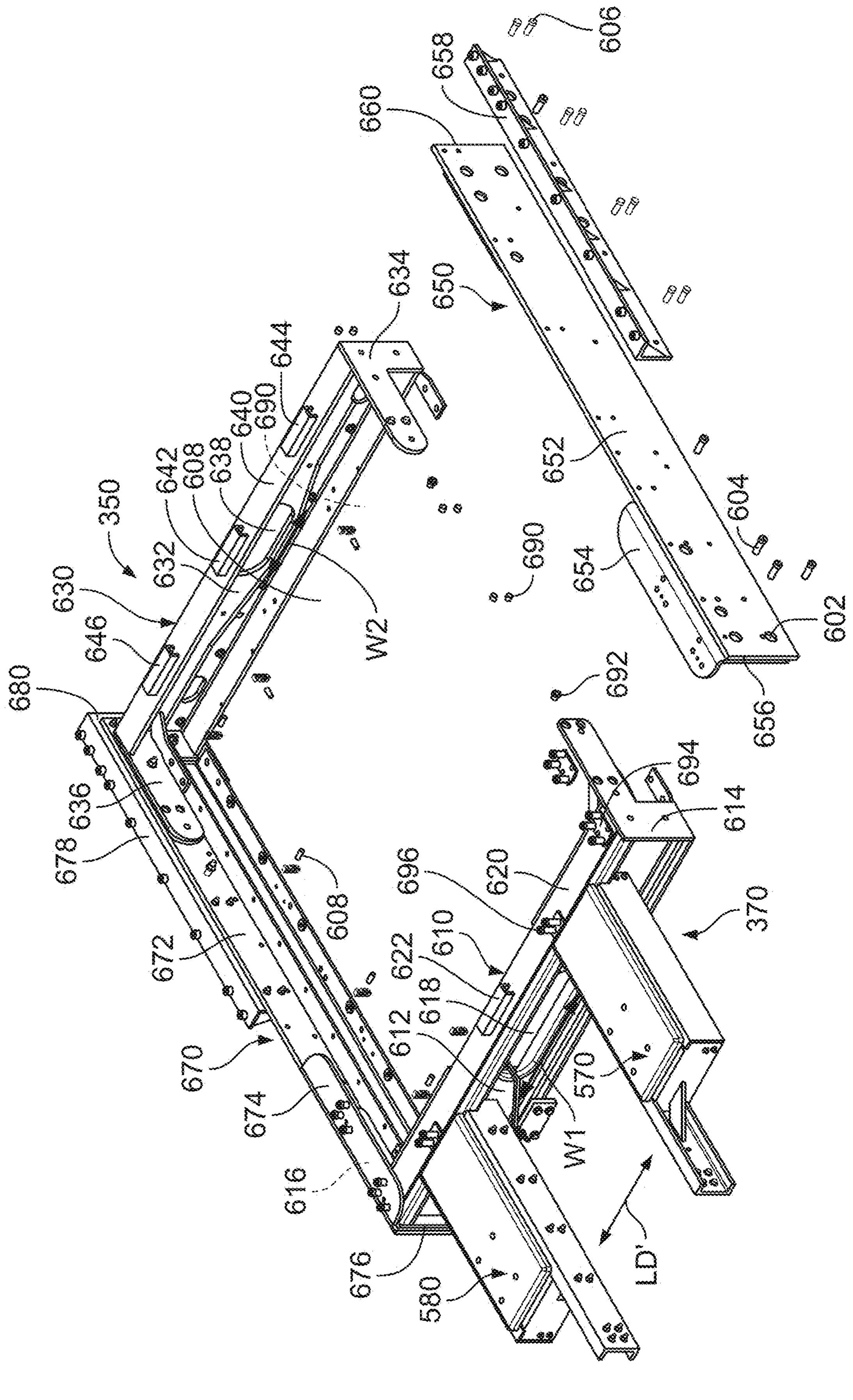
FIG. 6 is a perspective view of part of the chassis of FIG. 3A with certain features omitted for the sake of clarity that illustrates the midframe assembly coupled to various structures to at least partially define a power source cradle assembly.

Referring now to FIG. 6, in the illustrative embodiment, the support arm structures 570, 580 of the midframe assembly 370 are directly affixed to the crossbeam assembly 610 of the power source cradle assembly 350 which extends in the lateral direction LD' to couple the structures 570, 580 to one another. In some embodiments, the crossbeam assembly 610 may be said to at least partially define the midframe assembly 370. The crossbeam assembly 610, the crossbeam assembly 630, and the sidewall assemblies 650, 670 of the power source cradle assembly 350 are illustratively provided as separate structures coupled to one another to establish the enclosure 608. The illustrative enclosure 608 has a rectangular shape. Of course, in other embodiments, the enclosure 608 may take the shape of other suitable geometric forms.

In the illustrative embodiment, the crossbeam assemblies 610, 630 are structurally distinguishable from one another in at least one aspect. In other embodiments, however, the crossbeam assemblies 610, 630 may be identical or substantially identical to one another. Regardless, the illustrative crossbeam assemblies 610, 630 define opposite ends of the power source cradle assembly 350 in the longitudinal direction LD.

As shown in FIGS. 5 and 6, the illustrative crossbeam assembly 610 includes a main body panel 612 arranged to extend in the lateral direction LD' between mount brackets 614, 616 coupled to the main body panel 612 at opposite lateral sides thereof. The mount brackets 614, 616 extend in the longitudinal direction LD toward corresponding structures included in the crossbeam assembly 630. The mount bracket 614 and a corresponding structure of the crossbeam assembly 630 are directly affixed to a sidewall panel 652 of the sidewall assembly 650. The mount bracket 616 and a corresponding structure of the crossbeam assembly 630 are directly affixed to a sidewall panel 672 of the sidewall assembly 670.

The main body panel 612 of the crossbeam assembly 610 is formed to include the central aperture 618 extending therethrough that is located midway between the mount brackets 614, 616 in the lateral direction LD'. The aperture 618 has a width W1 in the lateral direction LD'. In the illustrative embodiment, an upwardly-facing surface 620 of the main body panel 612 in the vertical direction VD is coupled to a standoff bar 622. The standoff bar 622 is aligned with the central aperture 618 in the lateral direction LD'.

As shown in FIG. 6, the illustrative crossbeam assembly 630 includes a main body panel 632 arranged to extend in the lateral direction LD' between mount brackets 634, 636 coupled to the main body panel 632 at opposite lateral sides thereof. The mount brackets 634, 636 extend in the longitudinal direction LD toward corresponding mount brackets 614, 616 of the crossbeam assembly 610. The mount bracket 634 and the mount bracket 614 are directly affixed to the sidewall panel 652 of the sidewall assembly 650. The mount bracket 636 and the mount bracket 616 are directly affixed to the sidewall panel 672 of the sidewall assembly 670.

The main body panel 632 of the crossbeam assembly 630 is formed to include a central aperture 638 extending therethrough that is located midway between the mount brackets 634, 636 in the lateral direction LD'. The aperture 638 has a width W2 in the lateral direction LD' that is less than the width W1 of the aperture 618, at least in some embodiments. In the illustrative embodiment, an upwardly-facing surface 640 of the main body panel 632 in the vertical direction VD is coupled to standoff bars 642, 644, 646. The standoff bar 642 is aligned with the central aperture 638 in the lateral direction LD'. The standoff bars 644, 646 are arranged on opposite sides of the standoff bar 642.

In the illustrative embodiment, the sidewall assemblies 650, 670 are identical or substantially similar to one another. In other embodiments, however, the sidewall assemblies 650, 670 may be distinguishable from one another in at least one aspect. In any case, the illustrative sidewall assemblies 650, 670 define opposite exterior sides of the power source cradle assembly 350 in the lateral direction LD'.

The illustrative sidewall assembly 650 includes a sidewall panel 652 and a flap or tab 654 interconnected with the sidewall panel 652. The sidewall panel 652 has a rectangular shape and is arranged to extend in the vertical direction VD. The flap 654 is interconnected with the sidewall panel 652 such that the flap 654 extends in the lateral direction LD' (which may also be referred to as a horizontal direction) perpendicular or substantially perpendicular to the vertical direction VD. In the illustrative embodiment, the sidewall panel 652 is integral with or integrally formed with the flap 654. In other embodiments, the sidewall panel 652 and the flap 654 may be provided as separate structures that are coupled to one another.

The illustrative flap 654 is disposed at a forward end 656 of the sidewall assembly 650. The sidewall assembly 650 also includes a floor support bar 658 that is coupled to the sidewall panel 652 and positioned for direct contact with an overlying structure (e.g., the main floor body 222). In some embodiments, when coupled to the sidewall panel 652, the floor support bar 658 extends above the sidewall panel 652 in the vertical direction VD. In any case, the floor support bar 658 is disposed at a rear end 660 of the sidewall assembly 650 arranged opposite the forward end 656.

The illustrative sidewall assembly 670 includes a sidewall panel 672 and a flap or tab 674 interconnected with the sidewall panel 672. The sidewall panel 672 has a rectangular shape and is arranged to extend in the vertical direction VD. The flap 674 is interconnected with the sidewall panel 672 such that the flap 674 extends in the lateral direction LD' perpendicular or substantially perpendicular to the vertical direction VD. In the illustrative embodiment, the sidewall panel 672 is integral with or integrally formed with the flap 674. In other embodiments, the sidewall panel 672 and the flap 674 may be provided as separate structures that are coupled to one another.

The illustrative flap 674 is disposed at a forward end 676 of the sidewall assembly 670. The sidewall assembly 670 also includes a floor support bar 678 that is coupled to the sidewall panel 672 and positioned for direct contact with an overlying structure (e.g., the main floor body 222). In some embodiments, when coupled to the sidewall panel 672, the floor support bar 678 extends above the sidewall panel 672 in the vertical direction VD. In any case, the floor support bar 678 is disposed at a rear end 680 of the sidewall assembly 670 arranged opposite the forward end 676.

As shown in FIG. 6, the illustrative vehicle 200 includes a variety of features in addition to the aforementioned devices, assemblies, and/or systems. Those features include, but are not limited to, the following: one or more washers 602; one or more fasteners 604; one or more fasteners 606 that may be distinguishable from the fasteners 604; one or more fasteners 608 that may be distinguishable from the fasteners 604, 606; one or more nuts 690; one or more nuts 692 that may be distinguishable from the nuts 690; one or more weldments 694; and one or more weldments 696 that may be distinguishable from the weldments 694.

Figure 7:
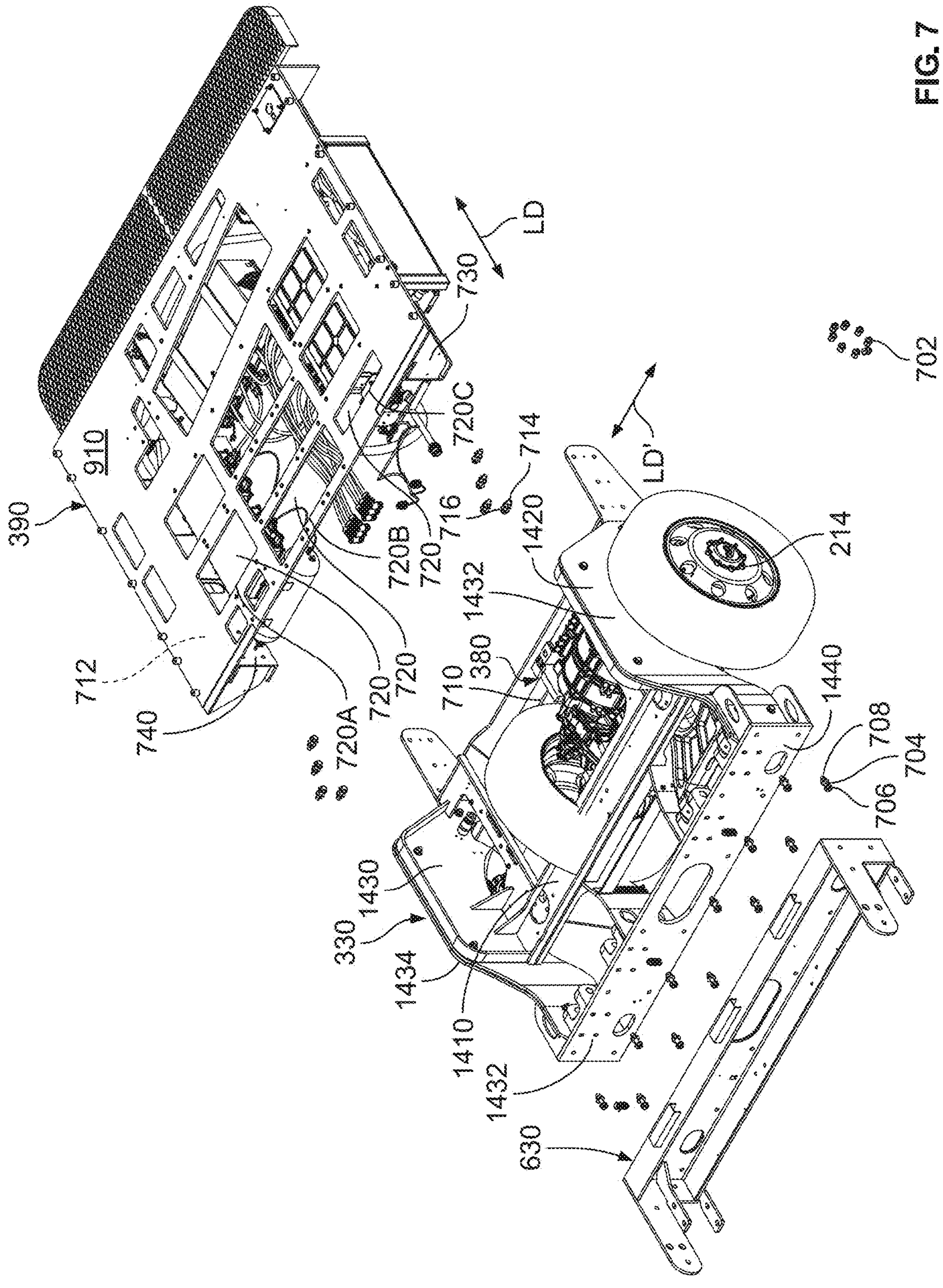
FIG. 7 is a perspective view of part of the chassis of FIG. 3A with certain features omitted for the sake of clarity that illustrates a rear crossbeam assembly of the power source cradle assembly, a pair of rear suspension assemblies mounted to a rear suspension subframe assembly of the chassis, and an electronics cradle assembly supporting a plurality of electronic devices of the vehicle.

Referring now to FIG. 7, the crossbeam assembly 630 of the power source cradle assembly 350 is arranged adjacent to, and forward of, the rear suspension subframe assembly 330 in the longitudinal direction LD. As discussed above, the rear suspension subframe assembly 330 supports the pair of rear suspension assemblies 340A, 340B and the powertrain unit 380, and the suspension assemblies 340A, 340B and the powertrain unit 380 are likewise arranged rearward of the crossbeam assembly 630 in the longitudinal direction LD. The electronics cradle assembly 390 is arranged rearward of the rear suspension assemblies 340A, 340B and the powertrain unit 380 in the longitudinal direction LD.

As mentioned above, the rear suspension subframe assembly 330 includes the base plate 3510, the frame arch 3520, and the frame arch 3530. The rear suspension subframe assembly 330 also includes a faceplate 3540 (see FIG. 35) that is coupled to the frame arches 3520, 3530 at respective forward ends 3522, 3532 thereof. An exterior side 3442 of the faceplate 3540 is arranged in confronting relation to the crossbeam assembly 630 and spaced from (e.g., arranged forward of) the base plate 3510 in the longitudinal direction LD. The base plate 3510 includes a central cavity 710 in which the powertrain unit 380 is at least partially positioned.

The cover plate 910 of the illustrative electronics cradle assembly 390 extends rearward of the base plate 3510 and at least a portion of each of the frame arch 3520 and the frame arch 3530 in the longitudinal direction LD. In the illustrative embodiment, the cover plate 910 is formed to include slots 720. The slots 720 include at least three slot rows 720A, 720B, 720C that are spaced from one another in the lateral direction LD'. In at least some embodiments, provision of the slots 720 in the cover plate 910 may facilitate dissipation of heat produced by electronic devices supported by the cradle assembly 390 in use thereof.

The illustrative electronics cradle assembly 390 includes two channel feet 730, 740 coupled to an underside 712 (shown in phantom) of the cover plate 910. The channel feel 730, 740 are spaced from one another in the lateral direction LD' when coupled to the cover plate 910. In the illustrative embodiment, each of the channel feet 730, 740 has a C-shaped cross-section.

As shown in FIG. 7, the illustrative vehicle 200 includes a variety of features in addition to the aforementioned devices, assemblies, and/or systems. Those features include, but are not limited to, the following: one or more wheel lug nuts 702; one or more washers 704; one or more fasteners 706; one or more nuts 708; one or more fasteners 714 that may be distinguishable from the one or more fasteners 706; and one or more nuts 716 that may be distinguishable from the one or more nuts 708.

Figure 8A:
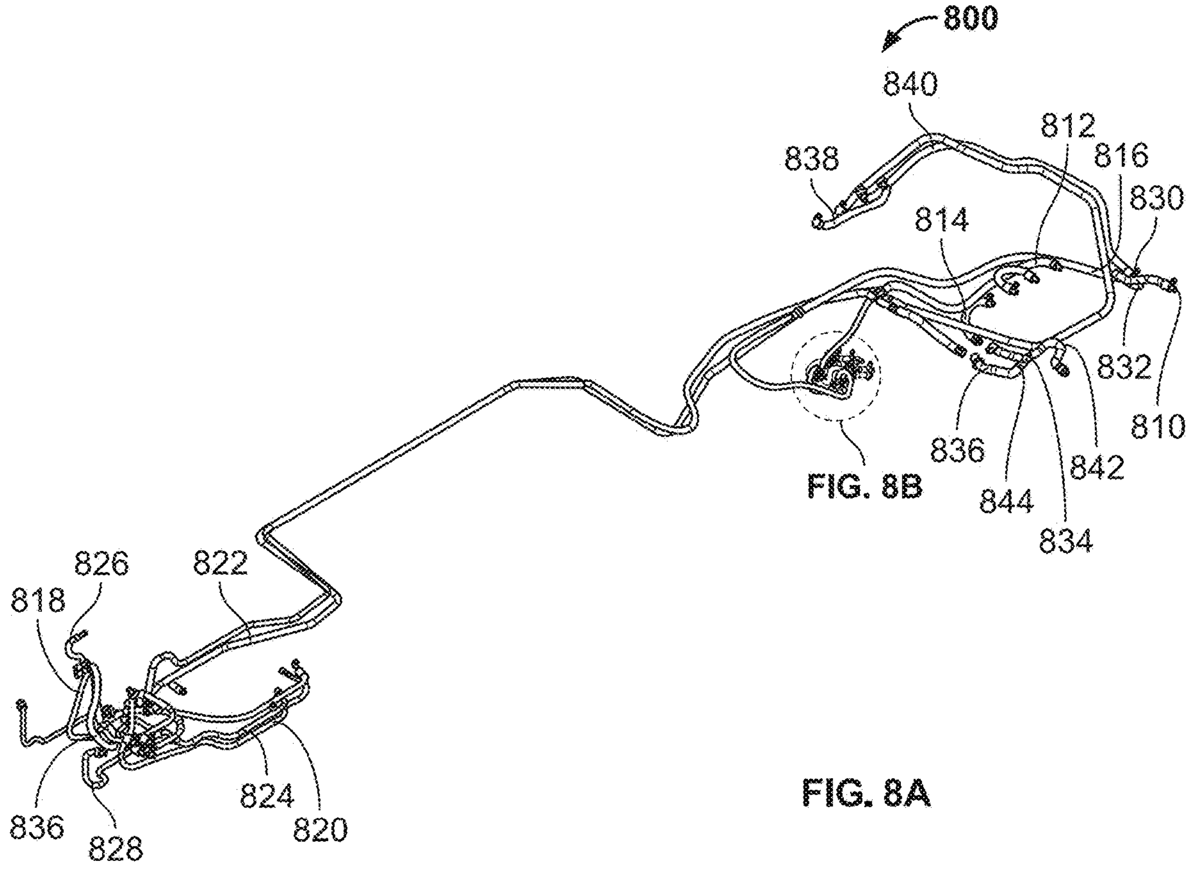
FIG. 8A is a perspective view of part of the chassis of FIG. 3A with certain features omitted for the sake of clarity that illustrates a collection of hoses or cables for supplying electrical power to various devices.

Referring now to FIG. 8A, the illustrative vehicle 200 includes a network 800 of components that may be used to deliver electrical power to various electronic devices of the vehicle 200. As discussed below, some components of the network 800 include, or are otherwise embodied as, electrical hoses, hose kits, cables, or segments thereof capable of delivering electrical power (e.g., power produced by the power sources 352) to various electronic devices of the vehicle 200. In some embodiments, the electrical hoses and/or cables included in the network 800 may be routed from the electronics cradle assembly 390 to electronic devices arranged in other sections of the multi-segment chassis 210, such as one or more electronic devices arranged in the front suspension subframe assembly 310, the rear suspension subframe assembly 330, the power source cradle assembly 350, and/or the midframe assembly 370, for example.

The illustrative network 800 includes a hose clamp 810, a hose or hose kit 812, a hose 814, a hose or hose kit 816, a hose or hose kit 818, a hose 820, a hose or hose kit 822, a hose or hose kit 824, a hose or hose kit 826, a hose 828, a fitting 830, a hose 832, a fitting 834, a hose 836, a hose 838, a hose 840, a hose 842, and a hose 844. It should be appreciated that each of the hoses or hose kits 812, 814, 816, 818, 820, 822, 824, 826, 828, 832, 836, 838, 840, 842, 844 may be routed in the longitudinal direction LD between the electronics cradle assembly 390 and one of more sections of the chassis 210 arranged forward of the cradle assembly 390. It should also be appreciated that when routed between the electronics cradle assembly 390 and one of more sections of the chassis 210 arranged forward thereof, each of the hoses or hose kits 812, 814, 816, 818, 820, 822, 824, 826, 828, 832, 836, 838, 840, 842, 844 may be retained and/or secured with one or more clamps (e.g., the hose clamp 810), ties, or the like. Further, it should be appreciated that the hoses or hose kits 812, 814, 816, 818, 820, 822, 824, 826, 828, 832, 836, 838, 840, 842, 844 may be coupled to one another with one or more fittings (e.g., the fittings 830, 834) and/or quick disconnect couplings.

Figure 8B:
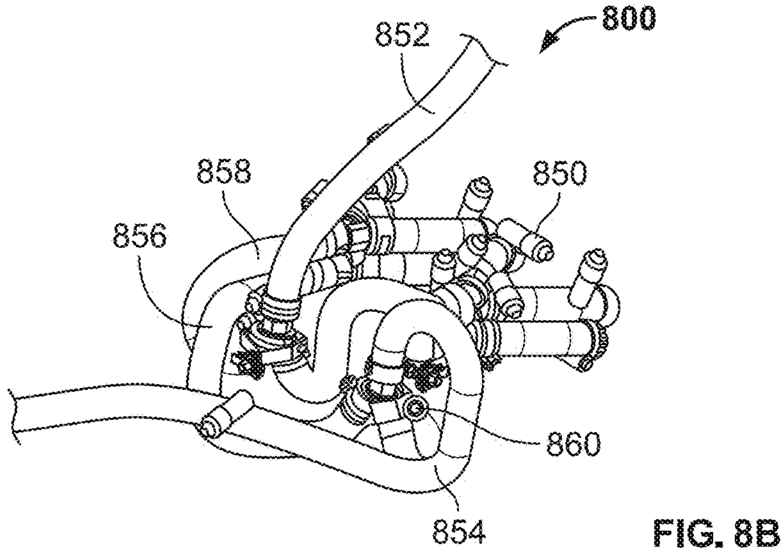
FIG. 8B is a magnified view of one portion of the collection of hoses of FIG. 8A.

Referring now to FIG. 8B, the illustrative network 800 includes a hose clamp 850, a hose 852, a hose 854, a hose 856, a hose 858, and a fitting 860. It should be appreciated that each of the hoses 852, 854, 856, 858 may be routed in the longitudinal direction LD between the electronics cradle assembly 390 and one of more sections of the chassis 210 arranged forward of the cradle assembly 390. It should also be appreciated that when routed between the electronics cradle assembly 390 and one of more sections of the chassis 210 arranged forward thereof, each of the hoses 852, 854, 856, 858 may be retained and/or secured with one or more clamps (e.g., the hose clamp 850), ties, or the like. Further, it should be appreciated that the hoses 852, 854, 856, 858 may be coupled to one another with one or more fittings (e.g., the fitting 860) and/or quick disconnect couplings.

Referring now to FIG. 9, the vehicle 200 is illustratively depicted with the multi-segment chassis 210 at least partially unobscured by the floor assembly 220. In the illustrative embodiment, the support arm structures 570, 580 of the midframe assembly 370, the flap 654 and the floor support bar 658 of the sidewall assembly 650 of the power source cradle assembly 350, and the flap 674 and the floor support bar 678 of the sidewall assembly 670 of the power source cradle assembly 350 are arranged in the longitudinal direction LD between the front wheels 212 and the rear wheels 214. The support arm structures 570, 580 are arranged inwardly in the lateral direction LD' relative to the flaps 654, 674. The flaps 654, 674 are arranged at least partially inwardly in the lateral direction LD' relative to the corresponding floor support bars 658, 678. The floor support bar 658 is disposed midway or substantially midway along the length L of the vehicle 200 in the longitudinal direction LD at an outermost lateral side 958 of the chassis 210. The floor support bar 678 is disposed midway or substantially midway along the length L of the vehicle 200 in the longitudinal direction LD at an outermost lateral side 978 of the chassis 210 that is opposite the side 958.

Referring now to FIGS. 10 and 11, the illustrative front suspension subframe assembly 310 includes the base rails 1112, 1114 spaced from one another in the lateral direction LD' and at least one cross rail 1012 extending in the lateral direction LD' to couple the base rails 1112, 1114 to one another. In some embodiments, the subframe assembly 310 includes at least one crossbeam 1014 arranged rearward of the cross rail 1012 in the longitudinal direction LD that extends in the lateral direction LD' to couple the base rails 1112, 1114 to one another. Additionally, in some embodiments, the crossbeam 1014 is coupled to, or otherwise forms a portion of, the base block 530. In some embodiments still, the base rails 1112, 1114, the cross rail(s) 1012, and the crossbeam(s) 1014 cooperate to at least partially define the cage 1010.

In the illustrative embodiment, bumper mount extensions 1120, 1140 of the front suspension subframe assembly 310 are coupled the base rails 1112, 1114, respectively. In some embodiments, the bumper mount extensions 1120, 1140 extend forward of the respective base rails 1112, 1114 in the longitudinal direction LD and are aligned with, or substantially aligned with, the respective base rails 1112, 1114 in the lateral direction LD'. Additionally, in some embodiments, the bumper mount extensions 1120, 1140 are identical to one another or substantially identical to one another.

As best seen in FIG. 11, the mount extension 1120 includes a planar face 1122 and a planar face 1124 interconnected with the planar face 1122. The planar face 1122 is arranged in confronting relation to the front bumper 206. The planar face 1124 is arranged perpendicular to the planar face 1122. A mounting bracket 1106 of the front bumper 206 includes a mounting surface 1108 arranged to interface directly with the planar face 1122 of the mount extension 1120 and a mounting surface 1110 arranged to interface directly with the planar face 1124 of the mount extension 1120 when the mounting bracket 1106 is affixed to the mount extension 1120 and the front bumper 206 is secured to the front suspension subframe assembly 330.

As best seen in FIG. 11, the mount extension 1140 includes a planar face 1142 and a planar face 1144 interconnected with the planar face 1142. The planar face 1142 is arranged in confronting relation to the front bumper 206.

The planar face 1144 is arranged perpendicular to the planar face 1142. A mounting bracket 1126 of the front bumper 206 includes a mounting surface 1128 arranged to interface directly with the planar face 1142 of the mount extension 1140 and a mounting surface 1130 arranged to interface directly with the planar face 1144 of the mount extension 1140 when the mounting bracket 1126 is affixed to the mount extension 1140 and the front bumper 206 is secured to the front suspension subframe assembly 330.

In the illustrative embodiment, a mount plate 1150 is directly coupled to the base rail 1112 such that the mount plate 1150 is aligned with the powertrain unit cradle 510 in the longitudinal direction LD. The front suspension assembly 320A is configured for mounting to the mount plate 1150 such that the front suspension assembly 320A is arranged outward of the base rail 1112 in the lateral direction LD'. The mount plate 1150 includes a planar exterior face 1152 arranged for direct contact with the front suspension assembly 320A.

In the illustrative embodiment, a mount plate 1160 is directly coupled to the base rail 1114 such that the mount plate 1160 is aligned with the powertrain unit cradle 510 in the longitudinal direction LD. The front suspension assembly 320B is configured to be mounted to the mount plate 1160 such that the front suspension assembly 320B is arranged outward of the base rail 1114 in the lateral direction LD'. The mount plate 1160 includes a planar exterior face 1162 (shown in phantom) arranged for direct contact with the front suspension assembly 320B.

The illustrative cage 1010 includes an upper beam 1170 disposed at the side 1006 of the cage 1010. The upper beam 1170 is aligned with the base rail 1112 in the lateral direction LD' and arranged above the base rail 1112 in the vertical direction VD. In the illustrative embodiment, the upper beam 1170 is spaced from the base rail 1112 in the vertical direction VD to define an opening 1172 between the upper beam 1170 and the base rail 1112. When the powertrain unit 360 is supported by the front suspension subframe assembly 310 such that powertrain unit 360 extends in the lateral direction LD' through the opposite sides 1006, 1008 of the cage 1010, at least a portion of the powertrain unit 360 extends through the opening 1172. In the illustrative embodiment, the mount plate 1150 is directly coupled to the upper beam 1170 such that the mount plate 1150 is affixed to each of the base rail 1112 and the upper beam 1170 at the side 1006 of the cage 1010.

The illustrative cage 1010 includes an upper beam 1180 disposed at the side 1008 of the cage 1010. The upper beam 1180 is aligned with the base rail 1114 in the lateral direction LD' and arranged above the base rail 1114 in the vertical direction VD. In the illustrative embodiment, the upper beam 1180 is spaced from the base rail 1114 in the vertical direction VD to define an opening 1182 between the upper beam 1180 and the base rail 1114. When the powertrain unit 360 is supported by the front suspension subframe assembly 310 such that powertrain unit 360 extends in the lateral direction LD' through the opposite sides 1006, 1008 of the cage 1010, at least a portion of the powertrain unit 360 extends through the opening 1182. In the illustrative embodiment, the mount plate 1160 is directly coupled to the upper beam 1180 such that the mount plate 1160 is affixed to each of the base rail 1114 and the upper beam 1180 at the side 1008 of the cage 1010.

The illustrative cage 1010 includes a crossbeam 1190 that extends in the lateral direction LD' between the upper beams 1170, 1180 to couple the beams 1170, 1180 to one another. In the illustrative embodiment, the crossbeam 1190 is at least partially received in cutouts 1192, 1194 formed in the upper beams 1170, 1180, respectively. The crossbeam 1190 is arranged at least partially rearward of the mount extensions 1120, 1140 in the longitudinal direction LD. In some embodiments, the crossbeam 1014, the upper beams 1170, 1180, and the crossbeam 1190 cooperate to at least partially enclose an interior space 1196 in which the powertrain unit 360 is positioned.

As best seen in FIG. 11, a steering mechanism 1198 extends across the cage 1010 in the lateral direction LD' and outwardly beyond the sides 1006, 1008 thereof. In the illustrative embodiment, the steering mechanism 1198 includes, or is otherwise embodied as, a steering rack and sway bar assembly. It should be appreciated that in at least some embodiments, the steering mechanism 1198 is coupled to each of the wheels 212 and the corresponding front suspension assemblies 320A, 320B to drive movement (e.g., pivotal movement about an axis extending in the vertical direction VD) of the wheels 212 and the corresponding suspension assemblies 320A, 320B and thereby steer the vehicle 200 in use thereof.

The steering mechanism 1198 is arranged at least partially below the crossbeam 1190 in the vertical direction VD and above the base rail 1112 in the vertical direction VD. In the illustrative embodiment, at least a portion of the steering mechanism 1198 is aligned with, or substantially aligned with, the crossbeam 1190 in the longitudinal direction LD. Additionally, in the illustrative embodiment, the steering mechanism 1198 is arranged at least partially rearward of the mount extensions 1120, 1140 in the longitudinal direction LD.

As shown in FIG. 11, the illustrative vehicle 200 includes a variety of features in addition to the aforementioned devices, assemblies, and/or systems. Those features include, but are not limited to, the following: one or more fasteners 1154; one or more nuts 1156; one or more brake line clips 1158; one or more fasteners 1164 that may be distinguishable from the one or more fasteners 1154; a brake line 1166 for routing to a first braking device (e.g., a braking device adapted to resist rotation of one of the wheels 214); a brake line 1168 for routing to a second braking device (e.g., a braking device adapted to resist rotation of the other of the wheels 214); grommets or grommet mounts 1174 sized to be received in one or more bores 1176 formed in the front bumper 206; and indicators (e.g., turn signals, lights, reflectors, or the like) 1178 adapted to be mounted in the bores 1176 using the grommets 1174.

Figure 12:
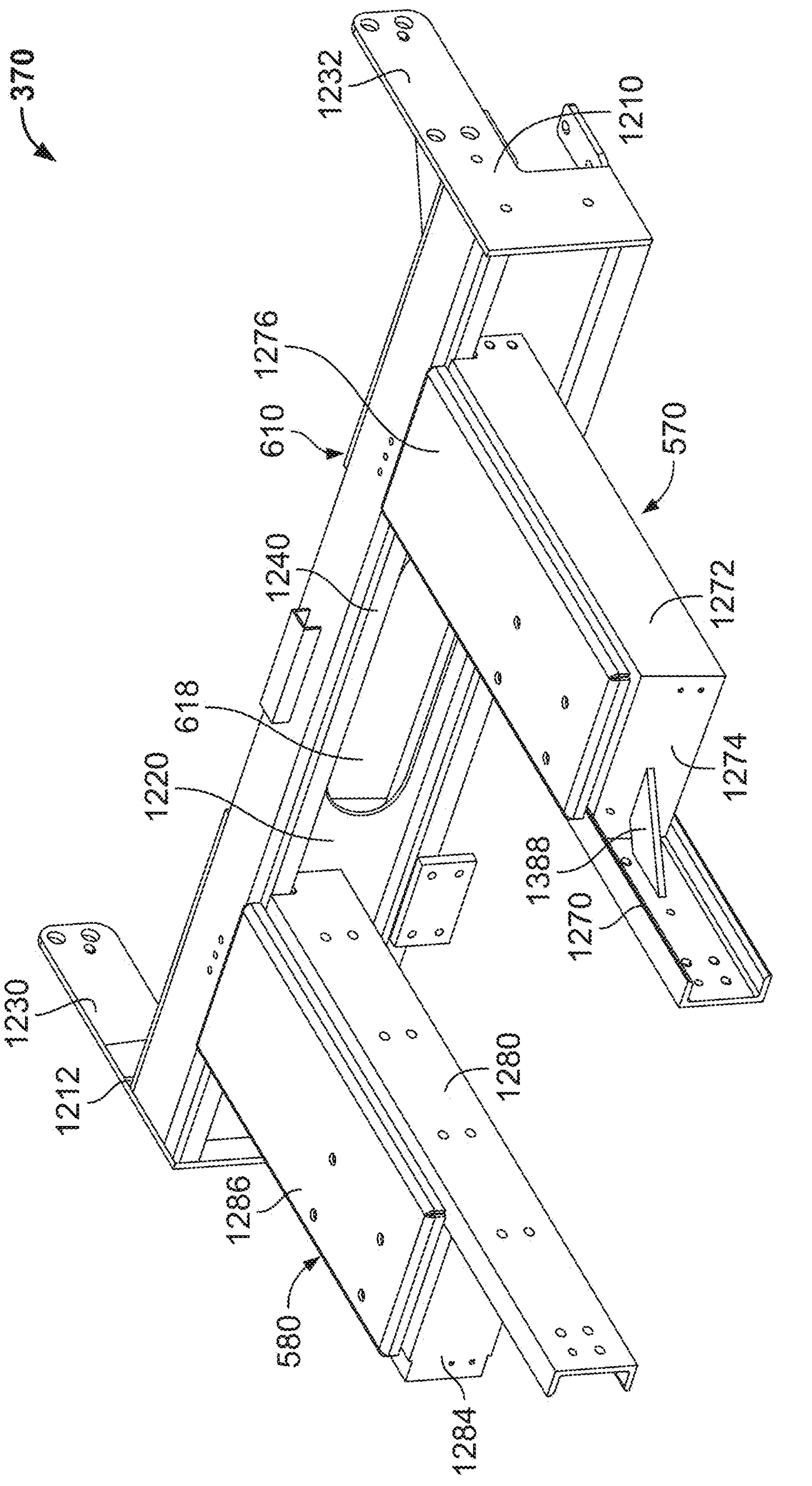
FIG. 12 is a perspective view of the midframe assembly shown in FIG. 5.
Figure 13:
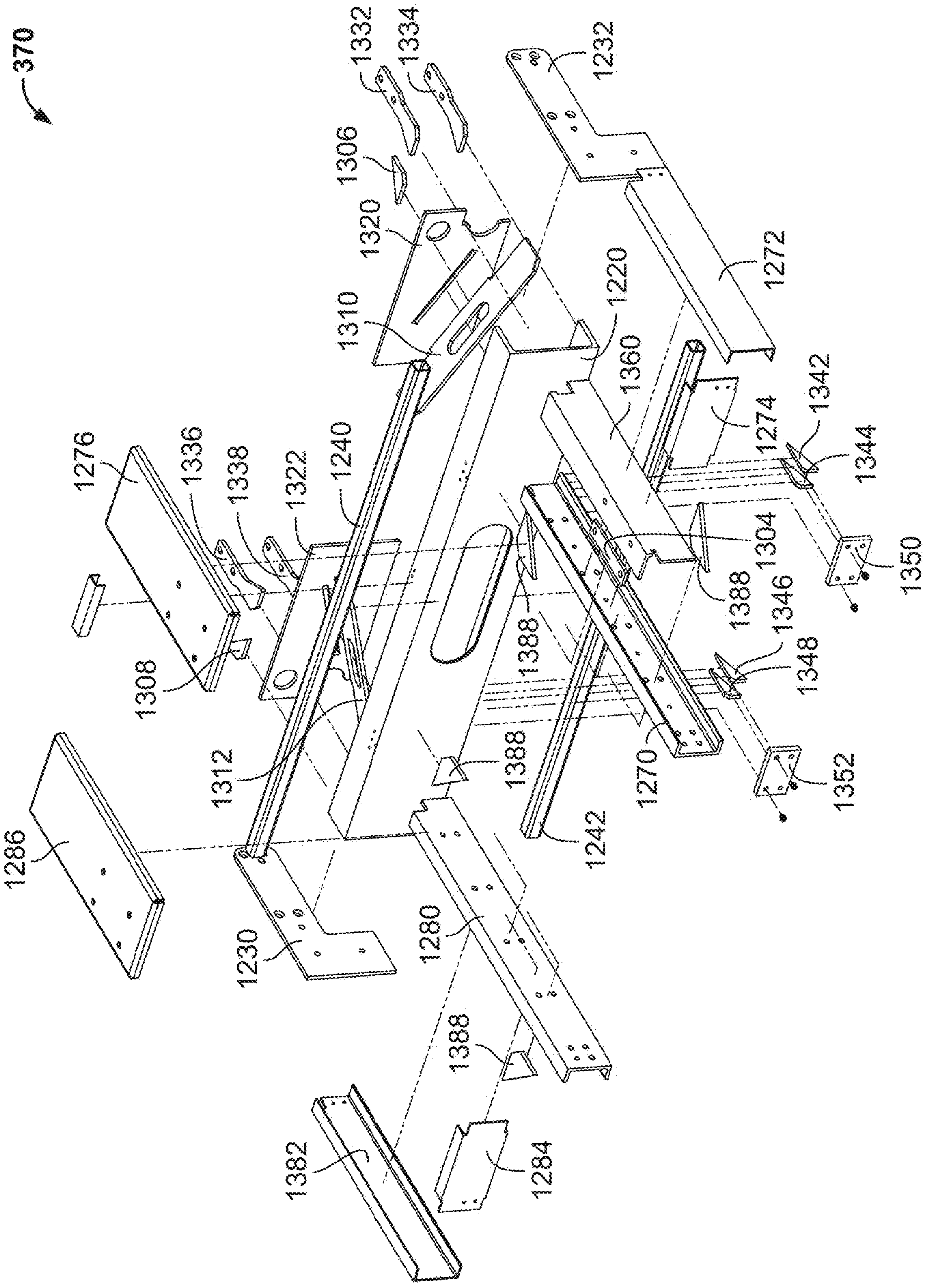
FIG. 13 is an exploded assembly view of the midframe assembly of FIG. 12.

Referring now to FIGS. 12 and 13, the illustrative midframe assembly 370 includes the crossbeam assembly 610 that is affixed to each of the support arm structures 570, 580. The crossbeam assembly 610 extends across the midframe assembly 370 beyond each of the support arm structures 570, 580 in the lateral direction LD'. The crossbeam assembly 610 includes an end 1210 arranged adjacent the support arm structure 570 and an opposite end 1212 arranged adjacent the support arm structure 580.

The illustrative support arm structure 580 includes an inner channel 1280 and an outer channel 1382. The inner channel 1280 is arranged interiorly of the outer channel 1382 in the lateral direction LD' such that the inner channel 1280 and the outer channel 1382 define respective lateral sides 1480, 1482 (see FIG. 14B) of the support arm structure 580. The inner channel 1280 and the outer channel 1382 each extend lengthwise in the longitudinal direction LD parallel to one another such that interior ducts defined by the channels 1280, 1382 are arranged in confronting relation to one another. The length of the inner channel 1280 in the longitudinal direction LD is greater than the length of the outer channel 1382 in the longitudinal direction LD. The inner channel 1280 and the outer channel 1382 are arranged in direct contact with a main channel 1220 of the crossbeam assembly 610.

Figure 15:
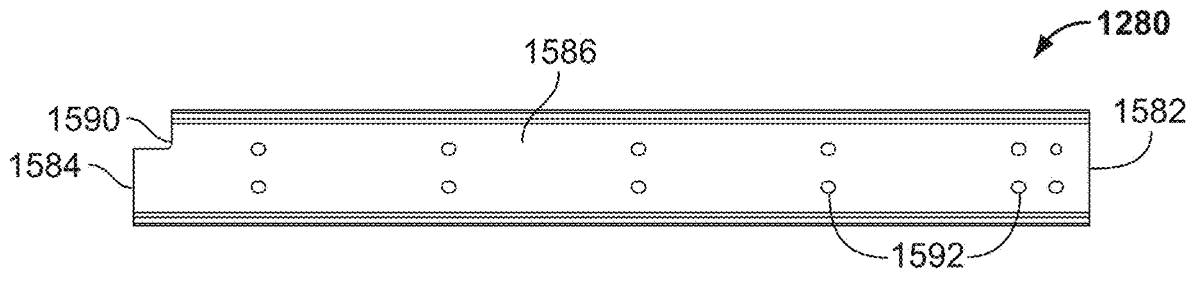
FIG. 15 is a front elevation view of a channel rail included in the midframe assembly shown in FIG. 13.

Referring to FIG. 15, the illustrative inner channel 1280 extends lengthwise between a forward end 1582 and a rear end 1584 arranged opposite the forward end 1582. In the illustrative embodiment, the inner channel 1280 includes, or is otherwise embodied as, a rectangular channel 1586 having a C-shaped cross-section. A square notch 1590 is formed in the channel 1586 adjacent the rear end 1584 whereas the forward end 1582 is devoid of any notches. The rear end 1584 is arranged in direct contact with the main channel 1220 of the crossbeam assembly 610 whereas the forward end 1582 defines a forwardmost point of the support arm structure 580 in the longitudinal direction LD. The channel 1586 is formed to include a plurality of apertures 1592 extending therethrough.

Figure 23:
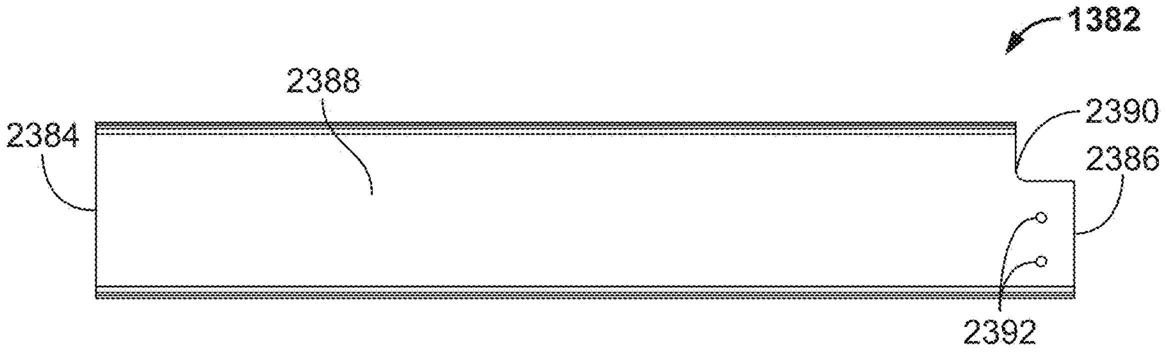
FIG. 23 is a front elevation view of another support channel included in the midframe assembly shown in FIG. 13.

Referring now to FIG. 23, the illustrative outer channel 1382 extends lengthwise between a forward end 2384 and a rear end 2386 arranged opposite the forward end 2384. In the illustrative embodiment, the outer channel 1382 includes, or is otherwise embodied as, a rectangular channel 2388 having a C-shaped cross-section. A square notch 2390 is formed in the channel 2388 adjacent the rear end 2386 whereas the forward end 2384 is devoid of any notches. The rear end 2386 is arranged in direct contact with the main channel 1220 of the crossbeam assembly 610. The channel 2388 is formed to include a plurality of apertures 2392 extending therethrough that are arranged in close proximity to the rear end 2386.

The illustrative support arm structure 580 includes a cover plate 1284, a seat support plate 1286, and one or more gussets 1388. The cover plate 1284 is coupled to each of the inner channel 1280 and the outer channel 1382 and extends between the inner channel 1280 and the outer channel 1382 in the lateral direction LD'. The seat support plate 1286 is coupled to each of the inner channel 1280, the outer channel 1382, and the cover plate 1284 such that the seat support plate 1286 defines an uppermost surface 1486 of the support arm structure 580 in the vertical direction VD. At least one gusset 1388 extends at an angle from the cover plate 1284 to the inner channel 1280 as shown in FIG. 14B.

Figure 20:
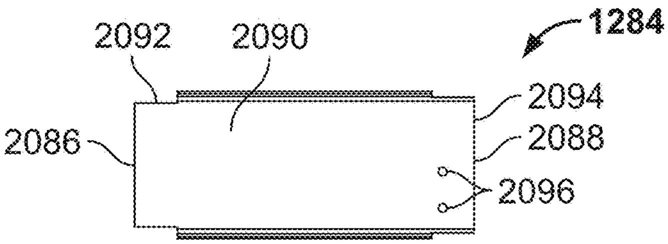
FIG. 20 is a front elevation view of a channel cover included in the midframe assembly shown in FIG. 13.

Referring now to FIG. 20, the illustrative cover plate 1284 extends in the lateral direction LD' between a lateral side 2086 and a lateral side 2088 arranged opposite the lateral side 2086. The lateral side 2086 is arranged in direct contact with the inner channel 1280 whereas the lateral side 2088 is arranged in direct contact with the outer channel 1382. In the illustrative embodiment, the cover plate 1284 includes, or is otherwise embodied as, a rectangular channel 2090 having a C-shaped cross section. A notch 2092 is formed in the lateral side 2086 or in close proximity thereto to facilitate interaction with the inner channel 1280. A notch 2094 is formed in the lateral side 2088 or in close proximity thereto to facilitate interaction with the outer channel 1382. The channel 2090 is formed to include a plurality of apertures 2096 extending therethrough that are arranged in close proximity to the lateral side 2088.

Figure 26:
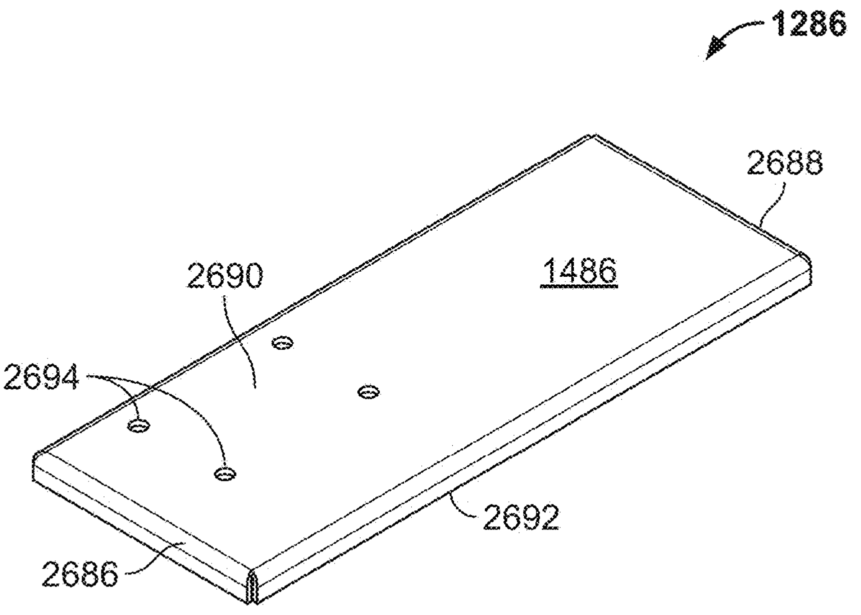
FIG. 26 is a perspective view of a top cover included in the midframe assembly shown in FIG. 13.

Referring now to FIG. 26, the illustrative seat support plate 1286 extends in the longitudinal direction LD between a forward end 2686 and a rear end 2688 arranged opposite the forward end 2686. The rear end 2688 is coupled to and arranged in close proximity to the main channel 1220 of the crossbeam assembly 610, whereas the forward end 2686 is coupled to the inner channel 1280, the outer channel 1382, and the cover plate 1284. The illustrative seat support plate 1286 includes, or is otherwise embodied as, a rectangular plate 2690 defining the uppermost surface 1486 and a lowermost surface 2692 arranged opposite the uppermost surface 1486 in the vertical direction VD. The plate 2690 is formed to include a plurality of apertures 2694 extending therethrough that are arranged in closer proximity to the forward end 2686 than the rear end 2688.

Figure 18:
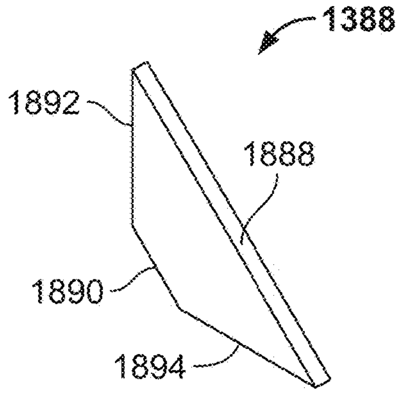
FIG. 18 is a perspective view of a support gusset included in the midframe assembly shown in FIG. 13.

Referring now to FIG. 18, the illustrative gusset 1388 includes sides 1888, 1890 arranged parallel to one another. The sides 1888, 1890 are interconnected by sides 1892, 1894 and the sides 1892, 1894 are non-parallel to each other. The gusset 1388 illustratively has a trapezoidal shape. When coupled to the cover plate 1284 and the inner channel 1280, the side 1894 confronts and directly contacts the cover plate 1284, whereas the side 1892 confronts and directly contacts the inner channel 1280.

The illustrative support arm structure 570 includes an inner channel 1270 and an outer channel 1272. The inner channel 1270 is arranged interiorly of the outer channel 1272 in the lateral direction LD' such that the inner channel 1270 and the outer channel 1272 define respective lateral sides 1470, 1472 (see FIG. 14B) of the support arm structure 570. The inner channel 1270 and the outer channel 1272 each extend lengthwise in the longitudinal direction LD parallel to one another such that interior ducts defined by the channels 1270, 1272 are arranged in confronting relation to one another. The length of the inner channel 1270 in the longitudinal direction LD is greater than the length of the outer channel 1272 in the longitudinal direction LD. The inner channel 1270 and the outer channel 1272 are arranged in direct contact with the main channel 1220 of the cross-beam assembly 610.

Figure 21:
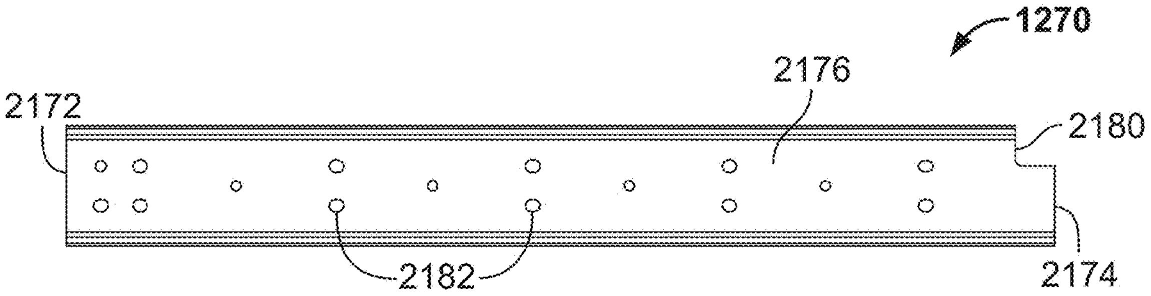
FIG. 21 is a front elevation view of another channel rail included in the midframe assembly shown in FIG. 13.

Referring to FIG. 21, the illustrative inner channel 1270 extends lengthwise between a forward end 2172 and a rear end 2174 arranged opposite the forward end 2172. In the illustrative embodiment, the inner channel 1270 includes, or is otherwise embodied as, a rectangular channel 2176 having a C-shaped cross-section. A square notch 2180 is formed in the channel 2176 adjacent the rear end 2174 whereas the forward end 2172 is devoid of any notches. The rear end 2174 is arranged in direct contact with the main channel 1220 of the crossbeam assembly 610 whereas the forward end 2172 defines a forwardmost point of the support arm structure 570 in the longitudinal direction LD. The channel 2176 is formed to include a plurality of apertures 2182 extending therethrough.

Figure 19:
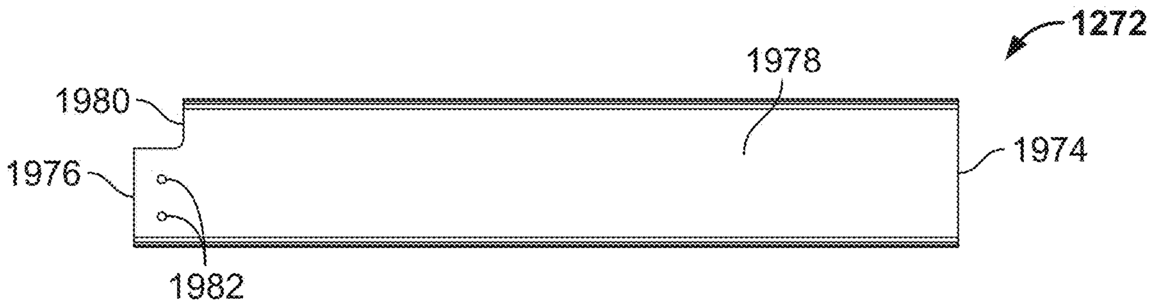
FIG. 19 is a front elevation view of a support channel included in the midframe assembly shown in FIG. 13.

Referring now to FIG. 19, the illustrative outer channel 1272 extends lengthwise between a forward end 1974 and a rear end 1976 arranged opposite the forward end 1974. In the illustrative embodiment, the outer channel 1272 includes, or is otherwise embodied as, a rectangular channel 1978 having a C-shaped cross-section. A square notch 1980 is formed in the channel 1978 adjacent the rear end 1976 whereas the forward end 1974 is devoid of any notches. The rear end 1976 is arranged in direct contact with the main channel 1220 of the crossbeam assembly 610. The channel 1978 is formed to include a plurality of apertures 1982 extending therethrough that are arranged in close proximity to the rear end 1976.

The illustrative support arm structure 570 also includes an intermediate support rail 1360 arranged between the inner channel 1270 and the outer channel 1272 in the lateral direction LD' as shown in FIG. 14E. The support rail 1360 is arranged in direct contact with the main channel 1220 of the crossbeam assembly 610 and coupled to each of the inner channel 1270 and the outer channel 1272. The support rail 1360, the inner channel 1270, and the outer channel 1272 extend lengthwise in the longitudinal direction LD parallel to one another. As best seen in FIG. 14E, the length of the support rail 1360 in the longitudinal direction LD is less than the length of the outer channel 1272 in the longitudinal direction LD.

In some embodiments, inclusion of the intermediate support rail 1360 in the support arm structure 570 differentiates the support arm structure 570 from the support arm structure 580 such that the support arm structures 570, 580 are not identical. Additionally, in some embodiments, but for inclusion of the support rail 1360 in the support arm structure 570, the support arm structures 570, 580 are similar or substantially similar. Further, in some embodiments, the support arm structure 580 may include a structure similar to the intermediate support rail 1360.

Figure 32:
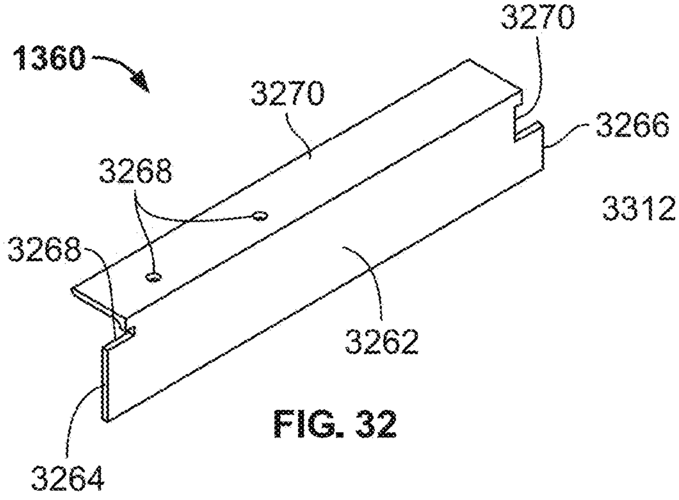
FIG. 32 is a perspective view of a support rail included in the midframe assembly shown in FIG. 13.

Referring now to FIG. 32, the illustrative intermediate support rail 1360 includes, or is otherwise embodied as, a rectangular channel 3262 extending between a forward end 3264 and a rear end 3266 arranged opposite the forward end 3264. The rear end 3266 is arranged in direct contact with the main channel 1220 whereas the forward end 3264 is arranged in direct contact with a cover plate 1274 of the support arm structure 570. A notch 3268 is formed in the forward end 3264 or in close proximity to the forward end 3264. A square notch 3270 is formed in the rear end 3266 or in close proximity to the rear end 3266. In the illustrative embodiment, the length of the notch 3268 in the vertical direction VD is less than the length of the notch 3270 in the vertical direction VD. The channel 3262 is formed to include a pair of apertures 3268 extending through an upper face 3270 thereof.

The illustrative support arm structure 570 includes the cover plate 1274, a seat support plate 1276, and the one or more gussets 1388. The cover plate 1274 is coupled to each of the inner channel 1270, the outer channel 1272, and the intermediate support rail 1360 and extends between the inner channel 1270 and the outer channel 1272 in the lateral direction LD'. The seat support plate 1276 is coupled to each of the inner channel 1270, the outer channel 1272, the support rail 1360, and the cover plate 1274 such that the seat support plate 1276 defines an uppermost surface 1476 of the support arm structure 570 in the vertical direction VD. At least one gusset 1388 extends at an angle from the cover plate 1274 to the inner channel 1270 as shown in FIG. 14B. In the illustrative embodiment, the seat support plate 1276 is identical or substantially identical to the seat support plate 1286.

Figure 27:
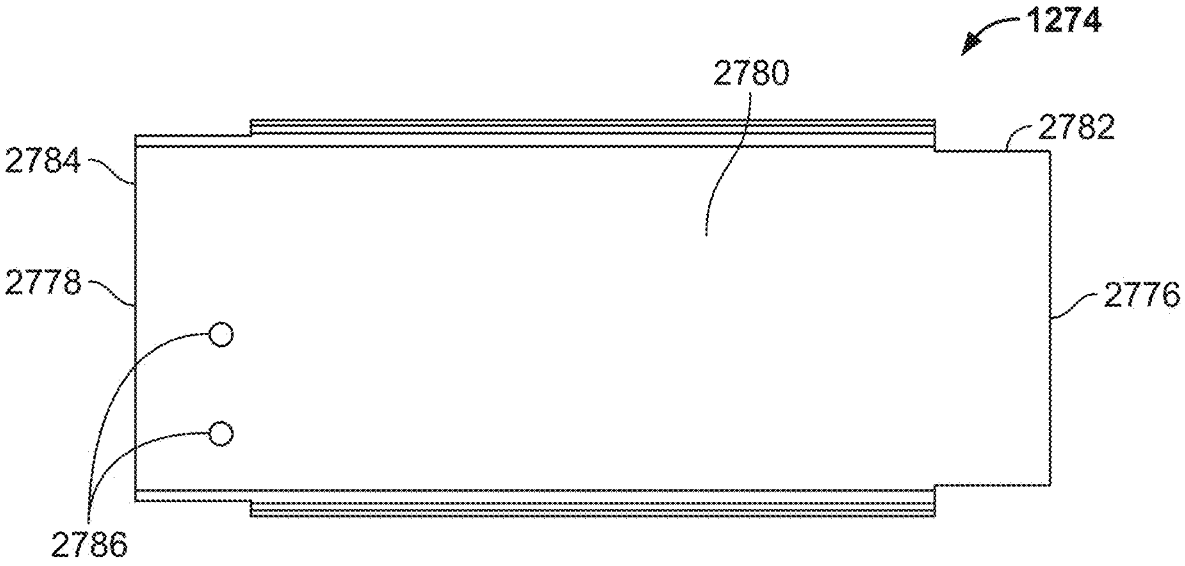
FIG. 27 is a front elevation view of another channel cover included in the midframe assembly shown in FIG. 13.

Referring now to FIG. 27, the illustrative cover plate 1274 extends in the lateral direction LD' between a lateral side 2776 and a lateral side 2778 arranged opposite the lateral side 2776. The lateral side 2776 is arranged in direct contact with the inner channel 1270 whereas the lateral side 2778 is arranged in direct contact with the outer channel 1272. In the illustrative embodiment, the cover plate 1274 includes, or is otherwise embodied as, a rectangular channel 2780 having a C-shaped cross section. A notch 2782 is formed in the lateral side 2776 or in close proximity thereto to facilitate interaction with the inner channel 1780. A notch 2784 is formed in the lateral side 2778 or in close proximity thereto to facilitate interaction with the outer channel 1272. The channel 2780 is formed to include a plurality of apertures 2786 extending therethrough that are arranged in close proximity to the lateral side 2778.

Figure 16:
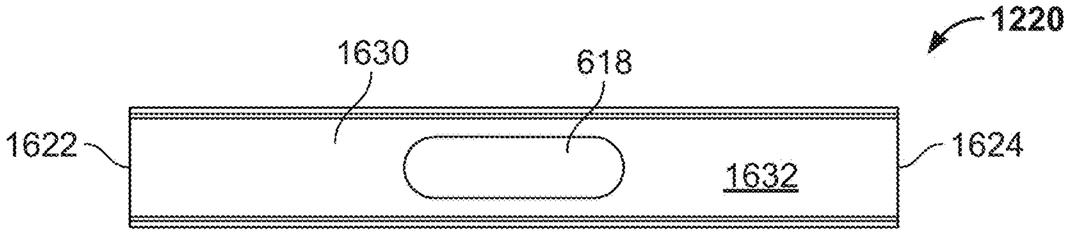
FIG. 16 is a front elevation view of a main channel frame included in the midframe assembly shown in FIG. 13.

Referring to FIG. 16, the illustrative main channel 1220 of the crossbeam assembly 610 extends in the lateral direction LD' between a lateral side 1622 and a lateral side 1624 arranged opposite the lateral side 1622. The lengthwise orientation of the main channel 1220 in the lateral direction LD' is orthogonal or substantially orthogonal to the lengthwise orientation of the support arm structures 570, 580 in the longitudinal direction LD. The central aperture 618 is positioned midway between the lateral sides 1622, 1624 in the lateral direction LD'. In the illustrative embodiment, the inner channel 1220 includes, or is otherwise embodied as, a rectangular channel 1630 having a C-shaped cross-section. Apart from the central aperture 618, the channel 1630 is devoid of any notches. The channel 1630 includes a forward face 1632 and a rear face 1434 (see FIG. 14C) arranged opposite the forward face 1632.

The illustrative midframe assembly 370 includes a pair of mounting brackets 1230, 1232 affixed to the corresponding lateral sides 1622, 1624 of the main channel 1220 as shown in FIGS. 12 and 13. In the illustrative embodiment, the mounting bracket 1230 at least partially defines the end 1212 of the crossbeam assembly 610, whereas the mounting bracket 1232 at least partially defines the end 1210 of the crossbeam assembly 610. The illustrative mounting brackets 1230, 1232 are identical or substantially identical to one another.

Figure 17:
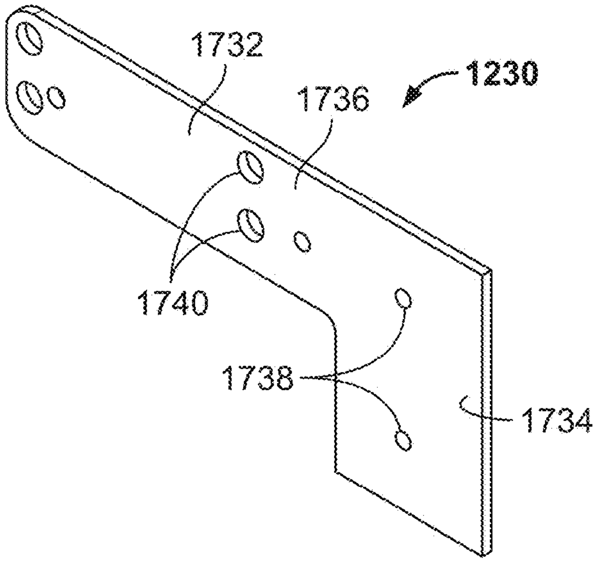
FIG. 17 is a perspective view of a mounting bracket included in the midframe assembly shown in FIG. 13.

Referring now to FIG. 17, the illustrative mounting bracket 1230 includes, or is otherwise embodied as, an L-shaped bracket 1732. The L-shaped bracket 1732 includes a section 1734 and a section 1736 interconnected with the section 1734 that extends perpendicular to the section 1734. In the illustrative embodiment, when the mounting bracket 1230 is affixed to the lateral side 1622 of the main channel 1220, the section 1734 is substantially aligned with the lateral side 1622 in the longitudinal direction LD. Additionally, when the mounting bracket 1230 is affixed to the lateral side 1622 of the main channel 1220, the section 1736 extends rearwardly of the lateral side 1622 in the longitudinal direction LD. The section 1734 is formed to include apertures 1738 whereas the section 1736 is formed to include apertures 1740.

The illustrative midframe assembly 370 includes identical or substantially identical square tubes 1240, 1242 affixed to the main channel 1220 in direct contact with the forward face 1632 thereof as shown in FIGS. 12 and 13. The length of each square tube 1240, 1242 in the lateral direction LD' is equal or substantially equal to the length of the main channel 1220 in the lateral direction LD'. When affixed to the main channel 1220, the square tube 1240 is arranged above the central aperture 618 in the vertical direction VD and the square tube 1242 is arranged below the central aperture 618 in the vertical direction VD. In the illustrative embodiment, when affixed to the main channel 1220, the square tube 1240 is sized to be at least partially received in (i) the notch 2390 formed in the outer channel 1382, (ii) the notch 1590 formed in the inner channel 1280, (iii) the notch 2180 formed in the inner channel 1270, (iv) the notch 3270 formed in the intermediate support rail 1360, and (v) the notch 1980 formed in the outer channel 1272.

Figure 22:
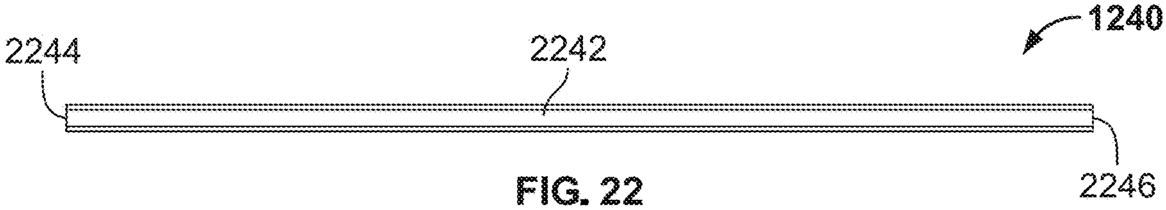
FIG. 22 is a front elevation view of a support tube included in the midframe assembly shown in FIG. 13.

Referring now to FIG. 22, the illustrative square tube 1240 includes, or is otherwise embodied as, an elongate tube 2242 having a square cross-section that extends between opposite ends 2244, 2246. In other embodiments, it should be appreciated the elongate tube 2242 may take the shape of other suitable geometric forms. Accordingly, in such embodiments, the notches 2390, 1590, 2180, 3270, 1980 may be shaped complementary to the shape of the tube 2242. In some embodiments, when the elongate tube 2242 is affixed to the main channel 1220, the tube 2242 is coplanar with, or substantially coplanar with, the upwardly-facing surface 620 of the main body panel 612.

The illustrative midframe assembly 370 includes identical or substantially identical mount plates 1350, 1352 directly affixed to the square tube 1242 as shown in FIGS. 12 and 13. More specifically, when the mount plates 1350, 1352 are directly affixed to the square tube 1242 as best seen in FIG. 14A, the mount plate 1350 is at least partially aligned with the support arm structure 570 in the vertical direction VD and the mount plate 1352 is at least partially aligned with the support arm structure 580 in the vertical direction VD. The central aperture 618 is illustratively arranged between the mount plates 1350, 1352 in the lateral direction LD' as shown in FIG. 14A.

Figure 24:
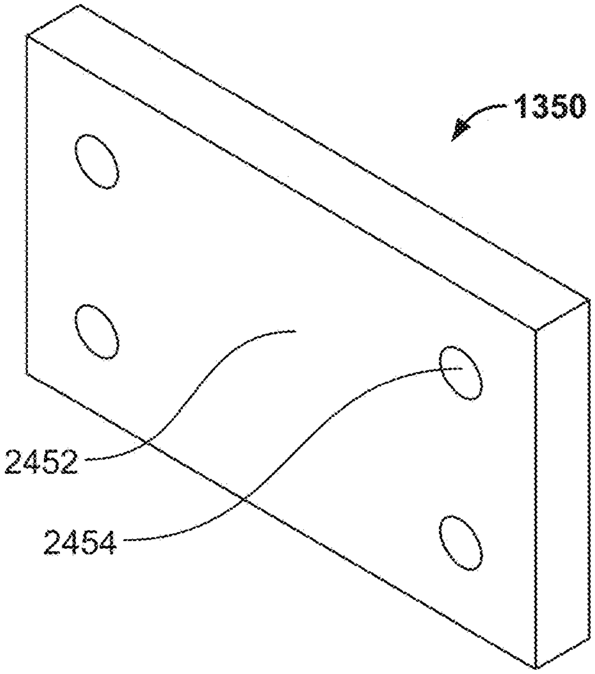
FIG. 24 is a perspective view of a mounting plate included in the midframe assembly shown in FIG. 13.

Referring now to FIG. 24, the illustrative mount plate 1350 includes, or is otherwise embodied as, a rectangular mount plate 2452 sized for attachment to the square tube 1242. In some embodiments, when affixed to the square tube 1242 as best seen in FIG. 14A, the mount plate 2452 extends downwardly in the vertical direction VD beyond the square tube 1242 such that the mount plate 2452 is at least partially arranged below the square tube 1242 in the vertical direction VD. In the illustrative embodiment, the mount plate 2452 is formed to include a plurality of apertures 2454, such as four apertures 2454, for example. In some embodiments, the apertures 2454 may be sized to receive fasteners used to secure the mount plate 2452 to the square tube 1242.

The illustrative midframe assembly 370 includes identical or substantially identical gussets 1342, 1344, 1346, 1348 coupled to the mount plates 1350, 1352 and the main channel 1220. In some embodiments, the gussets 1342, 1344, 1346, 1348 may be used to at least partially attach the mount plates 1350, 1352 to the square tube 1242 and/or the main channel 1220 and to structurally reinforce the coupling between the mount plates 1350, 1352 and the square tube 1242 and/or the main channel 1220. More specifically, in some embodiments, the gussets 1342, 1344 may be used to at least partially attach the mount plate 1350 to the square tube 1242 and/or the main channel 1220 and to structurally reinforce the coupling between the mount plate 1350 and the square tube 1242 and/or the main channel 1220, and the gussets 1346, 1348 may be used to at least partially attach the mount plate 1352 to the square tube 1242 and/or the main channel 1220 and to structurally reinforce the coupling between the mount plate 1352 and the square tube 1242 and/or the main channel 1220.

Figure 25:
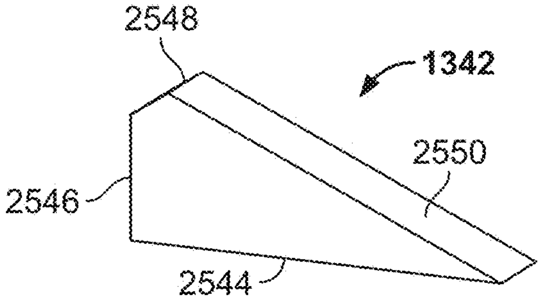
FIG. 25 is a perspective view of a gusset plate included in the midframe assembly shown in FIG. 13.

Referring now to FIG. 25, the illustrative gusset 1342 includes interconnected sides 2544, 2546 arranged perpendicular or substantially perpendicular to one another. Additionally, the gusset 1342 includes interconnected sides 2548, 2550 arranged non-parallel to one another. The side 2548 interconnects the sides 2546, 2550 and the side 2550 interconnects the sides 2548, 2544. The side 2548 is arranged non-parallel to the side 2546 and the side 2550 is arranged non-parallel to the side 2544.

The illustrative midframe assembly 370 includes identical or substantially identical channel gussets 1332, 1334, 1336, 1338 coupled to the main channel 1220. More specifically, as shown in FIGS. 13 and 14D, the channel gussets 1332, 1334 are coupled to the main channel 1220 and the mounting bracket 1232 at or in close proximity to the end 1210 of the crossbeam assembly 610, and the channel gussets 1336, 1338 are coupled to the main channel 1220 and the mounting bracket 1230 at or in close proximity to the end 1212 of the crossbeam assembly 610. When the channel gussets 1332, 1334 are coupled to the main channel 1220 and the mounting bracket 1232, the channel gusset 1332 is arranged above the channel gusset 1334 in the vertical direction VD. Additionally, when the channel gussets 1336, 1338 are coupled to the main channel 1220 and the mounting bracket 1232, the channel gusset 1336 is arranged above the channel gusset 1338 in the vertical direction VD.

In some embodiments, the channel gussets 1332, 1334 may be used to at least partially attach the mounting bracket 1232 to the main channel 1220 and to structurally reinforce the coupling between the mounting bracket 1232 and the main channel 1220. Additionally, in some embodiments, the channel gussets 1336, 1338 may be used to at least partially attach the mounting bracket 1230 to the main channel 1220 and to structurally reinforce the coupling between the mounting bracket 1230 and the main channel 1220.

Figure 28:
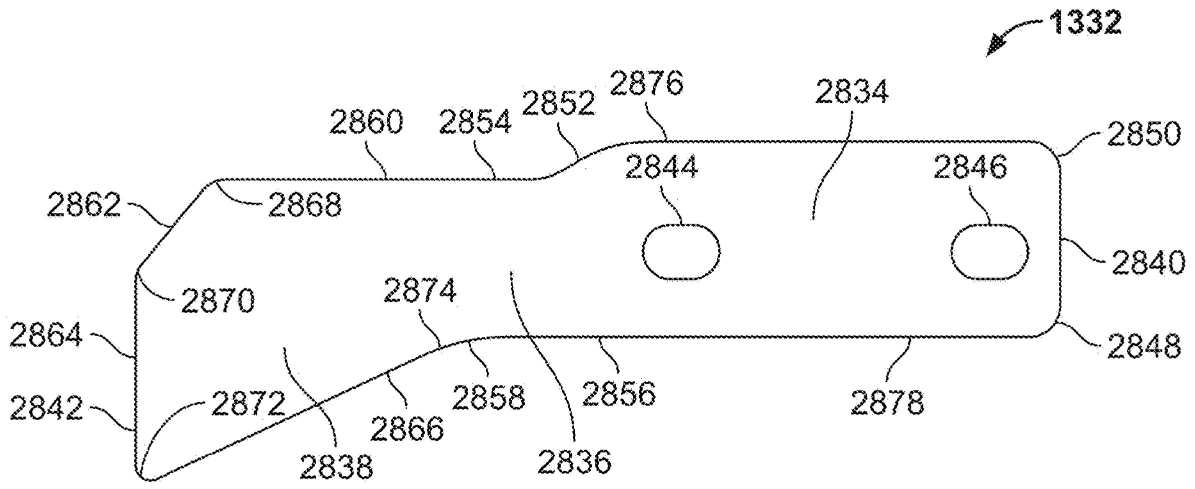
FIG. 28 is a front elevation view of a gusset bracket included in the midframe assembly shown in FIG. 13.

Referring now to FIG. 28, the illustrative channel gusset 1332 includes interconnected sections 2834, 2836, 2838. The sections 2834, 2838 define respective opposite ends 2840, 2842 of the channel gusset 1332. In the illustrative embodiment, the section 2836 includes, or is otherwise embodied as, a transitional section interconnecting the sections 2834, 2838. The section 2834 is formed to include apertures 2844, 2846. The sections 2836, 2838 are devoid of apertures.

The section 2834 of the illustrative channel gusset 1332 has a generally rectangular shape and is formed to include rounded corners 2848, 2850. The section 2836 of the illustrative channel gusset 1332 includes an arcuate surface 2852 interconnected with a generally planar surface 2854 and a generally planar surface 2856 interconnected with an arcuate surface 2858. The section 2838 of the illustrative channel gusset 1332 includes interconnected surfaces 2860, 2862, 2864, 2866 and rounded corners 2868, 2870, 2872, 2874. The sections 2834, 2836, 2838 cooperate to define lateral sides or edges 2876, 2878 arranged opposite one another. In the illustrative embodiment, when the channel gusset 1332 is coupled to the mounting bracket 1232 and the main channel 1220, the lateral side 2876 is arranged in direct contact with an interior side of the mounting bracket 1232 and the lateral side 2878 is spaced from the interior side of the mounting bracket 1232.

Figure 14C:
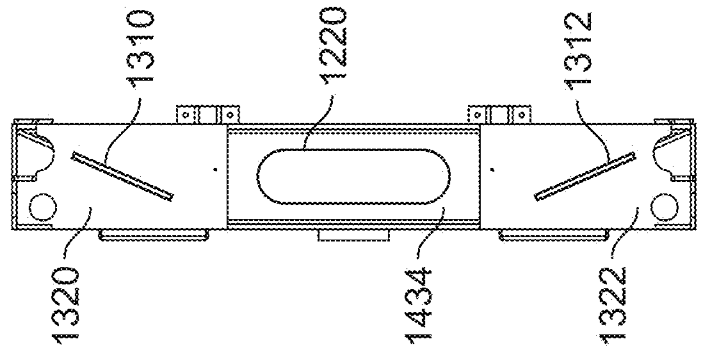
FIG. 14C is a rear elevation view of the midframe assembly of FIG. 12.
Figure 14B:
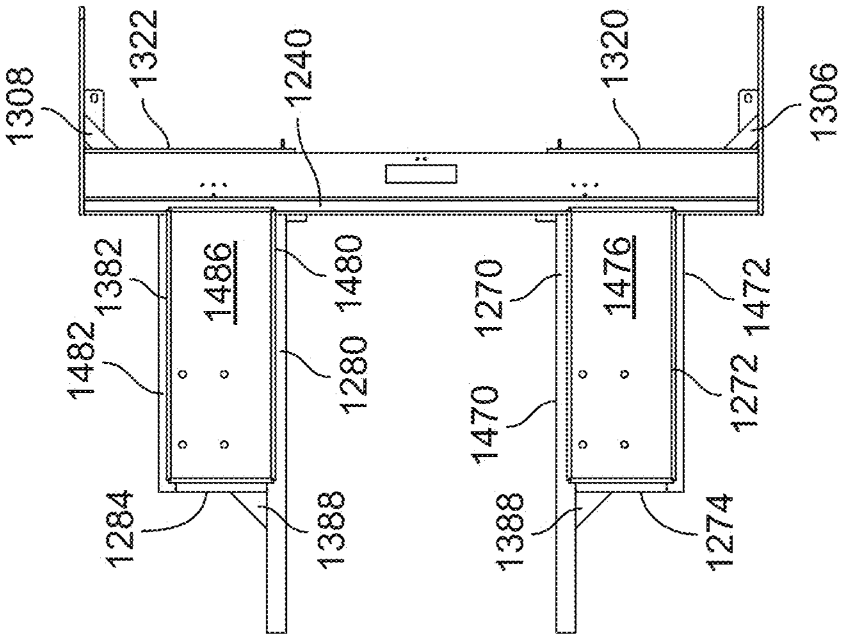
FIG. 14B is a top view of the midframe assembly of FIG. 12.
Figure 14A:
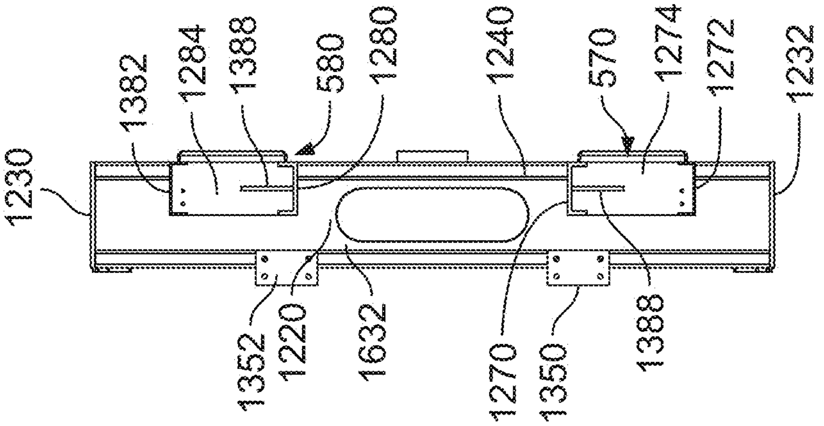
FIG. 14A is a front elevation view of the midframe assembly of FIG. 12.
Figure 14D:
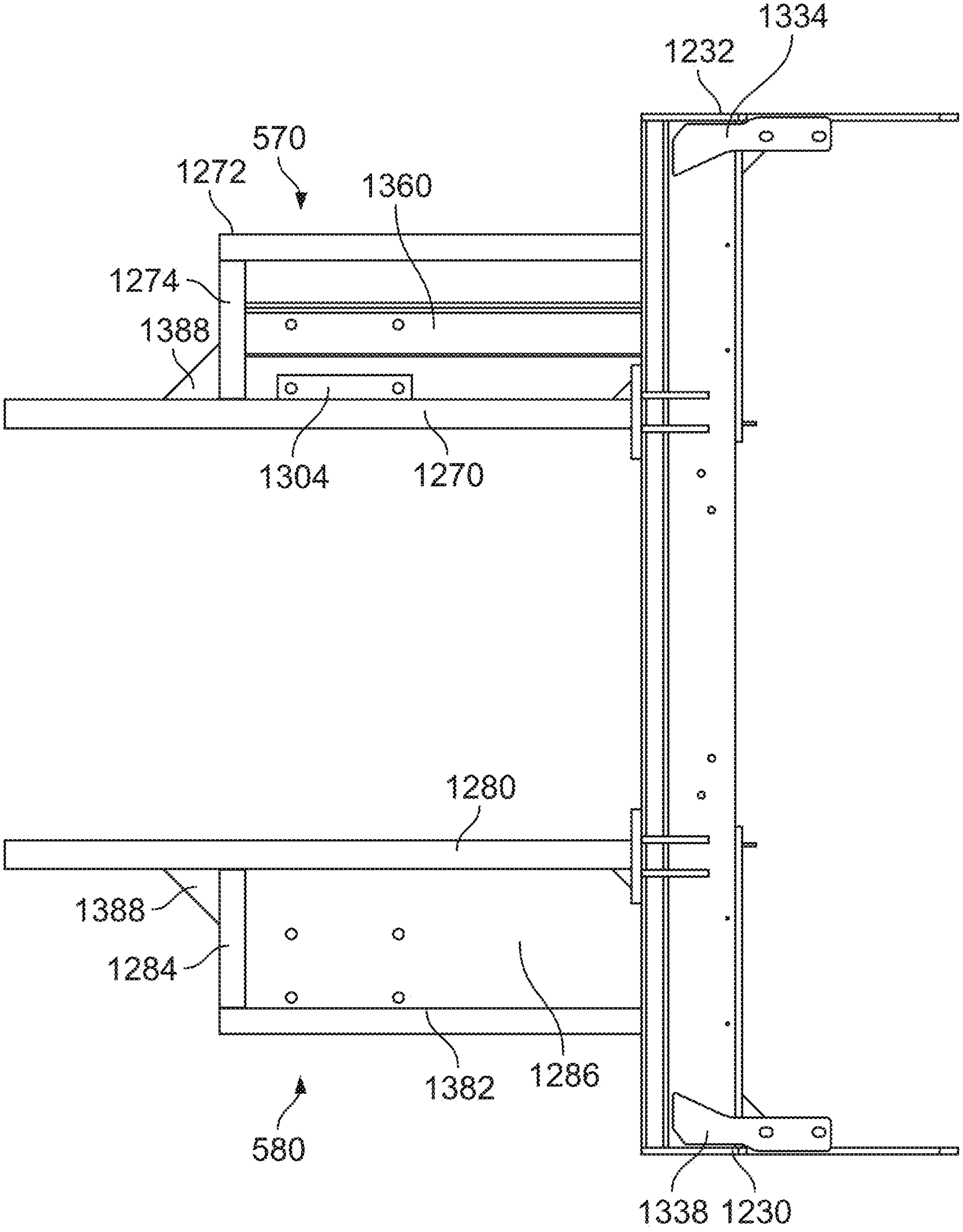
FIG. 14D is a bottom view of the midframe assembly of FIG. 12.

The illustrative midframe assembly 370 includes identical or substantially identical box cover plates 1320, 1322 coupled to the main channel 1220 as best seen in FIGS. 13 and 14C. More specifically, the box cover plate 1320 is coupled to the rear face 1434 of the main channel 1220 such that the box cover plate 1320 is aligned with the support arm structure 570 in the lateral direction LD', and the box cover plate 1322 is coupled to the rear face 1434 of the main channel 1220 such that the box cover plate 1320 is aligned with the support arm structure 580 in the lateral direction LD'. The box cover plates 1320, 1322 are spaced apart from one another in the lateral direction LD' by the central aperture 618. The box cover plates 1320, 1322 at least partially close off the open backside of the main channel 1220 when coupled thereto as shown in FIGS. 14B-14D.

Figure 29:
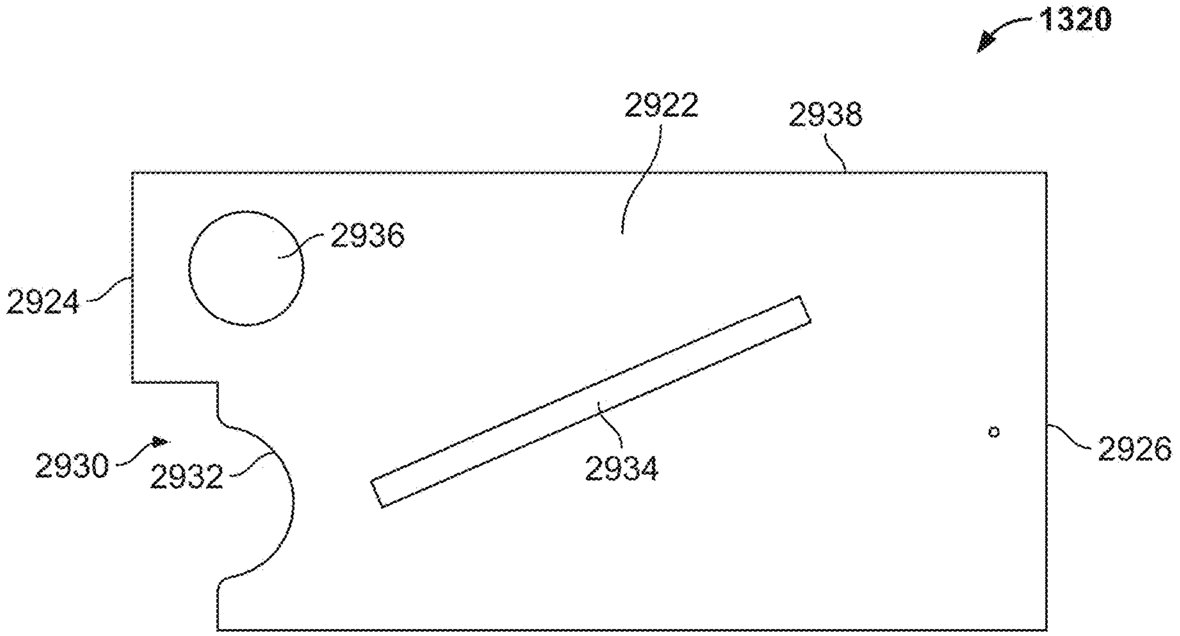
FIG. 29 is a front elevation view of a backplate included in the midframe assembly shown in FIG. 13.

Referring now to FIG. 29, the illustrative box cover plate 1320 includes a generally rectangular plate 2922 extending in the lateral direction LD' between opposite ends 2924, 2926. Whereas the end 2926 is devoid of any cutouts or notches, the end 2924 is formed to include a cutout 2930. The height of the cutout 2930 in the vertical direction VD is equal or substantially equal to one-half of the total height of the cover plate 1320 in the vertical direction VD, at least in some embodiments. The illustrative cutout 2930 has a generally rectangular shape. In the illustrative embodiment, the end 2924 is also formed to include a semicircular notch 2932 that extends inwardly away from the cutout 2930 in the lateral direction LD' and is in fluid communication with the cutout 2930. A diameter of the notch 2932 measured in the vertical direction VD is illustratively less than the height of the cutout 2930 in the vertical direction VD.

When affixed to the rear face 1434 of the main channel 1220 as indicated above, the end 2924 of the box cover plate 1320 is substantially aligned with, or arranged in close proximity to, the end 1210 in the lateral direction LD'. The end 2926 of the box cover plate 1320 is arranged closer to the central aperture 618 in the lateral direction LD' than the end 2924 when the box cover plate 1320 is affixed to the rear face 1434. The cover plate 1320 is illustratively formed to include an angled rectangular slot 2934 disposed centrally between the ends 2924, 2926 in the lateral direction LD'. In addition, the cover plate 1320 is formed to include a bore 2936 disposed between a top surface 2938 of the cover plate 1320 and the cutout 2930 in the vertical direction VD. The bore 2936 is at least partially aligned with the notch 2932 in the lateral direction LD'.

The illustrative midframe assembly 370 includes identical or substantially identical angled gusset plates 1310, 1312 that are arranged in direct contact with the rear face 1434 of the main channel 1220 as shown in FIGS. 13 and 14C and interposed between the rear face 1434 and the respective box cover plates 1320, 1322. That is, the angled gusset plate 1310 is coupled between the rear face 1434 and the box cover plate 1320 whereas the angled gusset plate 1312 is coupled between the rear face 1434 and the box cover plate 1322. When coupled between the rear face 1434 and the respective box cover plates 1320, 1322, the angled gusset plates 1310, 1312 are at least partially received in the box cover plates 1320, 1322. More specifically, as discussed below, a portion of each angled gusset plate 1310, 1312 extends through the angled slot (e.g., the angled slot 2934) of the corresponding box cover plate 1320, 1322.

Figure 30:
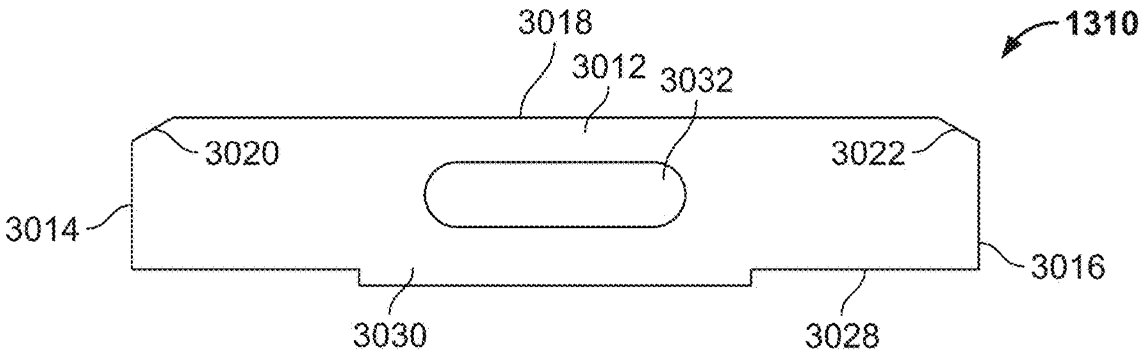
FIG. 30 is a front elevation view of an angled gusset included in the midframe assembly shown in FIG. 13.

Referring now to FIG. 30, the illustrative angled gusset plate 1310 includes a thin, generally rectangular plate 3012 that extends in the lateral direction LD' between opposite ends 3014, 3016. The plate 3012 includes a forward face 3018 interconnected with the ends 3014, 3016 at respective chamfered edges 3020, 3022 and a rear face 3028 arranged opposite the forward face 3018 in the longitudinal direction LD. The rear face 3028 is interconnected with the ends 3014, 3016 without chamfered edges or similar features. In the illustrative embodiment, the forward face 3018 is arranged in direct contact with the rear face 1434 of the main channel 1220, whereas a portion of the rear face 3028 is at least partially received in the box cover plate 1320.

In the illustrative embodiment, the rear face 3028 of the angled gusset plate 1310 includes a rectangular projection or extension 3030 sized for receipt in the angled slot 2934 of the box cover plate 1320. As such, when the angled gusset plate 1310 is coupled between the rear face 1434 and the box cover plate 1320 as mentioned above, the projection 3030 is received in the slot 2934 such that the projection 3030 is visible from a rear view of the midframe assembly 370, as best seen in FIG. 14C. The illustrative angled gusset plate 1310 is formed to include a slot 3032 arranged substantially midway between the ends 3014, 3016 in the lateral direction LD'.

The illustrative midframe assembly 370 includes identical or substantially identical gussets 1306, 1308 as shown in FIGS. 13 and 14B. In some embodiments, each of the gussets 1306, 1308 is similar or substantially similar to the gussets 1388. In the illustrative embodiment, the gusset 1306 is arranged in direct contact with the box cover plate 1320 and the mounting bracket 1232, whereas the gusset 1308 is arranged in direct contact with the box cover plate 1322 and the mounting bracket 1230.

Figure 31:
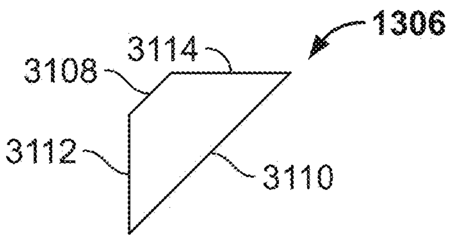
FIG. 31 is a perspective view of a support gusset included in the midframe assembly shown in FIG. 13.

Referring now to FIG. 31, the illustrative gusset 1306 included sides 3108, 3110 arranged parallel to one another. The sides 3108, 3110 are interconnected by sides 3112, 3114 and the sides 3112, 3114 are non-parallel to one another. The gusset 1306 illustratively has a trapezoidal shape. When coupled to the box cover plate 1320 and the mounting bracket 1232, the side 3114 confronts and directly contacts the box cover plate 1320, whereas the side 3112 confronts and directly contacts the mounting bracket 1232.

The illustrative midframe assembly 370 includes a spacer plate 1304 incorporated into the support arm structure 570 as shown in FIGS. 13 and 14D. In some embodiments, the spacer plate 1304 may be arranged between the inner channel 1270 and the intermediate support rail 1360. Additionally, in some embodiments, the spacer plate 1304 may be directly affixed to the inner channel 1270 and/or the intermediate support rail 1360. In any case, in the illustrative embodiment, the support arm structure 570 includes the spacer plate 1304 whereas the support arm structure 580 does not include a structure similar to the spacer plate 1304.

Figure 33:
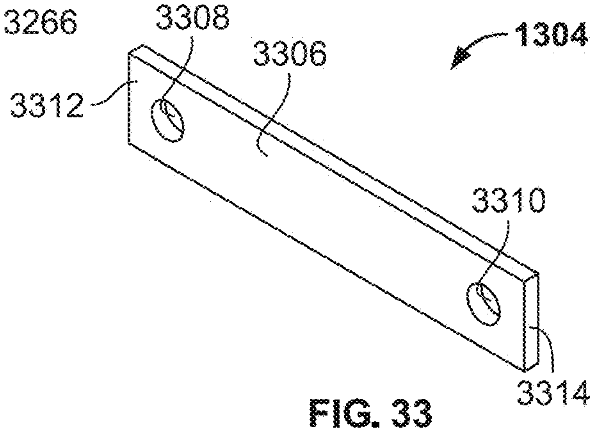
FIG. 33 is a perspective view of a spacer plate included in the midframe assembly shown in FIG. 13.

Referring now to FIG. 33, the illustrative spacer plate 1304 is configured to be arranged directly beneath the driver's seat assembly 410 in the vertical direction VD, at least in some embodiments. The spacer plate 1304 illustratively includes a rectangular plate 3306 having apertures 3308, 3310 formed therein. The apertures 3308, 3310 are located in close proximity to respective ends 3312, 3314 of the plate 3306.

Referring now to FIGS. 34 and 35, the rear suspension subframe assembly 330 is illustrated as supporting the rear suspension assemblies 340A, 340B and the powertrain unit 380 in FIG. 34 and with the rear suspension assemblies 340A, 340B and the powertrain unit 380 omitted in FIG. 35. In the illustrative embodiment, a swing arm assembly 3410 of the rear suspension assembly 340A is pivotally coupled to the rear suspension subframe assembly 330 via hinge joints 3402, 3404. Additionally, in the illustrative embodiment, a swing arm assembly 3412 of the rear suspension assembly 340B is pivotally coupled to the rear suspension subframe assembly 330 via hinge joints 3406, 3408.

The hinge joints 3402, 3404 includes respective hinge elements 3403, 3405 that are affixed directly to the faceplate 1440 of the rear suspension subframe assembly 330. In some embodiments, the hinge elements 3403, 3405 are arranged in direct contact with an interior side 3444 (shown in phantom) of the faceplate 3540 arranged opposite the exterior side 3442. The hinge joints 3402, 3404 are arranged in the lateral direction LD' between the frame arch 3520 and a weldment brace 3420 of the rear suspension subframe assembly 330 that is coupled to the base plate 3510 and the faceplate 3540. The hinge joint 3402 is illustratively arranged closer to the frame arch 3520 in the lateral direction LD' than the hinge joint 3404.

The hinge joints 3406, 3408 illustratively includes respective hinge elements 3407, 3409 that are affixed directly to the faceplate 3540 of the rear suspension subframe assembly 330. In some embodiments, the hinge elements 3407, 3409 are arranged in direct contact with the interior side 3444 of the faceplate 3540. The hinge joints 3406, 3408 are arranged in the lateral direction LD' between the frame arch 3530 and a weldment brace 3430 of the rear suspension subframe assembly 330 that is coupled to the base plate 3510 and the faceplate 3540 and spaced from the weldment brace 3420 in the lateral direction LD'. The hinge joint 3408 is illustratively arranged closer to the frame arch 3530 in the lateral direction LD' than the hinge joint 3406.

Referring now to FIGS. 35-55, the base plate 3510 illustratively has a U-shaped cross-section and includes a body 3502, an extension arm 3504 interconnected with the body 3502 that extends rearward away from the body 3502 in the longitudinal direction LD, and an extension arm 3506 interconnected with the body 3502 that extends rearward away from the body 3502 in the longitudinal direction LD. In some embodiments, the body 3502, the extension arm 3504, and the extension arm 3506 are integrally formed such that the base plate 3510 has a one-piece construction. In any case, the body 3502, the extension arm 3504, and the extension arm 3506 cooperate to define the central cavity 710. The body 3502 is formed to include an aperture 3502A arranged proximate a lateral end 3503 of the body 3502 and an aperture 3502B arranged proximate a lateral end 3505 of the body 3502 that is opposite the end 3503. The extension arm 3504 is formed to include a pair of rectangular slots 3504A, 3504B and the extension arm 3506 is formed to include a pair of rectangular slots 3506A, 3506B (shown in phantom).

Figure 37A:
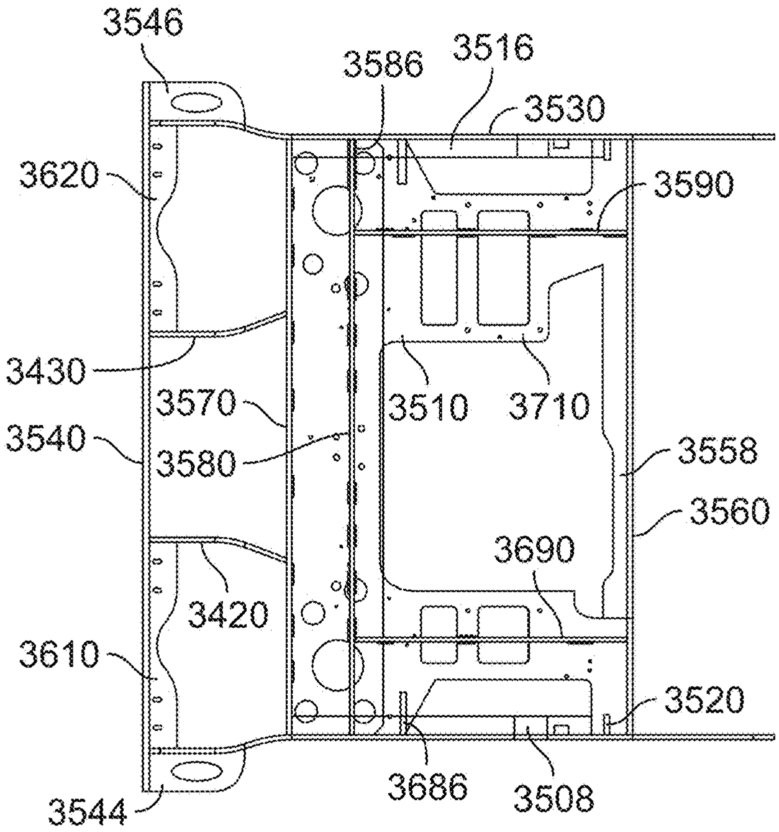
FIG. 37A is a top view of the rear suspension subframe shown in FIG. 35.
Figure 37B:
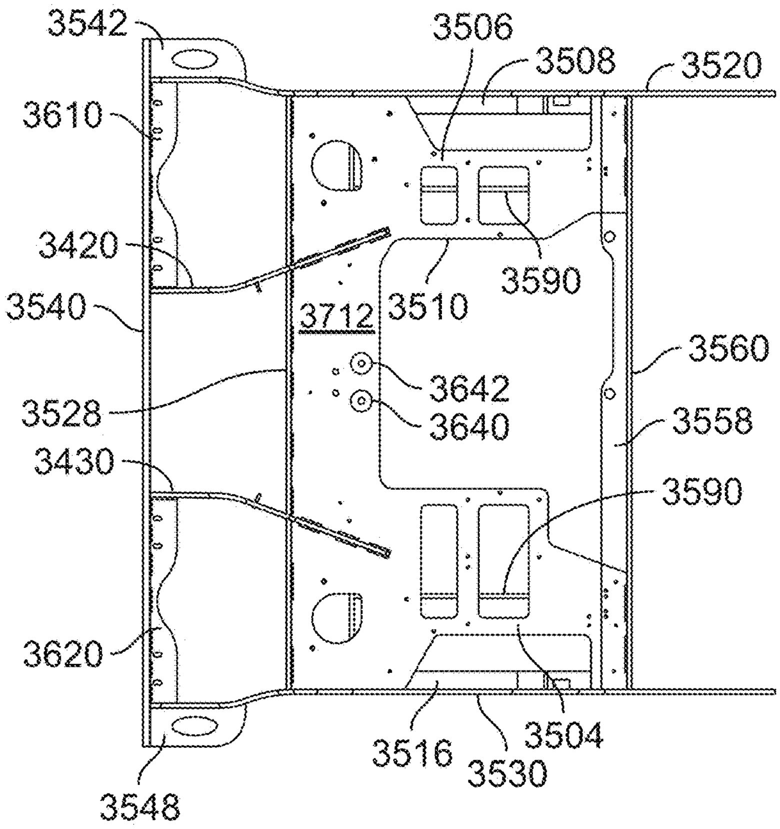
FIG. 37B is a bottom view of the rear suspension subframe shown in FIG. 35.
Figure 38:
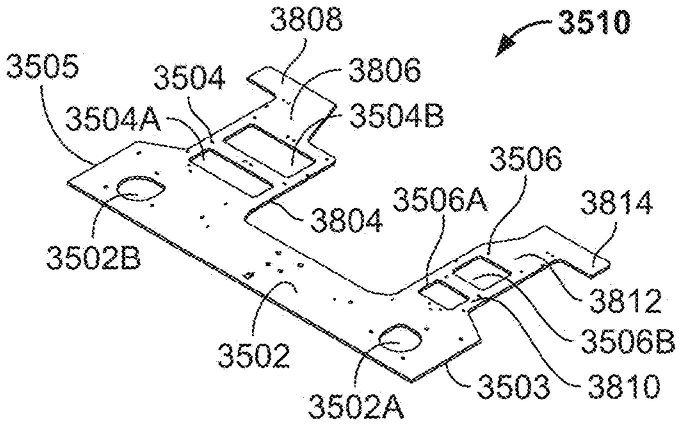
FIG. 38 is a perspective view of a base plate included in the rear suspension subframe shown in FIG. 35.

The illustrative base plate 3510 includes a top surface 3710 (see FIG. 37A) and a bottom surface 3712 (see FIG. 37B) arranged opposite the top surface 3710. The top and bottom surfaces 3710, 3712 are each cooperatively defined by the body 3502, the extension arm 3504, and the extension arm 3506. As best seen in FIG. 38, the extension arm 3504 includes a rectangular or substantially rectangular segment 3804 in which the slots 3504A, 3504B are formed, a trapezoidal or substantially trapezoidal segment 3806 interconnected with the segment 3804 and disposed rearward of the segment 3804 in the longitudinal direction LD, and a rectangular or substantially rectangular segment 3808 interconnected with the segment 3806 that defines a rear end of the extension arm 3504 in the longitudinal direction LD. Similar to the extension arm 3504, the extension arm 3506 includes a rectangular or substantially rectangular segment 3810 in which the slots 3506A, 3506B are formed, a trapezoidal or substantially trapezoidal segment 3812 interconnected with the segment 3810 and disposed rearward of the segment 3810 in the longitudinal direction LD, and a rectangular or substantially rectangular segment 3814 interconnected with the segment 3812 that defines a rear end of the extension arm 3506 in the longitudinal direction LD.

Figure 36:
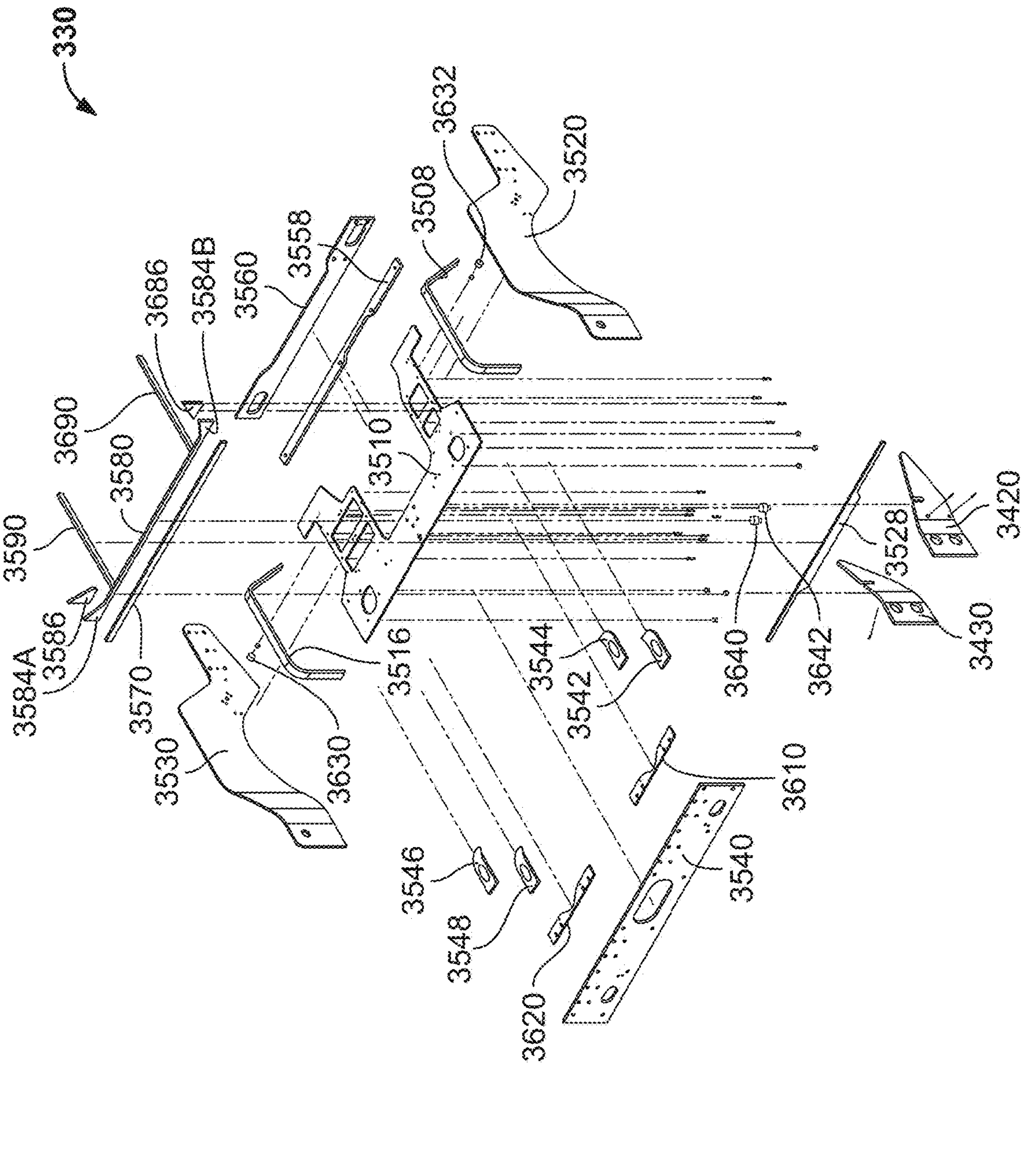
FIG. 36 is an exploded assembly view of the rear suspension subframe shown in FIG. 35.

In the illustrative embodiment, a U-shaped bar 3508 is coupled to the base plate 3510 and the frame arch 3520 and arranged in abutment with an interior face 3526 (shown in phantom) of the frame arch 3520. The bar 3508 is arranged to extend along the lateral end 3503 of the body 3502 rearward in the longitudinal direction LD to the extension arm 3506 as shown in FIGS. 36 and 37A. The bar 3508 extends above the base plate 3510 in the vertical direction VD and an uppermost segment 5508 (see FIG. 55) of the bar 3508 in the vertical direction VD lies in the same, or substantially the same, horizontal plane as the frame arch 3520. Segments 5510, 5512 of the bar 3508 are interconnected with the segment 5508 opposite one another. The segments 5510, 5512 are arranged in contact with the top surface 3710 of the base plate 3510 as suggested by FIG. 35.

Figure 42:
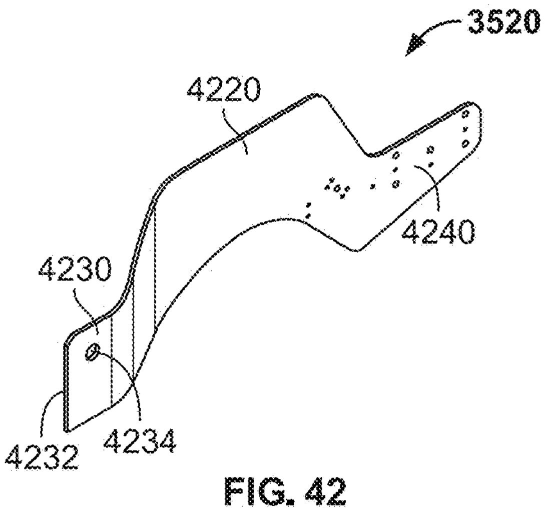
FIG. 42 is a perspective view of one frame arch included in the rear suspension subframe shown in FIG. 35.

As shown in FIG. 42, the illustrative frame arch 3520 includes a central arch 4220, a forward section 4230 interconnected with the central arch 4220, and a rear section 4240 interconnected with the central arch 4220 opposite the forward section 4230. The central arch 4220 is at least partially arranged above each of the forward section 4230 and the rear section 4240 in the vertical direction VD. A forward edge 4232 of the forward section 4230 contacts the interior face 3444 of the faceplate 3540. The rear section 4240 extends rearward of the endplate 3560 in the longitudinal direction LD. An aperture 4234 is formed in the forward section 4230 and the central arch 4220 is devoid or substantially devoid of holes or apertures.

Figure 43:
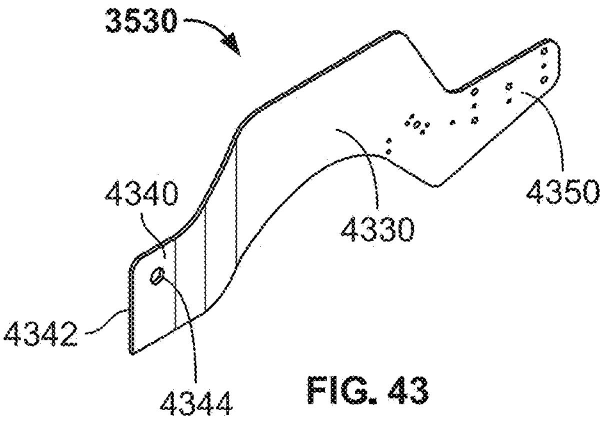
FIG. 43 is a perspective view of another frame arch included in the rear suspension subframe shown in FIG. 35.

As shown in FIG. 43, the illustrative frame arch 3530 includes a central arch 4330, a forward section 4340 interconnected with the central arch 4330, and a rear section 4350 interconnected with the central arch 4330 opposite the forward section 4340. The central arch 4330 is at least partially arranged above each of the forward section 4340 and the rear section 4350 in the vertical direction VD. A forward edge 4342 of the forward section 4340 contacts the interior face 3444 of the faceplate 3540. The rear section 4350 extends rearward of the endplate 3560 in the longitudinal direction LD. An aperture 4344 is formed in the forward section 4340 and the central arch 4330 is devoid or substantially devoid of holes or apertures.

In the illustrative embodiment, a U-shaped bar 3516 is coupled to the base plate 3510 and the frame arch 3530 and arranged in abutment with an interior face 3536 of the frame arch 3530. The bar 3516 is arranged to extend along the lateral end 3505 of the body 3502 rearward in the longitudinal direction LD to the extension arm 3504. The bar 3516 extends above the base plate 3510 in the vertical direction VD and an uppermost segment of the bar 3516 in the vertical direction VD lies in the same, or substantially the same, horizontal plane as the frame arch 3530. In the illustrative embodiment, the U-shaped bars 3508, 3516 are identical or substantially identical to one another.

The illustrative weldment brace 3420 extends rearward in the longitudinal direction LD from the faceplate 3540 to the body 3502 of the base plate 3510 as shown in FIG. 37A. As best seen in FIG. 37B, the weldment brace 3420 is arranged in direct contact with the bottom surface 3712 of the base plate 3510 such that the base plate 3510 is at least partially supported by the weldment brace 3420. The weldment brace 3420 extends along the bottom surface 3712 at an angle to the longitudinal direction LD toward the extension arm 3506. The weldment brace 3420 includes a notch 3524 that at least partially receives a forward support bar 3528.

Figure 49:
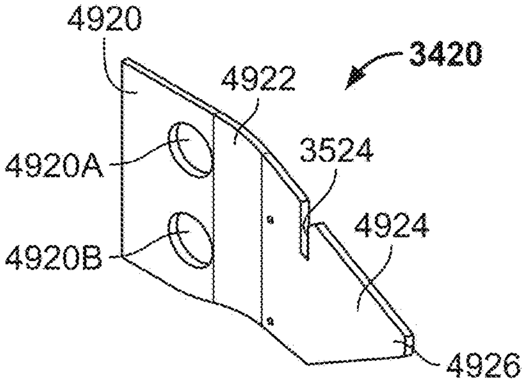
FIG. 49 is a perspective view of one weldment brace included in the rear suspension subframe shown in FIG. 35.

As shown in FIG. 49, the illustrative weldment brace 3420 includes a forward section 4920, an intermediate section 4922 interconnected with the forward section 4920 and disposed rearward of the section 4920 in the longitudinal direction LD, and a rear section 4924 interconnected with the intermediate section 4922 that defines a rear end of the brace 3420 in the longitudinal direction LD. When coupled to the bottom surface 3712 of the base plate 3510 as shown in FIG. 37B, the forward section 4920 is arranged parallel or substantially parallel to the longitudinal direction LD, whereas the section 4924 extends at an angle to the longitudinal direction LD toward the extension arm 3506. The forward section 4920 is formed to include apertures 4920A, 4920B, and the notch 3524 is formed in the rear section 4924. The rear section 4924 defines a triangular tip 4926 of the weldment brace 3420.

The illustrative weldment brace 3430 extends rearward in the longitudinal direction LD from the faceplate 3540 to the body 3502 of the base plate 3510 as shown in FIG. 37A. As best seen in FIG. 37B, the weldment brace 3430 is arranged in direct contact with the bottom surface 3712 of the base plate 3510 such that the base plate 3510 is at least partially supported by the weldment brace 3430. The weldment brace 3430 extends along the bottom surface 3712 at an angle to the longitudinal direction LD toward the extension arm 3504. The weldment brace 3430 includes a notch 3538 that at least partially receives the forward support bar 3528. When the forward support bar 3528 is received by the notches 3524, 3538 as shown in FIG. 35, the forward support bar 3528 contacts a forward edge of the base plate 3510 and extends all the way, or substantially all the way, across the forward edge of the base plate 3510 in the lateral direction LD'.

Figure 50:
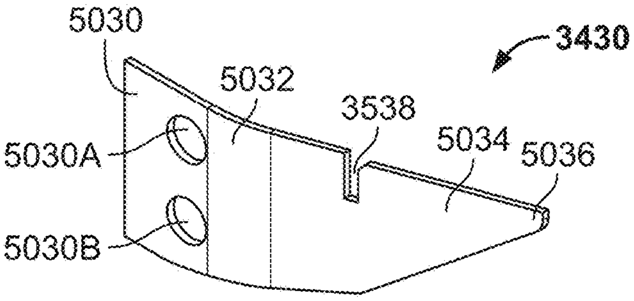
FIG. 50 is a perspective view of another weldment brace included in the rear suspension subframe shown in FIG. 35.

As shown in FIG. 50, the illustrative weldment brace 3430 includes a forward section 5030, an intermediate section 5032 interconnected with the forward section 5030 and disposed rearward of the section 5030 in the longitudinal direction LD, and a rear section 5034 interconnected with the intermediate section 5032 that defines a rear end of the brace 3430 in the longitudinal direction LD. When coupled to the bottom surface 3712 of the base plate 3510 as shown in FIG. 37B, the forward section 5030 is arranged parallel or substantially parallel to the longitudinal direction LD, whereas the section 5034 extends at an angle to the longitudinal direction LD toward the extension arm 3504. The forward section 5030 is formed to include apertures 5030A, 5030B, and the notch 3538 is formed in the rear section 5034. The rear section 5034 defines a triangular tip 5036 of the weldment brace 3430.

Figure 39:
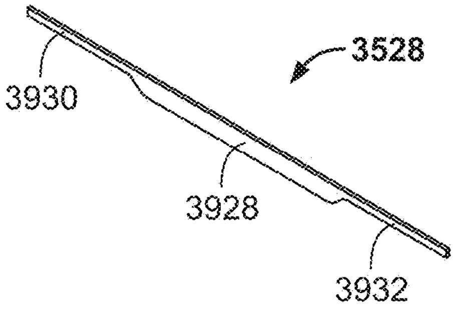
FIG. 39 is a perspective view of a forward support bar included in the rear suspension subframe shown in FIG. 35.

As shown in FIG. 39, the illustrative forward support bar 3528 includes a central body 3928 and elongate fingers 3930, 3932 coupled to the body 3928 opposite one another. The width of the body 3928 is illustratively greater than the width of each of the fingers 3930, 3932. The fingers 3930, 3932 are identical or substantially identical to one another and each have a rectangular or substantially rectangular cross-sectional shape. The central body 3928 is sized to be received in the notches 3524, 3538 of the respective weldment braces 3420, 3430.

Weldment tabs 3542, 3544 are illustratively directly affixed to the interior side 3444 of the faceplate 3540 such that the weldment tabs 3542, 3544 extend rearward away from the faceplate 3540 in the longitudinal direction LD as shown in FIG. 35. The weldment tabs 3542, 3544 are formed to include respective apertures 3542A, 3544A. The weldment tabs 3542, 3544 are spaced from one another in the vertical direction VD and arranged at least partially outward of the frame arch 3520 in the lateral direction LD'. In the illustrative embodiment, the weldment tabs 3542, 3544 are identical or substantially identical to one another.

Figure 46:
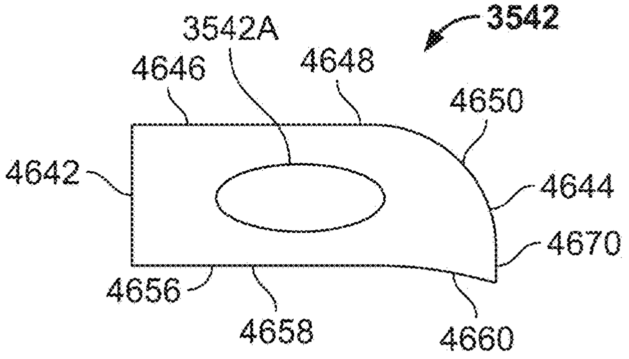
FIG. 46 is a front elevation view of a weldment tab included in the rear suspension subframe shown in FIG. 35.

As shown in FIG. 46, the illustrative weldment tab 3542 includes a planar end 4642 and a convex or substantially convex end 4644 arranged opposite the planar end 4642. The ends 4642, 4644 are interconnected by sides 4646, 4656 arranged opposite one another. The side 4646 is defined by a planar segment 4648 and an arcuate segment 4650 interconnected with the planar segment 4648. The side 4656 is defined by a planar segment 4658 and an arcuate segment 4660 interconnected with the planar segment 4658. The convex end 4644 at least partially defines a curved tip 4670 of the weldment tab 3542.

Weldment tabs 3546, 3548 are illustratively directly affixed to the interior side 3444 of the faceplate 3540 such that the weldment tabs 3546, 3548 extend rearward away from the faceplate 3540 in the longitudinal direction LD as shown in FIG. 35. The weldment tabs 3546, 3548 are formed to include respective apertures (only aperture 3546A is shown). The weldment tabs 3546, 3548 are spaced from one another in the vertical direction VD and arranged at least partially outward of the frame arch 3530 in the lateral direction LD'. In the illustrative embodiment, the weldment tabs 3546, 3548 are identical or substantially identical to one another. Additionally, in some embodiments, the weldment tabs 3546, 3548 are identical or substantially identical to the weldment tabs 3542, 3544.

Figure 40:
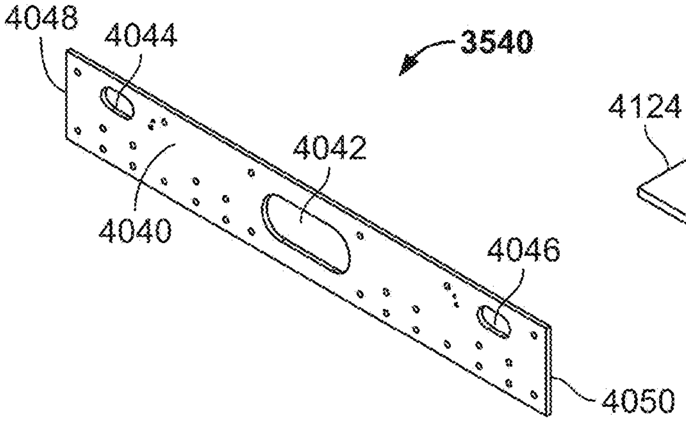
FIG. 40 is a perspective view of a faceplate included in the rear suspension subframe shown in FIG. 35.

As shown in FIG. 40, the illustrative faceplate 3540 includes, or is otherwise embodied as, a rectangular panel 4040 having the exterior and interior sides 3442, 3444. The panel 4040 is formed to includes a central aperture 4042 arranged between peripheral apertures 4044, 4046 in the lateral direction LD'. The central aperture 4042 is located midway between opposite ends 4048, 4050 of the panel 4040 and lies on a midline of the rear suspension subframe assembly 330 in the lateral direction LD'. The width of the central aperture 4042 in the lateral direction LD' is greater than the width of each of the peripheral apertures 4044, 4046 in the lateral direction LD'.

A rear support bar 3558 is illustratively coupled to and extends across the extension arms 3504, 3506 of the base plate 3510 in the lateral direction LD' as shown in FIGS. 35, 37A, and 37B. In some embodiments, the rear support bar 3558 extends all the way, or substantially all the way, across the base plate 3510 in the lateral direction LD'. Additionally, in some embodiments, the rear support bar 3558 is coupled to the extension arms 3504, 3506 such that the rear support bar 3558 at least partially encloses the central cavity 710. In any case, in the illustrative embodiment, an endplate 3560 is coupled to the rear support bar 3558 such that the endplate 3560 extends all the way, or substantially all the way, across the rear support bar 3558 in the lateral direction LD'. In some embodiments, each of the front support bar 3528, the rear support bar 3558, and the endplate 3560 contacts the opposing interior faces 3526, 3536 of the corresponding frame arches 3520, 3530.

Figure 51:
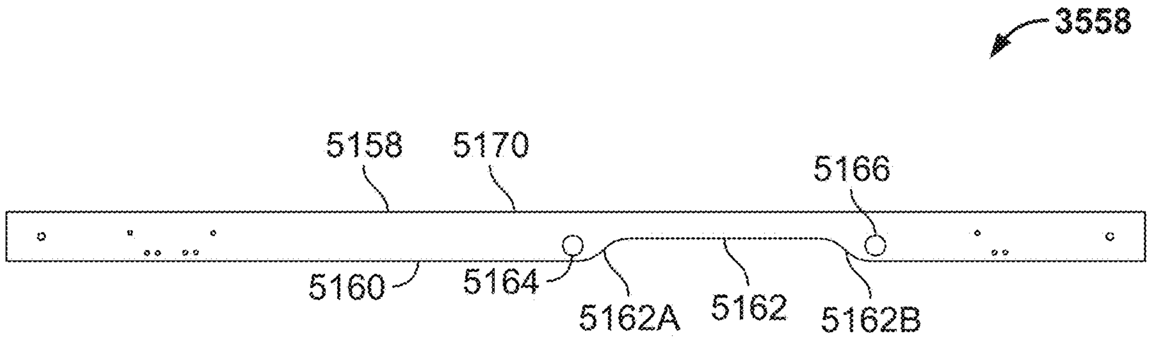
FIG. 51 is a front elevation view of a rear support bar included in the rear suspension subframe shown in FIG. 35.

As shown in FIG. 51, the illustrative rear support bar 3558 includes, or is otherwise embodied as, an elongate rectangular bar or strip 5158. The bar 5158 includes a forward edge 5160 and a rear edge 5170 arranged opposite the forward edge 5160. The forward edge 5160 is formed to include a slot 5162 at least partially defined by fillets 5162A, 5162B. Apertures 5164, 5166 are formed along the forward edge 5160 in close proximity to the slot 5162 such that the slot 5162 extends in the lateral direction LD' between the apertures 5164, 5166. The rear edge 5170 is devoid of one or more slots or grooves.

Figure 44:
FIG. 44 is a front elevation view of an endplate included in the rear suspension subframe shown in FIG. 35.

As shown in FIG. 44, the illustrative endplate 3560 includes, or is otherwise embodied as, an elongate rectangular plate 4460 coupled to the rear support bar 3558. In some embodiments, in cooperation with the rear support bar 3558, the elongate plate 4460 at least partially closes off the rear end of the central cavity 710. The plate 4460 includes a lower edge 4462 and an upper edge 4472 arranged opposite the lower edge 4462. The upper edge 4472 is formed to include a slot 4474 at least partially defined by angled transitional edges or chamfers 4474A, 4474B. The lower edge 4462 is devoid of one or more slots or grooves. The plate 4460 includes planar sides 4480, 4490 arranged opposite one another. The plate 4460 includes a hole 4482 disposed in close proximity to the lateral side 4480 and a hole 4484 disposed in close proximity to the lateral side 4490.

In the illustrative embodiment, a reinforcement strip 3570 (e.g., a bar, rod, or the like) is directly coupled to the body 3502 of the base plate 3510 along the forward edge thereof. In some embodiments, the reinforcement strip 3570 is coupled to the forward support bar 3528 such that the reinforcement strip 3570 is aligned with, or substantially aligned with, the forward support bar 3528 in the longitudinal direction LD. Additionally, in some embodiments, the reinforcement strip 3570 contacts the opposing interior faces 3526, 3536 of the corresponding frame arches 3520, 3530.

Figure 52:
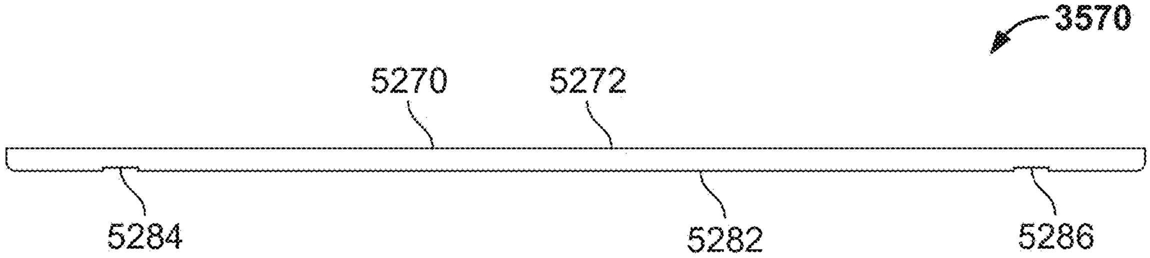
FIG. 52 is a front elevation view of a reinforcement strip included in the rear suspension subframe shown in FIG. 35.

As shown in FIG. 52, the illustrative reinforcement strip 3570 includes, or is otherwise embodied as, an elongate rectangular strip 5270 having a lower edge 5272 and an upper edge 5282 arranged opposite the lower edge 5272. In some embodiments, the lower edge 5272 is arranged in contact with the top surface 3710 and/or the forward support bar 3528 along the forward edge of the base plate 3510. The lower edge 5272 is devoid of one or more notches or grooves. The upper edge 5282 includes notches 5284, 5286 facing upward in the vertical direction VD when the reinforcement strip 3570 is coupled to the base plate 3510 as shown in FIGS. 34 and 35.

In the illustrative embodiment, a reinforcement beam 3580 is directly coupled to the body 3502 of the base plate 3510 and arranged rearward of the reinforcement strip 3570 in the longitudinal direction LD. The illustrative reinforcement beam 3580 includes a central body 3582 extending in the lateral direction LD' between opposite trapezoidal ends 3584A, 3584B (both shown in FIG. 53). The central body 3582 has a rectangular or substantially rectangular cross-section and each of the trapezoidal ends 3584A, 3584B has a trapezoidal or substantially trapezoidal cross-section. In some embodiments, each of the trapezoidal ends 3584A, 3584B of the reinforcement beam 3580 contacts the opposing interior faces 3526, 3536 of the corresponding frame arches 3520, 3530.

Figure 53:
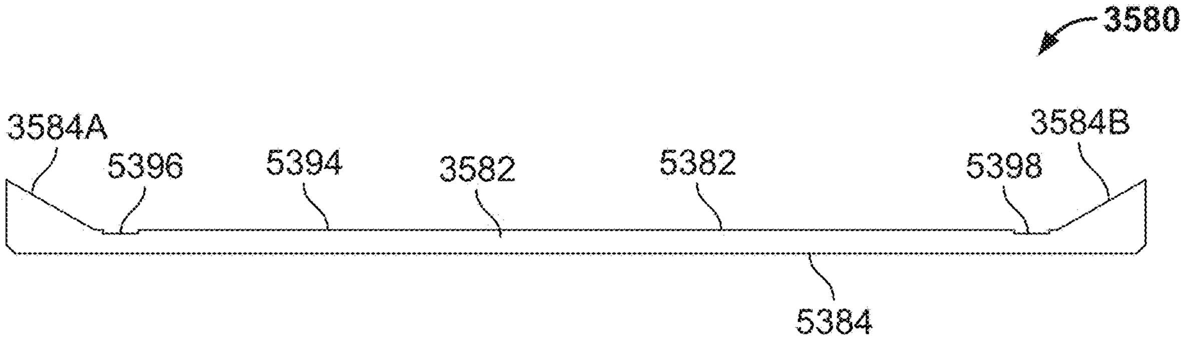
FIG. 53 is a front elevation view of a reinforcement beam included in the rear suspension subframe shown in FIG. 35.

As shown in FIG. 53, the central body 3582 of the illustrative reinforcement beam 3580 includes, or is otherwise embodied as, an elongate rectangular strip 5382 having a lower edge 5384 and an upper edge 5394 arranged opposite the lower edge 5384. The lower edge 5384 is arranged in contact with the top surface 3710 and devoid of one or more notches or grooves. The upper edge 5394 includes notches 5396, 5398 facing upward in the vertical direction VD when the reinforcement beam 3580 is coupled to the base plate 3510 as shown in FIGS. 34 and 35. In some embodiments, the notch 5396 is contiguous to the trapezoidal end 3584A and the notch 5398 is contiguous to the trapezoidal end 3584B.

In the illustrative embodiment, trapezoidal reinforcements 3586, 3686 are coupled to the base plate 3510. In some embodiments, the reinforcement 3586 is directly coupled to the body 3502 and arranged rearward of the trapezoidal end 3584A of the reinforcement beam 3580 in the longitudinal direction LD. In such embodiments, the reinforcement 3586 contacts the interior face 3536 of the frame arch 3530. In some embodiments, the reinforcement 3686 is arranged rearward of the trapezoidal end 3584B of the reinforcement beam 3580 in the longitudinal direction LD and contacts the interior face 3526 of the frame arch 3520. In any case, the illustrative trapezoidal reinforcements 3586, 3686 are identical or substantially identical to one another.

Figure 45:
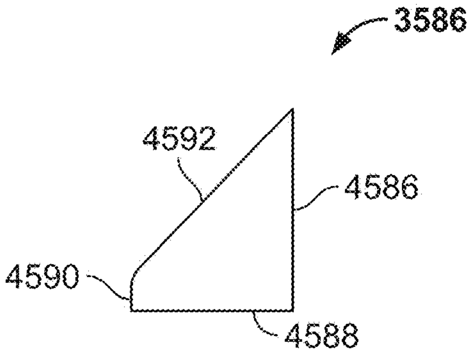
FIG. 45 is a front elevation view of a reinforcement included in the rear suspension subframe shown in FIG. 35.

As shown in FIG. 45, the illustrative trapezoidal reinforcement 3586 includes a face 4586 extending parallel to the vertical direction VD and a face 4588 arranged perpendicular to the face 4586. When the reinforcement 3586 is coupled to the base plate 3510 and the frame arch 3530 as shown in FIG. 35, the face 4586 contacts the interior face 3536 and the face 4588 contacts the body 3502. The reinforcement 3586 includes a face 4590 extending parallel to the face 4586 and a face 4592 interconnected with the face 4590 and the face 4586 that extends at an acute angle to the face 4586.

In the illustrative embodiment, reinforcement bars 3590, 3690 are coupled to the base plate 3510. More specifically, the reinforcement bar 3590 is coupled to the extension arm 3504 and the reinforcement beam 3580 such that the reinforcement bar 3590 extends rearward away from the reinforcement beam 3580 over the extension arm 3504 in the longitudinal direction LD. The reinforcement bar 3590 is illustratively arranged perpendicular to the reinforcement beam 3580. The reinforcement bar 3690 is coupled to the extension arm 3506 and the reinforcement beam 3580 such that the reinforcement bar 3690 extends rearward away from the reinforcement beam 3580 over the extension arm 3506 in the longitudinal direction LD. The reinforcement bar 3690 is illustratively arranged perpendicular to the reinforcement beam 3580. The illustrative reinforcement bars 3590, 3690 are identical or substantially identical to one another.

Figure 54:
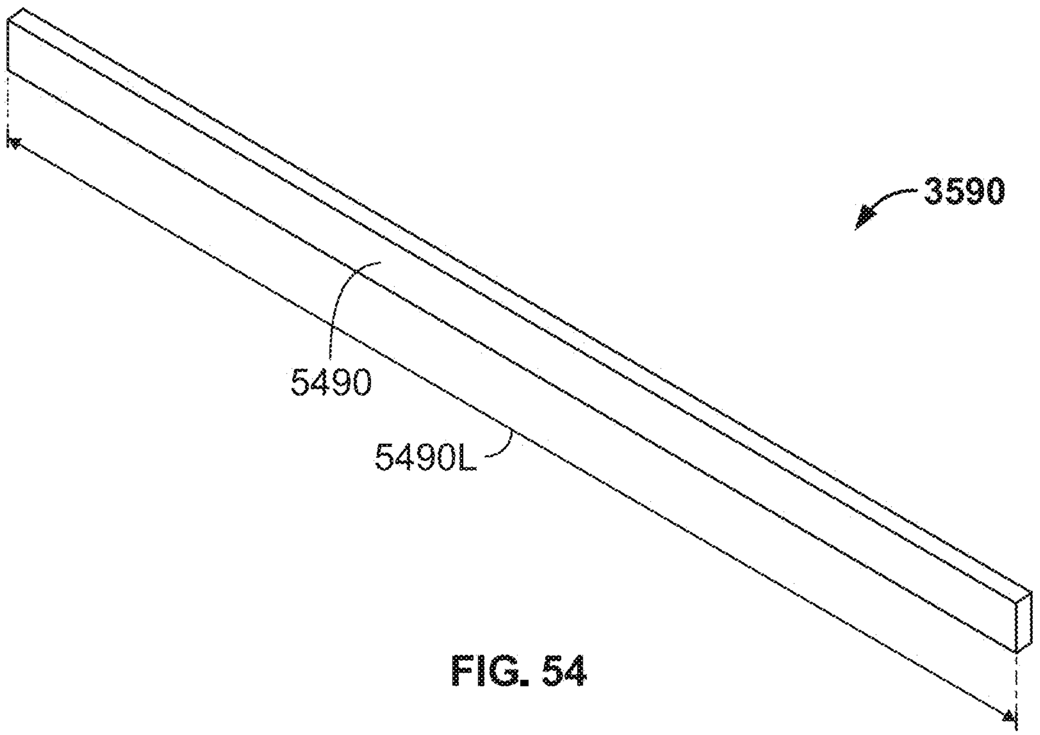
FIG. 54 is a perspective view of a reinforcement rod included in the rear suspension subframe shown in FIG. 35.
Figure 55:
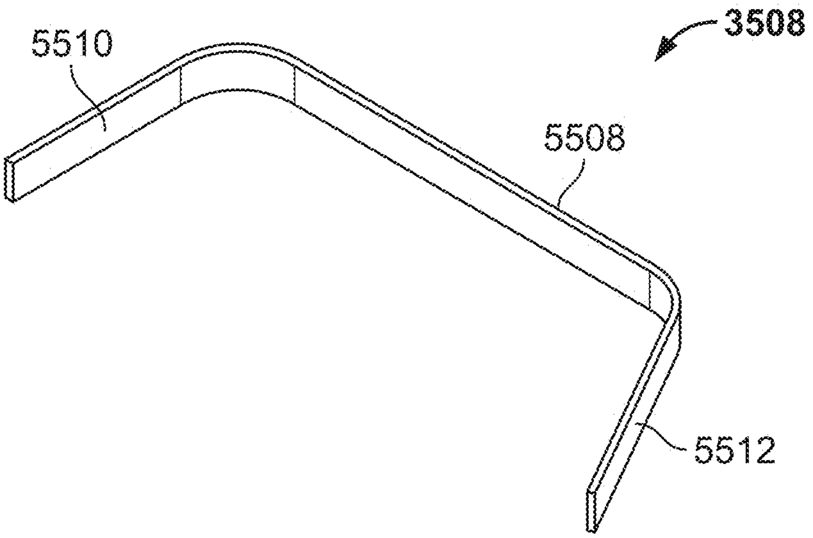
FIG. 55 is a perspective view of a U-shaped bar included in the rear suspension subframe shown in FIG. 35.

As shown in FIG. 54, the illustrative reinforcement bar 3590 includes, or is otherwise embodied as, an elongate rectangular bar 5490 having a length 5490L. When the bar 5490 is coupled to the base plate 3510 as shown in FIG. 35, the length 5490L is equal or substantially equal to the distance between the reinforcement beam 3580 and the endplate 3560 in the longitudinal direction LD.

As shown in FIG. 36, the illustrative rear suspension subframe assembly 330 includes mounting plates 3610, 3620 arranged in contact with the interior side 3444 of the faceplate 3540. As best seen in FIGS. 37A and 37B, the mounting plate 3610 is arranged in contact with the faceplate 3540 such that the mounting plate 3610 extends in the lateral direction LD' between the frame arch 3520 and the weldment brace 3420, and the mounting plate 3620 is arranged in contact with the faceplate 3540 such that the mounting plate 3620 extends in the lateral direction LD' between the frame arch 3530 and the weldment brace 3430. In the illustrative embodiment, the mounting plates 3610, 3620 are identical or substantially identical to one another. In some embodiments, the hinge joints 3402, 3404 may be mounted to and supported by the mounting plate 3610, whereas the hinge joints 3406, 3408 may be mounted to and supported by the mounting plate 3620.

Figure 41:
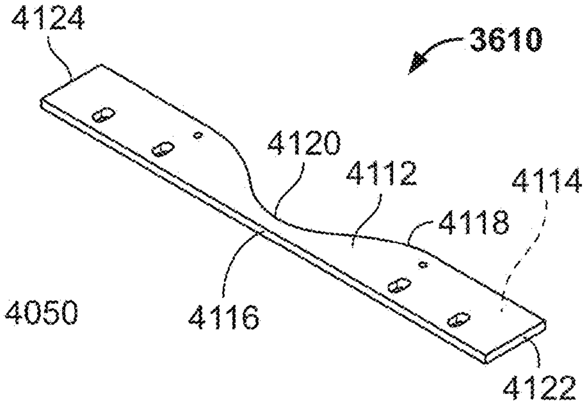
FIG. 41 is a perspective view of a support panel included in the rear suspension subframe shown in FIG. 35.

As shown in FIG. 41, the illustrative mounting plate 3610 includes planar surfaces 4112, 4114 arranged opposite one another. In some embodiments, the hinge joints 3402, 3404 may be directly affixed to the planar surface 4112. The mounting plate 3610 includes a forward face 4116 arranged in contact with the interior side 3444 of the faceplate 3540 and a rear face 4118 arranged in confronting relation to the base plate 3510. The forward face 4116 is a planar or substantially planar face devoid of arcuate segments. The rear face 4118 is a partially arcuate face defining a semicircular notch 4120. The notch 4120 is located midway or substantially midway between opposite sides 4122, 4124 of the mounting plate 3610 in the lateral direction LD'. In some embodiments, when affixed to the planar surface 4112, the hinge joints 3402, 3404 may be arranged opposite one another relative to the notch 4120.

As shown in FIG. 36, the illustrative rear suspension subframe assembly 330 includes nuts 3630, 3632 that are coupled, respectively, to interior faces 3536, 3526 of the corresponding frame arches 3530, 3520. Additionally, the illustrative rear suspension subframe assembly 330 includes spacers 3640, 3462 that are affixed directly to the bottom surface 3712 of the base plate 3510 as best seen in FIG. 37B. The nuts 3630, 3632 are identical or substantially identical to one another. The spacers 3640, 3642 are identical or substantially identical to one another.

Figure 47:
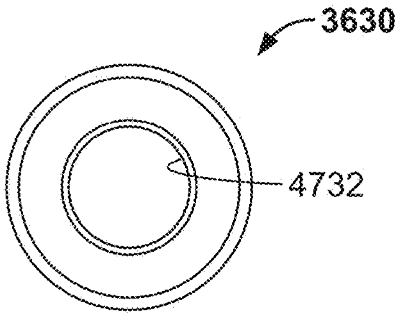
FIG. 47 is a front elevation view of a nut included in the rear suspension subframe shown in FIG. 35.
Figure 48:
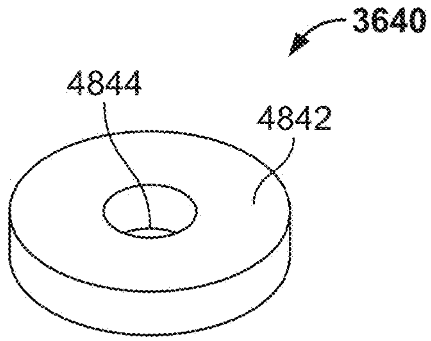
FIG. 48 is a perspective view of a spacer included in the rear suspension subframe shown in FIG. 35.

As shown in FIG. 47, the illustrative nut 3630 includes a bore 4732 having grooves (not shown) sized to receive threads of a fastener (e.g., a screw or the like). As shown in FIG. 48, the illustrative spacer 3640 includes, or is otherwise embodied as, a circular disk 4842 surrounding a central aperture 4844.

Figure 56:
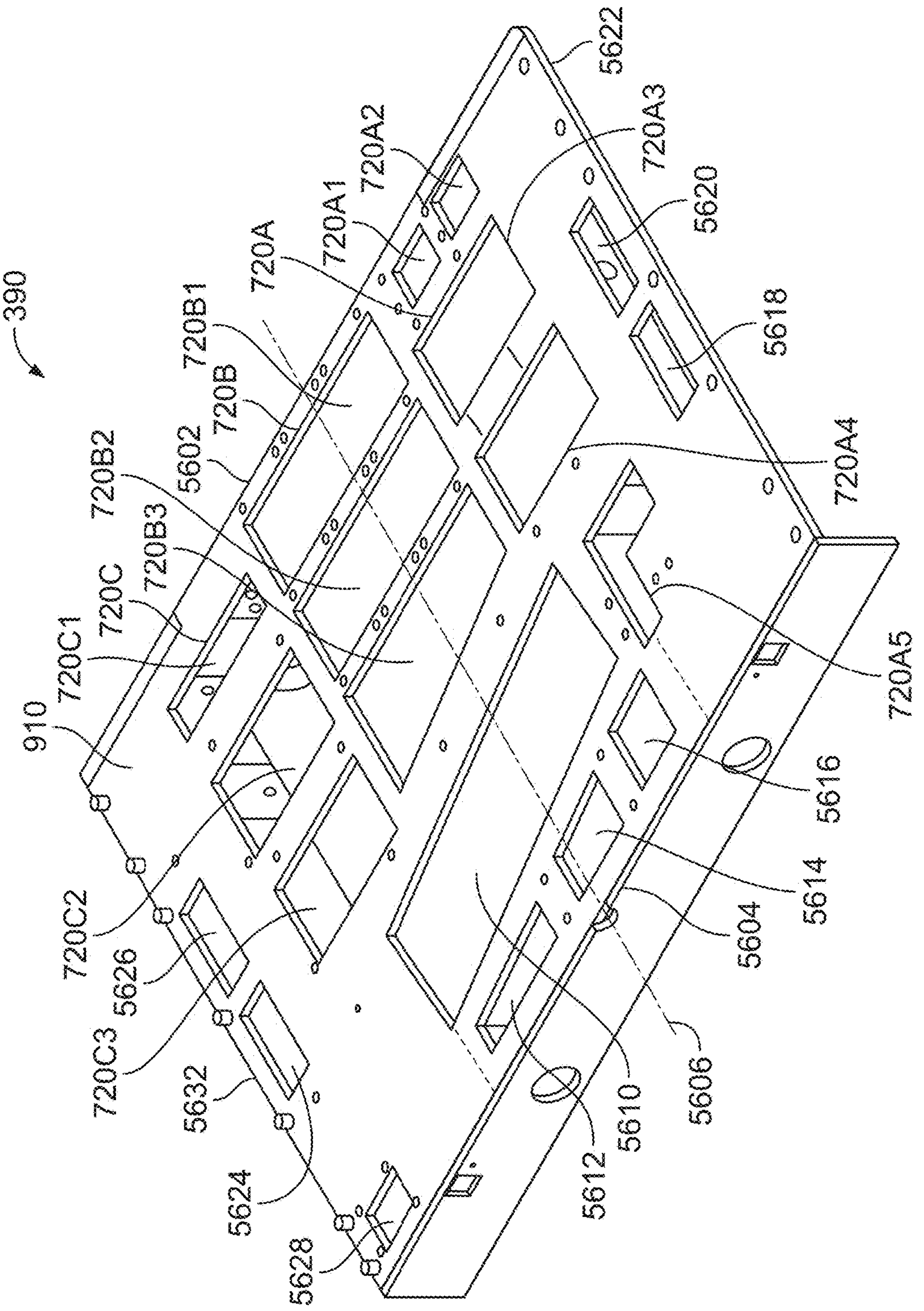
FIG. 56 is a perspective view of the electronics cradle assembly.

Referring now to FIG. 56, the illustrative cover plate 910 is formed to include various slots described in greater detail below that are arranged above various mechanical and/or electrical devices supported by the electronics cradle assembly 390 in the vertical direction VD. In some embodiments, provision of the slots improves airflow and facilitates cooling of mechanical and/or electrical devices supported by the electronics cradle assembly 390. Additionally, in some embodiments, provision of the slots reduces the surface area of the cover plate 910 to manage heat transfer to the cover plate 910.

The slots 720A formed in the cover plate 910 include a slot 720A1, a slot 720A2, a slot 720A3, a slot 720A4, and a slot 720A5. The slots 720A1, 720A2 are arranged beside one another such that the slots 720A1, 720A2 are aligned or substantially aligned in the longitudinal direction LD and spaced apart from one another in the lateral direction LD'. The slots 720A1, 720A2 are disposed closer to a front end 5602 of the cover plate 910 than each of the slots 720A3, 720A4, 720A5. The slots 720A1, 720A2 may be the same or substantially the same size. Each of the slots 720A1, 720A2 illustratively has a square shape. Of course, in other embodiments, it should be appreciated the slots 720A1, 720A2 may take the shape of other suitable geometric forms.

The illustrative slot 720A3 is aligned or substantially aligned with the slots 720A1, 720A2 in the lateral direction LD'. The width of the slot 720A3 in the lateral direction LD' is greater than the widths of each of the slots 720A1, 720A2 in the lateral direction LD'. Additionally, the length of the slot 720A3 in the longitudinal direction LD is greater than the lengths of each of the slots 720A1, 720A2 in the longitudinal direction LD. The slot 720A3 is disposed closer to a rear end 5604 of the cover plate 910 than each of the slots 720A1, 720A2. The slot 720A3 illustratively has a rectangular shape. Of course, in other embodiments, it should be appreciated the slot 720A3 may take the shape of other suitable geometric forms.

The illustrative slot 720A4 is aligned or substantially aligned with the slot 720A3 in the lateral direction LD'. The width of the slot 720A4 in the lateral direction LD' is the same or substantially the same as the width of the slot 720A3 in the lateral direction LD'. Additionally, the length of the slot 720A4 in the longitudinal direction LD is the same or substantially the same as the length of the slot 720A3 in the longitudinal direction LD. The slot 720A4 is disposed closer to the rear end 5604 of the cover plate 910 than the slot 720A3. The slot 720A4 illustratively has a rectangular shape. Of course, in other embodiments, it should be appreciated the slot 720A4 may take the shape of other suitable geometric forms.

The illustrative slot 720A5 is aligned or substantially aligned with the slot 720A4 in the lateral direction LD'. The slot 720A5 is disposed closer to the rear end 5604 of the cover plate 910 than each of the slots 720A1, 720A2, 720A3, 720A4. The slot 720A5 defines an L-shape. Of course, in other embodiments, it should be appreciated the slot 720A5 may take the shape of other suitable geometric forms.

The slots 720B formed in the cover plate 910 include a slot 720B1, a slot 720B2, and a slot 720B3. The slots 720B1, 720B2, 720B3 are aligned or substantially aligned in the lateral direction LD'. The slot 720B1 is disposed closer to the front end 5602 of the cover plate 910 than each of the slots 720B2, 720B3, whereas the slot 720B3 is disposed closer to the rear end 5604 of the cover plate 910 than each of the slots 720B1, 720B2. The slots 720B1, 720B2 may be the same or substantially the same size. Whereas the slots 720B1, 720B2 illustratively have a rectangular shape, the slot 720B3 has a trapezoidal shape. Of course, in other embodiments, it should be appreciated the slots 720B1, 720B2, 720B3 may take the shape of other suitable geometric forms.

In the illustrative embodiment, each of the slots 720B1, 720B2, 720B3 has a width in the lateral direction LD' that is greater than the width of each of the slots 720A3, 720A4 in the lateral direction LD'. Additionally, in the illustrative embodiment, each of the slots 720B1, 720B2, 720B3 lies on a midline 5606 of the cover plate 910 in the lateral direction LD'.

The slots 720C formed in the cover plate 910 include a slot 720C1, a slot 720C2, and a slot 720C3. The slots 720C1, 720C2, 720C3 are aligned or substantially aligned in the lateral direction LD'. The slot 720C1 is disposed closer to the front end 5602 of the cover plate 910 than each of the slots 720C2, 720C3, whereas the slot 720C3 is disposed closer to the rear end 5604 of the cover plate 910 than each of the slots 720C1, 720C2. The slots 720C2, 720C3 may be the same or substantially the same size, while the slot 720C1 may have a length in the longitudinal direction LD that is less than the length of each of the slots 720C2, 720C3 in the longitudinal direction LD. The illustrative slots 720C1, 720C2, 720C3 each have a rectangular shape. Of course, in other embodiments, it should be appreciated the slots 720C1, 720C2, 720C3 may take the shape of other suitable geometric forms.

In the illustrative embodiment, each of the slots 720C1, 720C2, 720C3 has a width in the lateral direction LD' that is less than the width of each of the slots 720B1, 720B2, 720B3 in the lateral direction LD'. Each of the illustrative slots 720C1, 720C2, 720C3 has a width in the lateral direction LD' that is the same or substantially the same as the width of the slots 720A3, 720A4 in the lateral direction LD'. In the illustrative embodiment, the slots 720C1, 720C2, 720C3 are arranged opposite the slots 720A1, 720A2, 720A3, 720A4, 720A5 in the lateral direction LD' relative to the midline 5606.

The illustrative cover plate 910 includes a slot 5610. The slot 5610 is illustratively arranged on the midline 5606 closer to the rear end 5604 of the cover plate 910 than the front end 5602 of the cover plate 910. As such, the slot 5610 is at least partially aligned with the slots 720B1, 720B2, 720B3 in the lateral direction LD'. The slot 5610 has a width in the lateral direction LD' that is greater than (i) the widths of the slots 720A3, 720A4 in the lateral direction LD', (ii) the widths of the slots 720B1, 720B3, 720B3 in the lateral direction LD', and (iii) the widths of the slots 720C1, 720C2, 720C3 in the lateral direction LD'. In the illustrative embodiment, the slot 5610 has the shape of a parallelogram. Of course, in other embodiments, it should be appreciated the slot 5610 may take the shape of another suitable geometric form.

The cover plate 910 illustratively includes slots 5612, 5614, 5616. Each of the slots 5612, 5614, 5616 is disposed in the longitudinal direction LD between the slot 5610 and the rear end 5604 of the cover plate 910. The slot 5614 is illustratively arranged on the midline 5606 and partially aligned with the slots 5610, 720B1, 720B2, 720B3 in the lateral direction LD'. The slot 5612 is arranged opposite the slot 5616 in the lateral direction LD' relative to the midline 5606. The slot 5612 has a width in the lateral direction LD' that is greater than the width of each of the slots 5614, 5616 in the lateral direction LD'. Each of the slots 5612, 5614, 5616 illustratively has a trapezoidal shape. Of course, in other embodiments, it should be appreciated the slots 5612, 5614, 5616 may take the shape of other suitable geometric forms.

The illustrative cover plate 910 includes slots 5618, 5620 arranged adjacent a lateral side 5622 of the cover plate 910. More specifically, the slots 5618, 5620 are disposed between the slots 720A3, 720A4, 720A5 and the lateral side 5622 in the lateral direction LD'. In the illustrative embodiment, each of the slots 5618, 5620 has a rectangular shape. Of course, in other embodiments, it should be appreciated the slots 5618, 5620 may take the shape of other suitable geometric forms.

The illustrative cover plate 910 includes slots 5624, 5626 arranged adjacent a lateral side 5632 of the cover plate 910 that is disposed opposite the lateral side 5622. More specifically, the slots 5624, 5626 are disposed between the slots 720C1, 720C2, 720C3 and the lateral side 5632 in the lateral direction LD'. In the illustrative embodiment, each of the slots 5624, 5626 has a rectangular shape. Of course, in other embodiments, it should be appreciated the slots 5624, 5626 may take the shape of other suitable geometric forms.

The illustrative cover plate 910 includes a slot 5628. The slot 5628 is aligned or substantially aligned with the slots 5624, 5626 in the lateral direction LD'. Additionally, the slot 5628 is aligned or substantially aligned with the slots 5612, 5614, 5616 in the longitudinal direction LD. The slot 5628 is disposed in close proximity to the lateral side 5632 and the rear end 5604 of the cover plate 910. The slot 5628 illustratively has a square shape. Of course, in other embodiments, it should be appreciated the slot 5628 may take the shape of another suitable geometric form.

Figure 57:
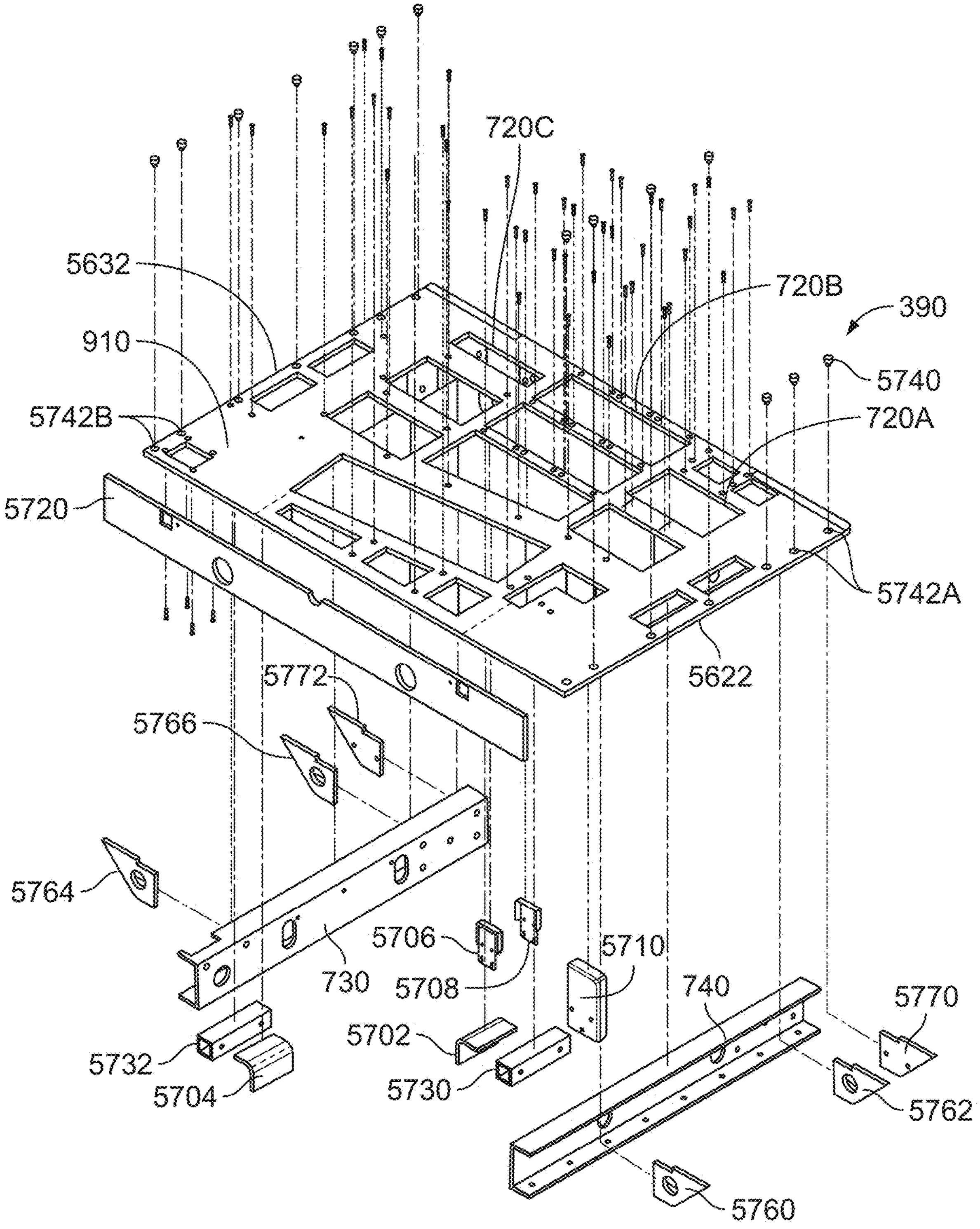
FIG. 57 is a partially exploded perspective view of the electronics cradle assembly shown in FIG. 56.
Figure 58A:
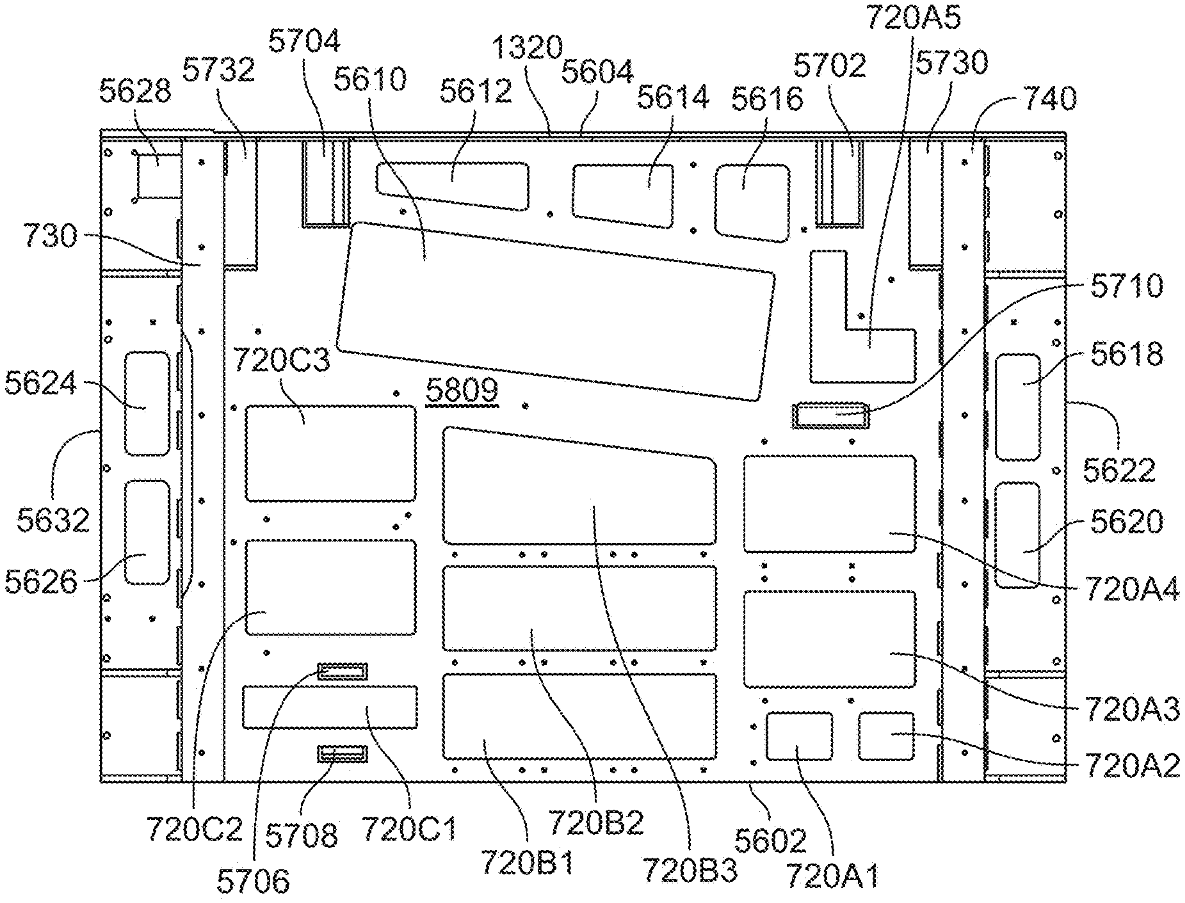
FIG. 58A is a bottom view of the electronics cradle assembly shown in FIG. 56.

Referring now to FIGS. 57-69, the illustrative electronics cradle assembly 390 includes brackets 5702, 5704 (see FIG. 57). In some embodiments, the brackets 5702, 5704 may be directly affixed to an underside 5809 (see FIG. 58A) of the cover plate 910. Of course, in other embodiments, the brackets 5702, 5704 may be coupled to the cover plate 910 in another suitable manner. In any case, when the bracket 5702 is coupled to the cover plate 910 as shown in FIG. 58A, the bracket 5702 is arranged in close proximity to the rear end 5604 of the cover plate 910 and disposed between the slot 5616 and the channel foot 740 in the lateral direction LD'. When the bracket 5704 is coupled to the cover plate 910 as shown in FIG. 58A, the bracket 5704 is arranged in close proximity to the rear end 5604 of the cover plate 910 and disposed between the slot 5612 and the channel foot 730 in the lateral direction LD'.

In some embodiments, the bracket 5702 may cooperate with the channel foot 740 to at least partially contain and/or support one or more structures held by the electronics cradle assembly 390. In such embodiments, the structure(s) may be mounted to the bracket 5702 and/or the channel foot 740. Additionally, in some embodiments, the bracket 5704 may cooperate with the channel foot 730 to at least partially contain and/or support one or more structures held by the electronics cradle assembly 390. In such embodiments, the structure(s) may be mounted to the bracket 5704 and/or the channel foot 730. In any case, in the illustrative embodiment, the brackets 5702, 5704 are identical or substantially identical to one another.

Figure 59:
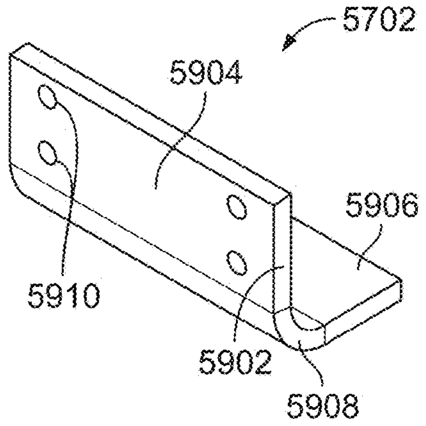
FIG. 59 is a perspective view of a bracket included in the electronics cradle assembly shown in FIG. 56.

As best seen in FIG. 59, the illustrative bracket 5702 includes, or is otherwise embodied as, an L-shaped bracket 5902. The L-shaped bracket 5902 includes bracket extensions 5904, 5906 arranged perpendicular or substantially perpendicular to one another and interconnected by a bend 5908. In the illustrative embodiment, the bracket extension 5904 is formed to include apertures 5910. In some embodiments, the apertures 5910 may be sized to receive fasteners (not shown) used to affix the bracket 5902 to the cover plate 910.

The illustrative electronics cradle assembly 390 includes mounts 5706, 5708 (see FIG. 57). In some embodiments, the mounts 5706, 5708 may be directly affixed to the underside 5809 of the cover plate 910. Of course, in other embodiments, the mounts 5706, 5708 may be coupled to the cover plate 910 in another suitable manner. In any case, when the mount 5706 is coupled to the cover plate 910 as shown in FIG. 58A, the mount 5706 is arranged in close proximity to the front end 5602 of the cover plate 910 and disposed between the slot 720B1 and the channel foot 730 in the lateral direction LD'. When the mount 5708 is coupled to the cover plate 910 as shown in FIG. 58A, the mount 5708 is arranged in closer proximity to the front end 5602 than the mount 5706 and disposed between the slot 720B1 and the channel foot 730 in the lateral direction LD'. The mounts 5706, 5708 are coupled to the cover plate 910 in alignment with one another in the lateral direction LD'. Whereas the mount 5708 is coupled to the cover plate 910 such that the mount 5708 is arranged between the front end 5602 and the slot 720C1 in the longitudinal direction LD, the mount 5706 is coupled to the cover plate 910 such that the mount 5706 is arranged between the slots 720C1, 720C2 in the longitudinal direction LD.

In some embodiments, the mounts 5706, 5708 may cooperate with one another to at least partially contain and/or support one or more structures held by the electronics cradle assembly 390, such as one or more pumps, for example. Additionally, in some embodiments, the mounts 5706, 5708 may individually contain and/or support the structure(s). In any case, in the illustrative embodiment, the brackets 5706, 5708 are identical or substantially identical to one another.

Figure 60:
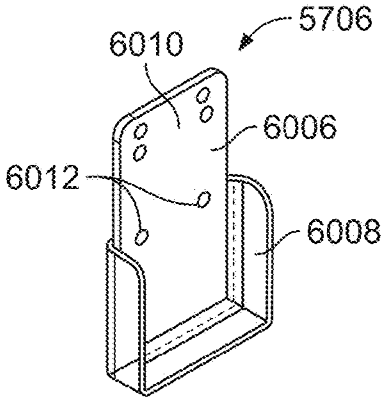
FIG. 60 is a perspective view of a pump mount included in the electronics cradle assembly shown in FIG. 56.

As best seen in FIG. 60, the illustrative mount 5706 includes, or is otherwise embodied as, a pump mount 6006. The pump mount 6006 includes a mount enclosure 6008 and a spine 6010 interconnected with the mount enclosure 6008 that extends outwardly away from the mount enclosure 6008. In some embodiments, when one or more structures are mounted using the pump mount 6006, the structure(s) contact the spine 6010 and are at least partially surrounded and/or enclosed by the mount enclosure 6008. In the illustrative embodiment, the spine 6010 is formed to include apertures 6012. In some embodiments, the apertures 6012 may be sized to receive fasteners (not shown) used to affix the mount 6006 to the cover plate 910.

The illustrative electronics cradle assembly 390 includes at least one mount 5710 (see FIG. 57) distinct from the mounts 5706, 5708. In some embodiments, the mount 5710 may be directly affixed to the underside 5809 of the cover plate 910. Of course, in other embodiments, the mount 5710 may be coupled to the cover plate 910 in another suitable manner. In any case, when the mount 5710 is coupled to the cover plate 910 as shown in FIG. 58A, the mount 5710 is disposed between the slots 720A4, 720A5 in the longitudinal direction LD and at least partially aligned with the slots 720A3, 720A4, 720A5 in the lateral direction LD'.

In some embodiments, the mount(s) 5710 may cooperate with one another or another proximate structure to at least partially contain and/or support one or more structures held by the electronics cradle assembly 390, such as one or more air dryers, for example. Additionally, in some embodiments, the mount(s) 5710 may individually contain and/or support the structure(s). In any case, in the illustrative embodiment, the mount(s) 5710 are identical or substantially identical to one another.

Figure 61:
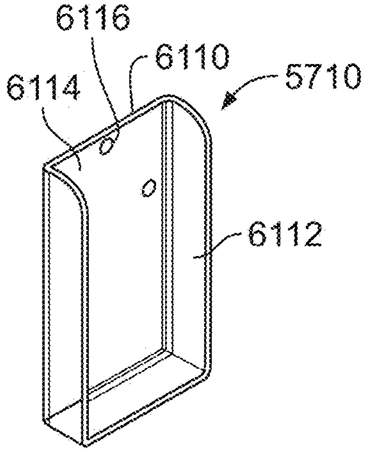
FIG. 61 is a perspective view of an air dryer mount included in the electronics cradle assembly shown in FIG. 56.

As best seen in FIG. 61, the illustrative mount 5710 includes, or is otherwise embodied as, an air dryer mount 6110. The air dryer mount 6110 includes a mount housing 6112 and a back wall 6114 interconnected with the mount housing 6112. In some embodiments, when one or more structures are mounted using the air dryer mount 6110, the structure(s) contact the back wall 6114 and are at least partially surrounded and/or enclosed by the mount housing 6112. In the illustrative embodiment, the back wall 6114 is formed to include apertures 6116. In some embodiments, the apertures 6116 may be sized to receive fasteners (not shown) used to affix the mount 6110 to the cover plate 910.

The illustrative electronics cradle assembly 390 includes the channel foot 730 coupled to the underside 5809 of the cover plate 910 such that the channel foot 730 extends parallel to the longitudinal direction LD along an entire length thereof as shown in FIGS. 57 and 58A. The illustrative channel foot 730 extends in the longitudinal direction LD all the way or substantially all the way between the front and rear ends 5602, 5604 of the cover plate 910 along the underside 5809 thereof, as best seen in FIG. 58A. The channel foot 730 is illustratively coupled to the underside 5809 such that the channel foot 730 is disposed between the slots 720C1, 720C2, 720C3 and the slots 5624, 5626 in the lateral direction LD'. The channel foot 730 may be directly affixed to the underside 5809 of the cover plate 910 or coupled to the cover plate 910 in another suitable manner.

Figure 62:
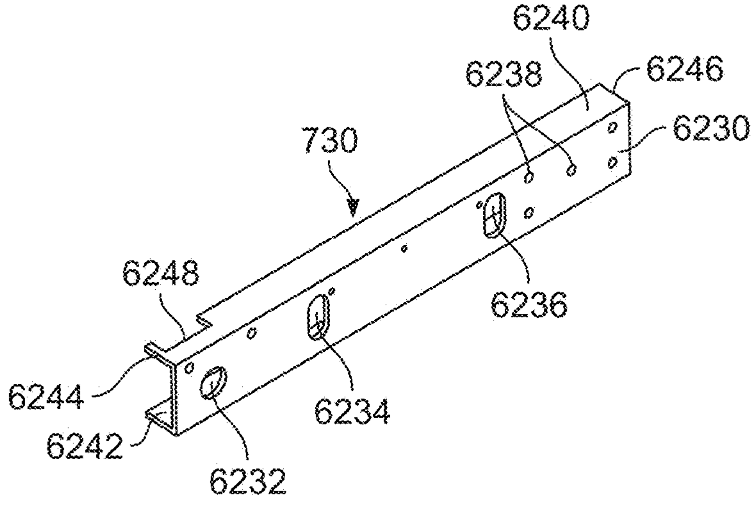
FIG. 62 is a perspective view of one channel foot included in the electronics cradle assembly shown in FIG. 56.

As best seen in FIG. 62, the illustrative channel foot 730 has a C-shaped cross section defined by a back panel 6230 and a pair of extensions 6240, 6242 interconnected with, and arranged perpendicular to, the back panel 6230. Using the extension 6240 as an example, the extension 6240 extends from a rear end 6244 to an opposite front end 6246. In close proximity to the rear end 6244, the extension 6240 is formed to include a rectangular notch 6248. In some embodiments, while the extension 6242 may be devoid of a notch aligned with the notch 6248, the extensions 6240, 6242 may be substantially similar otherwise. In the illustrative embodiment, the back panel 6230 is formed to include holes 6232, 6234, 6236 that are spaced from one another in the longitudinal direction LD. The back panel 6230 may also include apertures 6238 sized to receive fasteners (not shown) that are used to attach various structures to the channel foot 730 in use of the electronics cradle assembly 390.

The illustrative electronics cradle assembly 390 includes the channel foot 740 coupled to the underside 5809 of the cover plate 910 such that the channel foot 740 extends parallel to the longitudinal direction LD along an entire length thereof as shown in FIGS. 57 and 58A. The illustrative channel foot 740 extends in the longitudinal direction LD all the way or substantially all the way between the front and rear ends 5602, 5604 of the cover plate 910 along the underside 5809 thereof, as best seen in FIG. 58A. The channel foot 740 is illustratively coupled to the underside 5809 such that the channel foot 740 is disposed between the slots 720A3, 720A4, 720A5 and the slots 5618, 5620 in the lateral direction LD'. The channel foot 740 may be directly affixed to the underside 5809 of the cover plate 910 or coupled to the cover plate 910 in another suitable manner.

Figure 63:
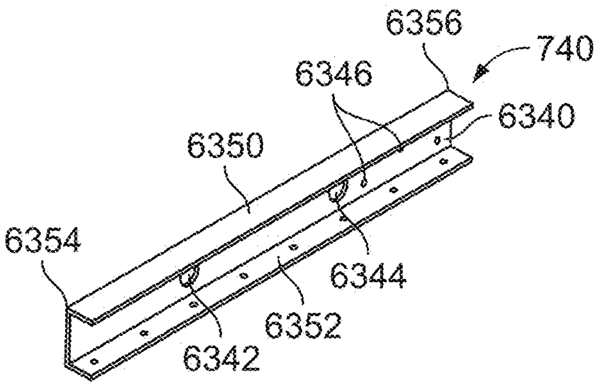
FIG. 63 is a perspective view of another channel foot included in the electronics cradle assembly shown in FIG. 56.

As best seen in FIG. 63, the illustrative channel foot 740 has a C-shaped cross section defined by a back panel 6340 and a pair of extensions 6350, 6352 interconnected with, and arranged perpendicular to, the back panel 6340. Using the extension 6350 as an example, the extension 6350 extends from a rear end 6354 to an opposite front end 6356. In some embodiments, the extensions 6350, 6352 may be identical or substantially identical to one another. In the illustrative embodiment, the back panel 6340 is formed to include holes 6342, 6344 that are spaced from one another in the longitudinal direction LD. The back panel 6340 may also include apertures 6346 sized to receive fasteners (not shown) that are used to attach various structures to the channel foot 740 in use of the electronics cradle assembly 390. As best seen in FIG. 57, when the channel feet 730, 740 are coupled to the underside 5809 of the cover plate 910, the respective back panels 6230, 6340 are arranged in confronting relation to one another.

Figure 64:
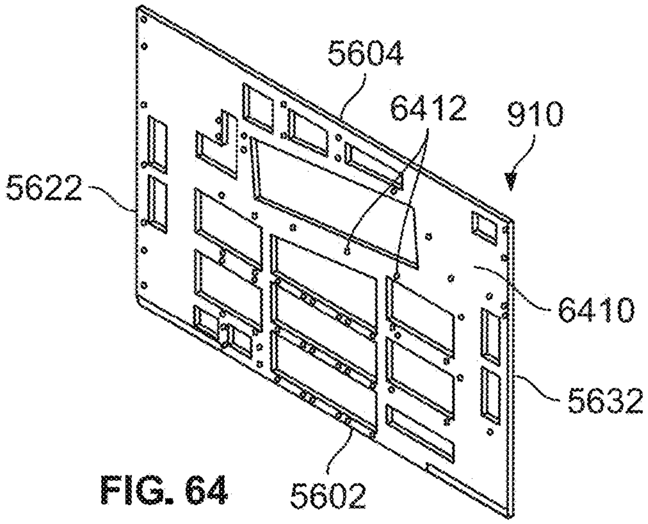
FIG. 64 is a perspective view of a cover plate included in the electronics cradle assembly shown in FIG. 56.

The illustrative cover plate 910 of the electronics cradle assembly 390 extends in the longitudinal direction LD between the front and rear ends 5602, 5604 and in the lateral direction LD' between the lateral sides 5622, 5632 as shown in FIGS. 57 and 64. The aforementioned slots of the cover plate 910 extend all the way through the cover plate 910 from a top side 6410 to the underside 5809. The cover plate 910 may also include apertures 6412 sized to receive fasteners (not shown) that are used to attach various structures to the cover plate 910 in use of the electronics cradle assembly 390.

Figure 65:
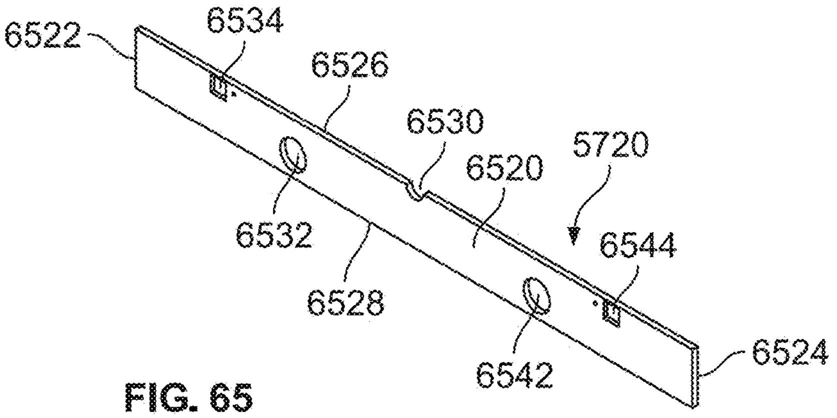
FIG. 65 is a perspective view of a cover flap included in the electronics cradle assembly shown in FIG. 56.

The illustrative electronics cradle assembly 390 includes a cover flap 5720 coupled to the underside 5809 of the cover plate 910 along the rear end 5604 thereof. In some embodiments, the cover flap 5720 may at least partially close off an interior compartment located beneath the top side 6410 in the vertical direction VD along the rear end 5604 of the cover plate 910. As best seen in FIG. 65, the cover flap 5720 includes, or is otherwise embodied as, a rectangular flap 6520 extending between opposite ends 6522, 6524 and between opposite edges 6526, 6528.

The flap 6520 illustratively includes a semicircular notch 6530 formed in the edge 6526 and disposed substantially midway between the ends 6522, 6524. The flap 6520 also includes a bore 6532 arranged between the notch 6530 and the end 6522 and a rectangular slot 6534 arranged between the bore 6532 and the end 6522. The flap 6520 also includes a bore 6542 arranged between the notch 6530 and the end 6524 and a rectangular slot 6544 arranged between the bore 6542 and the end 6524.

The illustrative electronics cradle assembly 390 includes bars 5730, 5732 (see FIG. 57). In some embodiments, as shown in FIGS. 57 and 58A, the bars 5730, 5732 may be directly affixed to the underside 5809 of the cover plate 910. Of course, in other embodiments, the bars 5730, 5732 may be coupled to the cover plate 910 in another suitable manner. In any case, when the bar 5730 is coupled to the cover plate 910 as shown in FIG. 58A, the bar 5730 is arranged in close proximity to the rear end 5604 in the longitudinal direction LD and disposed between the bracket 5702 and the channel foot 740 in the lateral direction LD'. Additionally, when the bar 5732 is coupled to the cover plate 910 as shown in FIG. 58A, the bar 5732 is arranged in close proximity to the rear end 5604 in the longitudinal direction LD and disposed between the bracket 5704 and the channel foot 730 in the lateral direction LD'. In any case, in the illustrative embodiment, the bars 5730, 5732 are identical or substantially identical to one another.

Figure 58B:
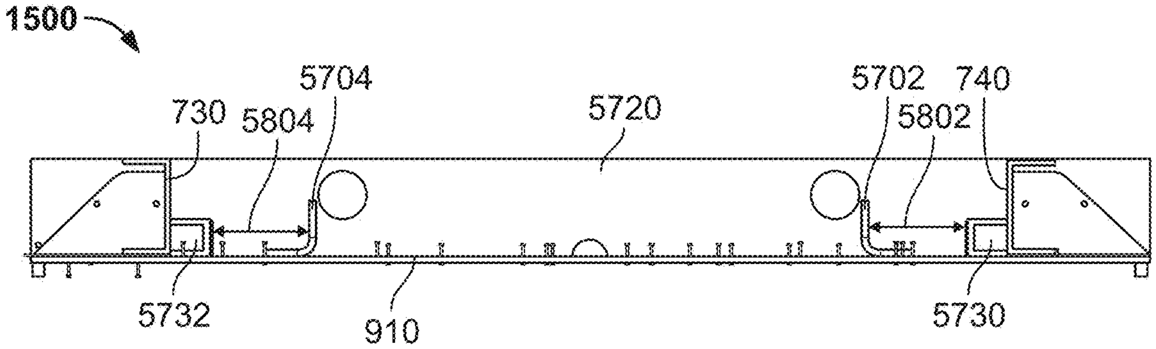
FIG. 58B is an end elevation view of the electronics cradle assembly shown in FIG. 56.

In some embodiments, as best seen in FIGS. 58A and 58B, the bar 5730 may be coupled to the cover plate 910 such that the bar 5730 abuts, and is in direct contact with, the channel foot 740. In that arrangement, the bar 5730 and the bracket 5702 are spaced apart from one another by a distance 5802 in the lateral direction LD'. Additionally, in some embodiments, as best seen in FIGS. 58A and 58B, the bar 5732 may be coupled to the cover plate 910 such that the bar 5732 abuts, and is in direct contact with, the channel foot 730. In that arrangement, the bar 5732 and the bracket 5704 are spaced apart from one another by a distance 5804 in the lateral direction LD'. In some embodiments, the distances 5802, 5804 are equal or substantially equal to one another.

Figure 67:
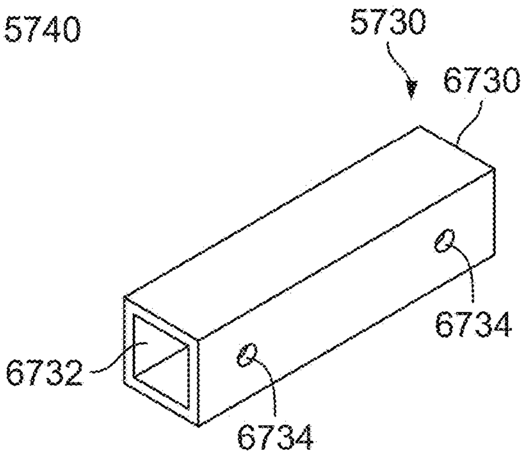
FIG. 67 is a perspective view of a bar included in the electronics cradle assembly shown in FIG. 56.

As best seen in FIG. 67, the illustrative bar 5730 includes, or is otherwise embodied as, a rectangular bar 6730 defining an interior space 6732. Of course, in other embodiments, it should be appreciated that the bar 6730 may take the shape of other suitable geometric forms. In the illustrative embodiment, the bar 6730 is formed to include apertures 6734 sized to receive fasteners (not shown) that may be used to attach the bar 6730 to the channel foot 740 in use of the electronics cradle assembly 390.

The illustrative electronics cradle assembly 390 includes spacers 5740 each sized for receipt in a corresponding hole 5742 extending through the cover plate 910. In some embodiments, a first set of holes 5742A are aligned with one another in the lateral direction LD' and disposed in close proximity to the lateral side 5622 of the cover plate 910. The first set of holes 5742A are spaced from one another in the longitudinal direction LD and arranged to receive a first set of spacers 5740. Additionally, in some embodiments, a second set of holes 5742B are aligned with one another in the lateral direction LD' and disposed in close proximity to the lateral side 5632 of the cover plate 910. The second set of holes 5742B are spaced from one another in the longitudinal direction LD and arranged to receive a second set of spacers 5740. In the illustrative embodiment, the spacers 5740 are identical or substantially identical to one another.

Figure 66:
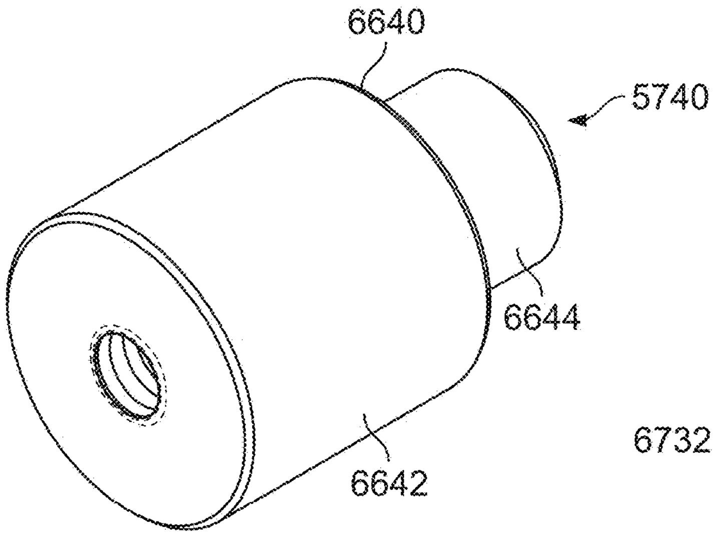
FIG. 66 is a perspective view of a spacer included in the electronics cradle assembly shown in FIG. 56.

As best seen in FIG. 66, the illustrative spacer 5740 includes, or is otherwise embodied as, a generally cylindrical spacer 6640 having sections with different diameters. More specifically, the spacer 6640 illustratively includes a section 6642 having a first diameter and a section 6644 coupled to the section 6642 that has a second diameter. In the illustrative embodiment, the diameter of the section 6642 is greater than the diameter of the section 6644.

Figure 58C:
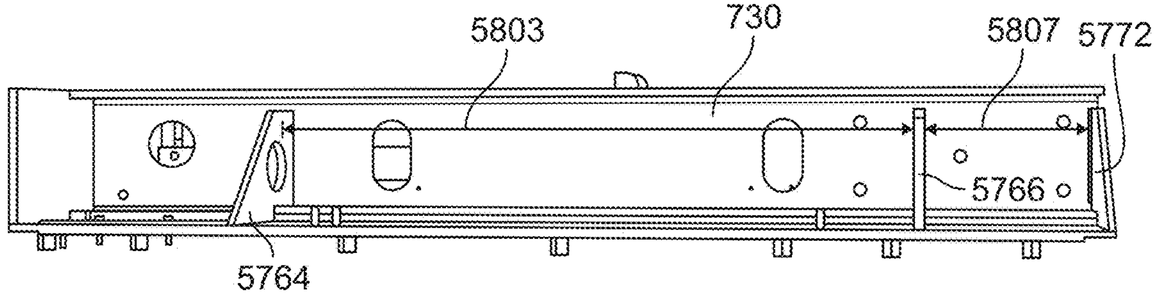
FIG. 58C is a side elevation view of the electronics cradle assembly shown in FIG. 56.
Figure 58D:
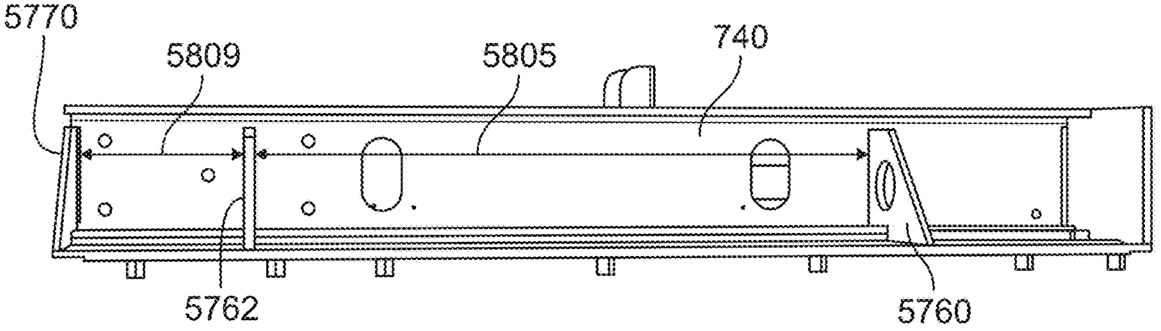
FIG. 58D is another side elevation view of the electronic cradle assembly shown in FIG. 56.

The illustrative electronics cradle assembly 390 includes dividers or weldments 5760, 5762, 5764, 5766 as shown in FIG. 57. In the illustrative embodiment, the dividers 5760, 5762, 5764, 5766 are identical or substantially identical to one another. The dividers 5760, 5762 are affixed to the channel foot 740 whereas the dividers 5764, 5766 are affixed to the channel foot 730. Interaction between the dividers 5764, 5766 and the channel foot 730 is depicted in FIG. 58C whereas interaction between the dividers 5760, 5762 and the channel foot 740 is depicted in FIG. 58D. In any case, in the illustrative arrangement, the dividers 5760, 5762, 5764, 5766 are disposed beneath the cover plate 910 in the vertical direction VD.

The dividers 5764, 5766 are coupled to the channel foot 730 as shown in FIG. 58C so that the dividers 5764, 5766 are spaced apart by a distance 5803 in the longitudinal direction LD. The dividers 5760, 5762 are coupled to the channel foot 740 as shown in FIG. 58D so that the dividers 5760, 5762 are spaced apart by a distance 5805 in the longitudinal direction LD. In some embodiments, the distances 5803, 5805 are equal to one another or substantially equal to one another. Additionally, in some embodiments, when the dividers 5764, 5766 are coupled to the channel foot 730 and the dividers 5760, 5762 are coupled to the channel foot 740, the dividers 5762, 5766 are aligned or substantially aligned in the longitudinal direction LD and the dividers 5760, 5764 are aligned or substantially aligned in the longitudinal direction LD.

Figure 69:
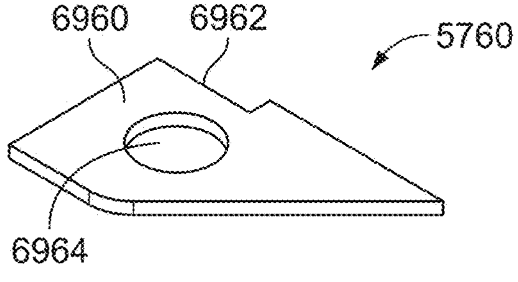
FIG. 69 is a perspective view of another divider included in the electronics cradle assembly shown in FIG. 56.

As best seen in FIG. 69, the illustrative divider 5760 includes, or is otherwise embodied as, a generally trapezoidal divider 6960. The divider 6960 is formed to include a rectangular notch 6962 and a bore 6964. In the orientation of the divider 5760 depicted in FIG. 57, the notch 6962 faces upwardly in the vertical direction VD.

The illustrative electronics cradle assembly 390 includes dividers or weldments 5770, 5772 as shown in FIG. 57. The dividers 5770, 5772 are distinct from the dividers 5760, 5762, 5764, 5766. In the illustrative embodiment, the dividers 5770, 5772 are identical or substantially identical to one another. The divider 5770 is affixed to the channel foot 740 whereas the divider 5772 is affixed to the channel foot 730. Interaction between the divider 5772 and the channel foot 730 is depicted in FIG. 58C whereas interaction between the divider 5770 and the channel foot 740 is depicted in FIG. 58D. In any case, in the illustrative arrangement, the dividers 5770, 5772 are disposed beneath the cover plate 910 in the vertical direction VD.

The divider 5772 is coupled to the channel foot 730 as shown in FIG. 58C such that the divider 5772 is spaced from the divider 5766 by a distance 5807 in the longitudinal direction LD. The divider 5770 is coupled to the channel foot 740 as shown in FIG. 58D such that the divider 5770 is spaced from the divider 5762 by a distance 5809 in the longitudinal direction LD. In some embodiments, the distances 5807, 5809 are equal to one another or substantially equal to one another. Additionally, in some embodiments, when the divider 5770 is coupled to the channel foot 740 and the divider 5772 is coupled to the channel foot 730, the dividers 5770, 5772 are aligned or substantially aligned in the longitudinal direction LD.

Figure 68:
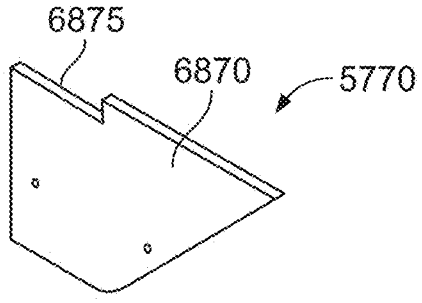
FIG. 68 is a perspective view of one divider included in the electronics cradle assembly shown in FIG. 56.

As best seen in FIG. 68, the illustrative divider 5770 includes, or is otherwise embodied as, a generally trapezoidal divider 6870. The divider 6870 is formed to include a rectangular notch 6872. In the illustrative embodiment, the divider 6870 is devoid of a bore like the bore 6964. In the orientation of the divider 5770 depicted in FIG. 57, the notch 6872 faces upwardly in the vertical direction VD.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electric vehicle comprising:

a chassis extending in a longitudinal direction, and a plurality of wheels supported by the chassis including a pair of front wheels and a pair of rear wheels arranged rearward of the pair of front wheels in the longitudinal direction, wherein the chassis includes a front suspension subframe assembly supporting the pair of front wheels that comprises a base rail assembly including a pair of base rails spaced from one another in a lateral direction perpendicular to the longitudinal direction, wherein the pair of base rails are spaced a constant distance from one another in the lateral direction from forward ends of the pair of base rails to rear ends of the pair of base rails, at least one cross rail extending in the lateral direction to couple the pair of base rails to one another, a powertrain unit cradle at least partially housing a powertrain unit of the vehicle that is mounted to the base rail assembly, and a base block coupled to the powertrain unit and arranged rearward of the powertrain unit in the longitudinal direction, the base block mounted to the base rail assembly such that the base block extends above the base rail assembly in a vertical direction and over the constant distance between the pair of base rails.

2. The electric vehicle of claim 1, wherein:

the chassis comprises a midframe assembly arranged at least partially rearward of the front suspension subframe assembly in the longitudinal direction, and the midframe assembly includes a pair of support arm structures spaced apart from one another in the lateral direction.

3. The electric vehicle of claim 2, wherein the front suspension subframe assembly is coupled to the midframe assembly such that the base block is arranged between the pair of support arm structures in the lateral direction and aligned with the pair of support arm structures in the longitudinal direction.

4. The electric vehicle of claim 1, wherein the front suspension subframe assembly comprises at least one crossbeam arranged rearward of the at least one cross rail that extends in the lateral direction to couple the pair of base rails to one another.

5. The electric vehicle of claim 4, wherein:

the at least one crossbeam is coupled to the base block.

6. The electric vehicle of claim 4, wherein the pair of base rails, the at least one cross rail, and the at least one crossbeam cooperate to define a cage through which the powertrain unit extends.

7. The electric vehicle of claim 6, wherein the cage comprises a first upper beam disposed at one side thereof that is aligned with one of the pair of base rails in the lateral direction and arranged above the one of the pair of base rails in a vertical direction.

8. The electric vehicle of claim 7, wherein the cage comprises a second upper beam disposed at another side thereof opposite the one side that is aligned with the other of the pair of base rails in the lateral direction and arranged above the other of the pair of base rails in the vertical direction.

9. An electric vehicle comprising:

a chassis extending in a longitudinal direction, and a plurality of wheels supported by the chassis including a pair of front wheels and a pair of rear wheels arranged rearward of the pair of front wheels in the longitudinal direction, wherein the chassis includes a front suspension subframe assembly supporting the pair of front wheels and a midframe assembly arranged at least partially rearward of the front suspension subframe assembly in the longitudinal direction, wherein:

the midframe assembly includes a pair of support arm structures spaced apart from one another in the lateral direction, wherein one of the pair of support arm structures includes a first channel defining a first lateral side of the support arm structure, and the front suspension subframe assembly is coupled to the midframe assembly such that a base block of the front suspension subframe assembly is arranged between the pair of support arm structures in the lateral direction and aligned with the pair of support arm structures in the longitudinal direction.

10. The electric vehicle of claim 9, wherein:

the front suspension subframe assembly comprises a base rail assembly including a pair of base rails spaced from one another in the lateral direction, one of the pair of support arm structures is directly coupled to one of the pair of base rails, and the other of the pair of support arm structures is directly coupled to the other of the pair of base rails.

11. The electric vehicle of claim 9, wherein the one of the pair of support arm structures comprises a second channel defining a second lateral side of the support arm structure opposite the first lateral side.

12. The electric vehicle of claim 11, wherein interior ducts defined by the corresponding first and second channels are arranged in confronting relation to one another.

13. The electric vehicle of claim 11, wherein:

the first channel has a first length in the longitudinal direction, and the second channel has a second length in the longitudinal direction less than the first length.

14. The electric vehicle of claim 11, wherein each of the first and second channels has a C-shaped cross-section.

15. An electric vehicle comprising:

a chassis extending in a longitudinal direction, and a plurality of wheels supported by the chassis including a pair of front wheels and a pair of rear wheels arranged rearward of the pair of front wheels in the longitudinal direction, wherein the chassis includes a front suspension subframe assembly supporting the pair of front wheels and a midframe assembly arranged at least partially rearward of the front suspension subframe assembly in the longitudinal direction, and wherein the midframe assembly includes a pair of support arm structures spaced apart from one another in the lateral direction and a crossbeam assembly affixed to each of the pair of support arm structures that extends across the midframe assembly beyond each of the pair of support arm structures in the lateral direction such that the pair of support arm structures are arranged inwardly in the lateral direction of opposite lateral ends of the crossbeam assembly.

16. The electric vehicle of claim 15, wherein:

the crossbeam assembly includes a main channel extending in the lateral direction from a first end of the midframe assembly to a second end of the midframe assembly arranged opposite the first end, and each of the pair of support arm structures directly contacts the main channel.

17. The electric vehicle of claim 16, wherein the main channel has a C-shaped cross-section.

18. The electric vehicle of claim 16, wherein:

the main channel is formed to include a central aperture positioned midway between the first end and the second end, and each of the pair of support arm structures directly contacts the main channel such that the central aperture is positioned between the pair of support arm structures in the lateral direction.

* * * * *